US012714075B1

(12) United States Patent
Richardson et al.

(10) Patent No.: US 12,714,075 B1
(45) Date of Patent: Aug. 25, 2026

(54) MODULAR AND RELOCATABLE AQUATIC HABITAT METHODS AND SYSTEMS FOR ECOLOGICAL MITIGATION, ORGANISM GROWTH, AND WATER QUALITY ENHANCEMENT

(71) Applicant: Reef Arches PHC, LLC, West Palm Beach, FL (US)

(72) Inventors: Keith Richardson, Lake Worth, FL (US); Nicholas Andre Bourdon, Boca Raton, FL (US)

( * ) Notice: Subject to any disclaimer, the term of this patent is extended or adjusted under 35 U.S.C. 154(b) by 0 days.

(21) Appl. No.: 19/218,849

(22) Filed: May 27, 2025

Related U.S. Application Data

(63) Continuation-in-part of application No. PCT/US2024/029169, filed on May 13, 2024, and a (Continued)

(51) Int. Cl.
*A01K 61/73* (2017.01)

(52) U.S. Cl.
CPC .................................... *A01K 61/73* (2017.01)

(58) Field of Classification Search
CPC ...................................................... A01K 61/73
See application file for complete search history.

(56) References Cited

U.S. PATENT DOCUMENTS 5,803,660 A * 9/1998 Warren .................... F01B 1/12 119/221
6,896,445 B1 5/2005 Engler
(Continued)

FOREIGN PATENT DOCUMENTS

CN 103858799 A 6/2014
CN 205623663 10/2016
(Continued)

OTHER PUBLICATIONS

Translation of WO 2019039658 A1 (Year: 2019).*
(Continued)

*Primary Examiner* — Timothy D Collins
*Assistant Examiner* — Brittany A Lowery
(74) *Attorney, Agent, or Firm* — Derek Fahey, Esq.; The Plus IP Firm, PLLC

(57) ABSTRACT

A modular and relocatable aquatic habitat system for ecological mitigation, marine life support, and water quality enhancement is disclosed. The system comprises a plurality of habitat modules, each habitat module including a permeable base and a pre-growth layer of marine organisms covering a substantial portion of the habitat module before installation. A mounting system is configured to removably secure the habitat modules to an aquatic infrastructure, wherein the mounting system maintains a gap between each habitat module and the aquatic infrastructure to facilitate water flow and marine organism interaction. In certain embodiments, a deployable unit is disposed proximate to the aquatic infrastructure, the deployable unit comprising a support structure and a plurality of receiving sections configured to retain the habitat modules. The habitat modules are relocated to the deployable unit during maintenance operations and subsequently reattached to the aquatic infrastructure after maintenance is complete. In some embodiments, the deployable unit itself serves as the mounting system, wherein the configuration of receiving sections inherently provides spacing and structural support for the habitat modules.

14 Claims, 28 Drawing Sheets

Related U.S. Application Data continuation-in-part of application No. 19/089,941, filed on Mar. 25, 2025.

(60) Provisional application No. 63/465,937, filed on May 12, 2023, provisional application No. 63/569,645, filed on Mar. 25, 2024, provisional application No. 63/674,710, filed on Jul. 23, 2024.

(56) References Cited

U.S. PATENT DOCUMENTS

| | | | | |
|---|---|---|---|---|
| 12,102,067 | B1 | 10/2024 | Richardson et al. | |
| 2002/0119006 | A1 | 8/2002 | Moore | |
| 2005/0238431 | A1 * | 10/2005 | Buchenroth | B29C 33/3857 405/21 |
| 2020/0100474 | A1 | 4/2020 | Ewald | |
| 2020/0315145 | A1 * | 10/2020 | O'Hare | A01K 61/73 |
| 2021/0148073 | A1 * | 5/2021 | Loughland | E02B 3/046 |
| 2022/0372721 | A1 * | 11/2022 | Schmidt-Roach | A01K 63/003 |
| 2023/0013261 | A1 | 1/2023 | Bateman et al. | |

FOREIGN PATENT DOCUMENTS

| | | | |
|---|---|---|---|
| CN | 205946901 | | 2/2017 |
| CN | 206150186 | U | 5/2017 |
| CN | 206680192 | U | 11/2017 |
| CN | 207040566 | U | 2/2018 |
| CN | 109496945 | A | 3/2019 |
| CN | 110495416 | A | 11/2019 |
| CN | 210470677 | U | 5/2020 |
| CN | 112939232 | A | 6/2021 |
| CN | 213961368 | U | 8/2021 |
| CN | 114215001 | A | 3/2022 |
| CN | 216796166 | U | 6/2022 |
| CN | 217308782 | U | 8/2022 |
| CN | 217428994 | U | 9/2022 |
| JP | S5325586 | U | 3/1978 |
| JP | S53150795 | U | 11/1978 |
| JP | H03112249 | U | 11/1991 |
| JP | 11308939 | A | 11/1999 |
| JP | 2007006768 | A | 1/2007 |
| KR | 200197703 | Y1 | 9/2000 |
| KR | 20030003179 | A | 1/2003 |
| KR | 100562676 | B1 | 3/2006 |
| KR | 200413259 | | 4/2006 |
| KR | 100945373 | B1 | 3/2010 |
| KR | 101001828 | B1 | 12/2010 |
| KR | 101033968 | B1 | 5/2011 |
| KR | 101525963 | B1 | 6/2015 |
| KR | 20190021721 | A | 3/2019 |
| KR | 102229486 | B1 | 3/2021 |
| WO | 2021070081 | A1 | 4/2021 |
| WO | 2022229045 | | 11/2022 |
| WO | 2024006131 | | 1/2024 |

OTHER PUBLICATIONS

SVC Products Pty Ltd, Living Seawalls: Greening the Manmade Seascape, website: https://svc.com.au/living-seawalls-greening-manmade-seascape/.

Reef Design Lab, Living Seawalls, website: https://www.reefdesignlab.com/living-seawalls.

KindDesigns, Kind Tiles™, website: https://www.kinddesigns.com/kind-tiles.

Urban Marine Ecology, Enhancement Units, website: https://urbanmarineecology.org/muse/enhancements-units/.

* cited by examiner

202

130
304
308
420

306
430

1200
1205
1210
1201

1205
1210
1201
1200

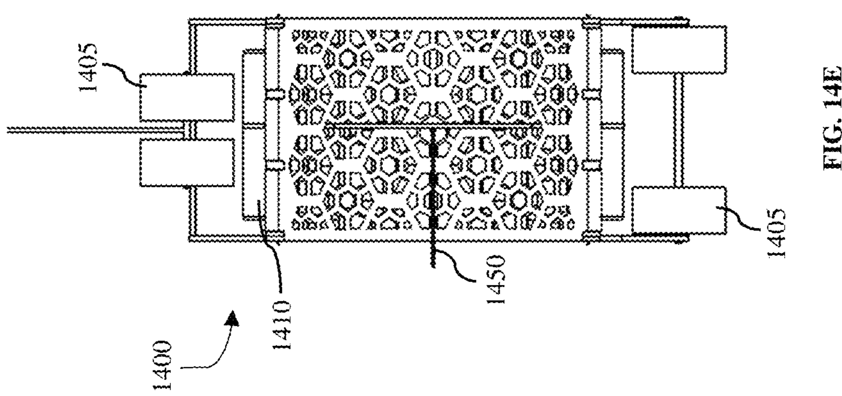
FIG. 14E
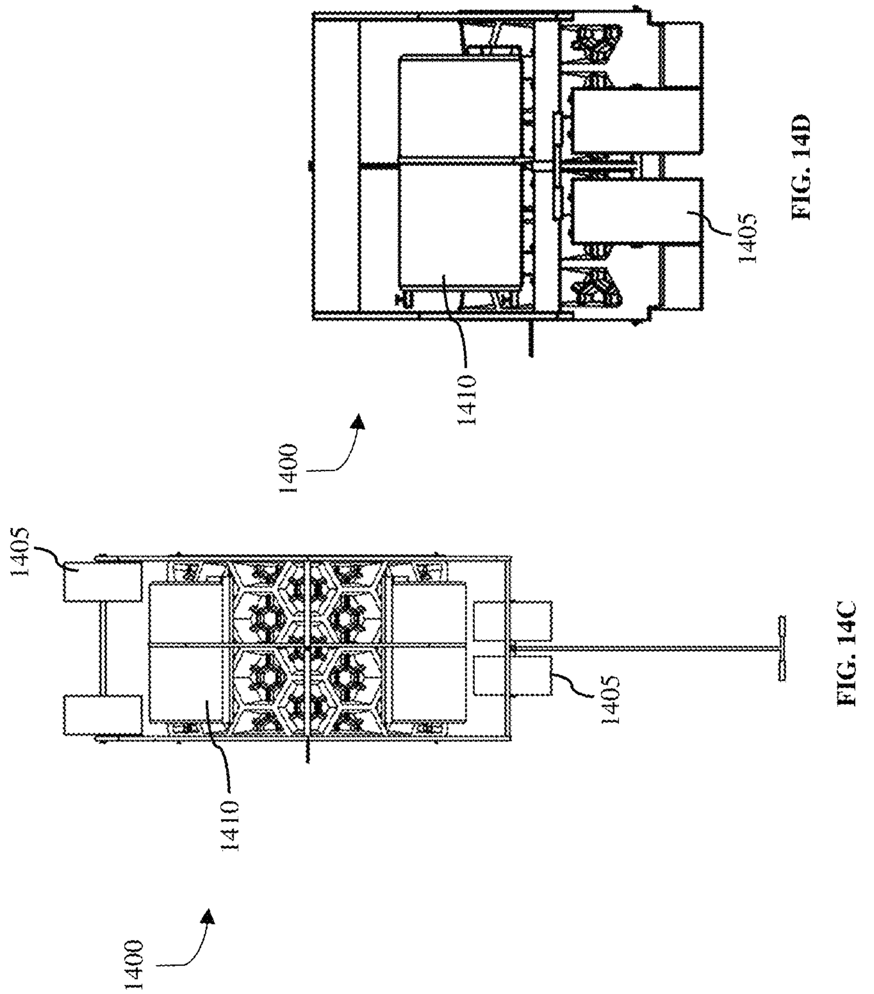
FIG. 14D
FIG. 14C

MODULAR AND RELOCATABLE AQUATIC HABITAT METHODS AND SYSTEMS FOR ECOLOGICAL MITIGATION, ORGANISM GROWTH, AND WATER QUALITY ENHANCEMENT

REFERENCE TO RELATED APPLICATIONS

This application is a continuation-in-part application of application Ser. No. 19/089,941 titled "MODULAR ECOLOGICAL SYSTEM WITH STRUCTURAL ASSEMBLY FOR ENHANCED STABILITY AND ENVIRONMENTAL INTEGRATION" and filed 25 Mar. 2025, which claims benefit of U.S. Provisional Patent Appl. No. 63/569,645, titled APPARATUS, METHODS, AND SYSTEMS FOR TRANSPORTING AND DEPLOYING ECOLOGICAL STRUCTURES, filed Mar. 25, 2024, and U.S. Provisional Patent Appl. No. 63/674,710, titled APPARATUS, METHODS, AND SYSTEMS FOR THE DEPLOYMENT, ASSEMBLY, AND STABILIZATION OF MODULAR ECOLOGICAL STRUCTURES, filed Jul. 23, 2024, the subject matter of each of which is incorporated herein by reference.

This application is a continuation-in-part application of PCT Patent Appl. No. PCT/US24/29169 titled "ARTIFICIAL REEF STRUCTURE" and filed 13 May 2024, which claims the benefit of provisional patent, U.S. Appl. No. 63/465,937, filed on 12 May 2023, the subject matter of each of which is incorporated herein by reference.

This application is related to U.S. application Ser. No. 18/395,902, now patented as U.S. Pat. No. 12,102,067, titled "ARTIFICIAL REEF STRUCTURE", filed 26 Dec. 2023, issued 1 Oct. 2024, and which claims the benefit of provisional patent, U.S. Appl. No. 63/465,937, filed on 12 May 2023.

TECHNICAL FIELD

The present disclosure relates to the field of environmental and structural systems, and more specifically to the field of aquatic environmental preservation and habitat restoration technologies.

BACKGROUND OF THE INVENTION

Environmental degradation in coastal and aquatic ecosystems is increasingly exacerbated by the presence of human-engineered structures such as seawalls, retaining walls, piers, boardwalks, and docks. While these structures serve critical functions in shoreline stabilization, flood protection, and facilitating human activity, they often introduce significant ecological disruptions. A persistent issue in coastal engineering is the lack of integration between infrastructure and the surrounding marine environment, leading to habitat destruction, water quality degradation, and the inhibition of natural ecological processes.

Seawalls and retaining walls, for example, are commonly used to prevent coastal erosion and protect infrastructure from wave action. However, these rigid barriers fundamentally alter natural sediment transport, disrupt coastal currents, and create ecological dead zones where marine life struggles to thrive. Traditional seawall designs are predominantly focused on structural integrity and longevity, often constructed from concrete or metal with smooth, non-porous surfaces that provide little to no habitat value for marine organisms. While some seawalls incorporate textured surfaces or modular enhancements to encourage marine growth, these efforts are largely ornamental and do not sufficiently address the broader ecological consequences of such barriers. Furthermore, during maintenance or repair, any marine life that has managed to establish itself on these structures is frequently destroyed, as conventional construction and repair processes do not prioritize habitat preservation or relocation.

Piers, boardwalks, and docks present additional environmental challenges due to their direct impact on aquatic ecosystems. These structures often shade the water column, reducing sunlight penetration necessary for photosynthetic marine life such as seagrasses and coral. Additionally, their pilings and foundations can disrupt benthic habitats, altering local biodiversity and impeding natural water flow. While some modern designs incorporate eco-friendly materials or attempt to promote marine habitation through artificial reef elements, these features are often secondary considerations rather than fundamental aspects of the structure. More critically, when repairs or replacements are required, there is little to no accommodation for the preservation or temporary relocation of any marine organisms that have colonized these structures. This results in significant habitat loss and a repeated cycle of ecological destruction with every maintenance event.

A primary limitation of existing solutions is that they are not designed with modularity and adaptability in mind. Many artificial habitat structures attached to seawalls, docks, or piers are permanently affixed, making it exceedingly difficult to relocate them when infrastructure repairs are necessary. Without a means to transfer established marine growth-such as coral colonies, filter-feeding organisms, and associated marine life-repairs or modifications to these structures lead to substantial biodiversity loss. Even in cases where habitat-friendly designs have been implemented, they often require extensive mitigation efforts during repair, significantly increasing the complexity and cost of maintenance while failing to guarantee the preservation of the ecosystem.

Moreover, traditional materials used in coastal infrastructure often degrade water quality by leaching harmful chemicals or promoting biofouling that does not support diverse marine ecosystems. Many artificial reef-like enhancements rely on static, immovable components that do not adapt to environmental conditions such as changes in water temperature, salinity, or current patterns. This lack of adaptability reduces their long-term effectiveness in fostering sustainable marine habitats. The deficiencies in prior art highlight the need for an improved system that not only supports marine life but also ensures habitat continuity during repair and maintenance operations. A truly effective solution must integrate biologically supportive materials, modular configurations for relocation, and ecological design principles that mitigate environmental impact while maintaining the structural integrity of human-engineered coastal infrastructure.

In many marine construction and shoreline reinforcement projects, particularly those involving seawalls, riprap, or bulkheads, conventional materials such as large rocks or static structures are commonly deployed in front of infrastructure. While these materials provide erosion control and hydrodynamic benefits, they are non-removable and often impede future repair efforts. When maintenance or replacement of the underlying seawall is required, these conventional structures must be left in place, removed at great expense, or result in the destruction of any biological colonization that has occurred over time. This inflexibility creates long-term ecological and operational burdens.

Additionally, permitting agencies and regulatory bodies are increasingly requiring the inclusion of habitat enhancement or coral mitigation structures in front of marine infrastructure. However, traditional methods lack modularity, removability, or habitat continuity during repair cycles. As a result, many marine contractors and regulators alike have expressed a need for plug-and-play systems that not only provide wave attenuation and sediment accretion, but can also be easily repositioned or redeployed as required by long-term maintenance schedules or emergency responses.

For example, cruise ships and other large vessels have on numerous occasions caused substantial damage to coral reefs or coastal habitat infrastructure. Such incidents often require the offending parties to fund mitigation or restoration measures, costing millions of dollars. Yet currently available solutions are ill-equipped to rapidly deploy biologically viable structures that can offset such damage in a timely and ecologically functional manner.

As a result, there exists a need for improvements over the prior art and more particularly for a coastal infrastructure system and method that not only provides structural stability but also actively supports marine life, enhances water quality, and mitigates environmental disruption during construction, maintenance, and repair.

BRIEF SUMMARY OF THE INVENTION

A system and method for ecological mitigation, marine life support, and habitat relocation is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a modular and relocatable aquatic habitat system is disclosed. The system comprises a plurality of habitat modules, each habitat module comprising a permeable base and a pre-growth layer of marine organisms covering a substantial portion of the habitat module before installation. The system further comprises a mounting system configured to removably secure each habitat module to an aquatic infrastructure, wherein the mounting system maintains a gap between each habitat module and the aquatic infrastructure to facilitate water flow and marine organism interaction. In some embodiments, the system includes a deployable unit configured to temporarily retain the habitat modules during maintenance operations, wherein the deployable unit comprises a support structure and a plurality of receiving sections for removably retaining the habitat modules while keeping them in their natural aquatic environment.

In another embodiment, a method for ecological mitigation, marine life support, and habitat relocation is disclosed. The method comprises cultivating a pre-growth layer of marine organisms on at least a portion of a habitat module, securing the habitat modules to an aquatic infrastructure using a mounting system, deploying a deployable unit into the water proximate to the aquatic infrastructure, detaching at least one habitat module during maintenance, relocating the detached habitat module to the deployable unit, retaining the habitat module in the deployable unit for a duration sufficient to complete maintenance, removing the habitat module from the deployable unit, and reattaching the habitat module to the aquatic infrastructure.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIG. 14C is a top view of the mobile transport and deployment system, according to an example embodiment.

FIG. 14D is a front view of the mobile transport and deployment system, according to an example embodiment.

FIG. 14E is a bottom view of the mobile transport and deployment system, according to an example embodiment.

Figure 1:
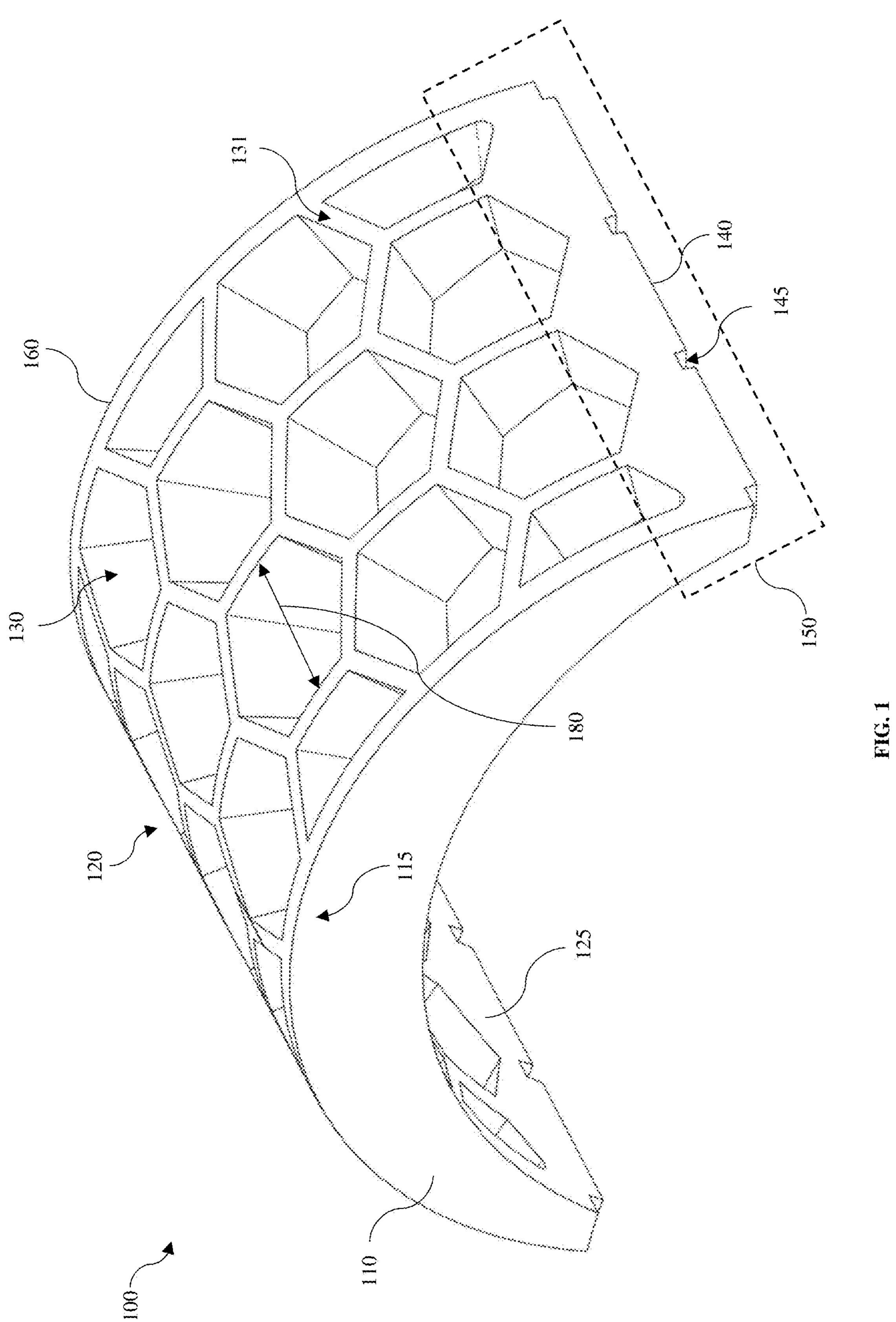
FIG. 1 is a front isometric view of a first artificial reef segment, according to an example embodiment.

In the context of the present disclosure, it is understood that the figures provided are drawn to scale. This aspect is fundamental in accurately conveying the design and dimensions of the artificial reef segment and its system. The scaled figures offer a precise representation, essential for those involved in manufacturing, implementation, and scientific evaluation of the system. That said, it is further understood that other embodiments, proportions, and dimensions may exist that fall within the spirit and scope of the disclosure. While the figures are presented to scale for clarity and precision, they do not limit the extent of the concepts and innovations encompassed by the disclosure. Variations in design, size, and configuration that adhere to the underlying principles and functionalities of the artificial reef system are considered to be within the ambit of this disclosure.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

Efforts to preserve coastal environments have become a priority due to the increasing degradation of marine ecosystems caused by human development and climate change. Coastal infrastructure such as seawalls, bulkheads, and piers often disrupt natural habitats, particularly in areas where coral and other marine life have established themselves on these man-made structures. Traditional artificial reef structures and habitat-enhancing modifications often aim to promote marine growth but fail to provide a true reef foundation capable of sustaining diverse marine life. Prior art systems are frequently ornamental in nature, offering static surfaces that encourage algae accumulation but lack the structural complexity and material properties needed to establish a thriving marine ecosystem. While algae growth may contribute to some ecological benefits, it does not provide the necessary shelter, surface texture, or biological support for more complex marine organisms, such as coral, oysters, and filter-feeding species. These deficiencies limit the effectiveness of existing artificial reef solutions and require costly and time-consuming mitigation efforts when infrastructure maintenance is necessary. When maintenance or repairs are needed on such infrastructure, strict mitigation measures must be taken to protect existing marine organisms, particularly coral colonies. These mitigation efforts, while necessary for ecological preservation, significantly increase both time and costs, as they often involve complex procedures such as manual transplantation, temporary relocation to artificial reef structures, or even complete work stoppages until proper ecological protections are in place.

The disclosed modular and relocatable aquatic habitat system directly addresses these shortcomings by integrating pre-grown marine life into habitat modules before installation, ensuring immediate functionality upon deployment. Unlike prior art solutions that rely on passive colonization, hoping that marine organisms will gradually establish themselves over time, the disclosed system proactively cultivates coral, oysters, and other reef-building organisms in controlled environments before placement in aquatic infrastructure. This pre-growth feature is a critical improvement over the prior art, as it eliminates the uncertainty of natural colonization, accelerates habitat formation, and provides a stable ecological foundation from the outset. Furthermore, the system's use of biologically supportive materials and complex surface structures encourages long-term marine habitation, rather than merely serving as a surface that may promote algae accumulation by default of being disposed in an aquatic environment.

Beyond supporting pre-grown marine organisms, the disclosed system further enhances habitat resilience through protrusions of varying heights and orientations on the habitat modules or inserts, which play a crucial role in protecting juvenile marine life from predators. Certain marine species, such as parrotfish, actively graze on young coral, significantly reducing the success rate of reef restoration efforts. The protrusions incorporated into the habitat modules create natural barriers that help deter such predators, increasing the survival rate of vulnerable marine species and fostering the development of a more diverse and self-sustaining ecosystem. In contrast, prior art structures are often smooth or minimally textured, providing little to no protection against predation and failing to replicate the physical complexity of a natural reef environment.

Another fundamental improvement over the prior art is the system's ability to facilitate habitat relocation during maintenance operations. Conventional artificial reef systems are permanently affixed to infrastructure, meaning that when repairs are necessary, marine life must either be manually transplanted or sacrificed. Coral and other sensitive organisms that have naturally colonized seawalls or bulkheads require time-intensive and costly removal and relocation processes, which not only disrupt the ecosystem but also frequently result in high mortality rates due to environmental stress. The disclosed system overcomes these challenges by allowing habitat modules to be detached and transferred to a deployable unit that remains in the water, proximate to the original habitat. This ensures that marine organisms remain in familiar environmental conditions, minimizing stress and improving survival rates during temporary displacement.

For example, in one embodiment, if a seawall requires structural repairs, traditional mitigation efforts would involve removing marine life from the site and transplanting it to a distant artificial reef structure or land-based holding facility, increasing the risk of transplant failure and habitat fragmentation. With the disclosed system, however, the habitat modules are simply detached from the seawall and relocated to a deployable unit, such as a deployable reef arch or pillar arch placed nearby. By keeping the marine life submerged in the same water system, with consistent temperature, salinity, and nutrient flow, the risk of mortality is drastically reduced. Once maintenance is complete, the habitat modules are reattached to the aquatic infrastructure without requiring re-transplantation or additional adaptation periods.

Through the combination of pre-growth, predator-resistant structural features, and an innovative relocation system, the disclosed invention significantly improves upon the passive, ornamental, and static nature of the prior art. Unlike conventional artificial reef systems that merely accumulate algae and offer limited habitat functionality, this system actively supports complex marine ecosystems, enables seamless maintenance operations, and ensures long-term sustainability. By transforming rigid, human-engineered aquatic infrastructure into dynamic, living habitats, the disclosed system fosters a balanced coexistence between coastal development and marine conservation, redefining the role of infrastructure in ecosystem preservation.

Traditional artificial reef structures and marine habitat enhancements are typically fixed in place, offering no means of relocation or temporary removal when infrastructure maintenance is required. Prior art solutions, whether ornamental reef structures or ecologically functional surfaces, fail to account for the reality that aquatic infrastructure such as seawalls, piers, and pillars require periodic maintenance and repair. When marine organisms, particularly coral and filter-feeding species, colonize these structures, their removal for infrastructure work often results in significant habitat destruction, increased mortality, and costly mitigation efforts. The lack of a relocation mechanism in prior art solutions means that marine life is either permanently displaced or requires labor-intensive transplantation, both of which disrupt the ecosystem and increase project costs.

The disclosed system introduces a deployable unit that allows for the seamless and low-stress relocation of marine life when maintenance is required. Unlike prior art solutions, which are permanently affixed to infrastructure, the habitat modules in this system are designed to be removable and transferable to a deployable unit, keeping marine organisms in their natural aquatic environment throughout the maintenance process. The system includes two distinct deployable unit configurations-one adapted for pillar-based infrastructure, and another configured as a reef arch for broader habitat relocation applications. These deployable units prevent the high mortality rates associated with traditional relocation efforts, as they maintain the same water quality, temperature, and ecological conditions, reducing stress on marine organisms.

In one embodiment, the deployable unit is designed for pillar-based aquatic infrastructure, such as bridge pilings, pier supports, or offshore wind turbine foundations. This pillar-mounted deployable unit includes receiving sections that temporarily retain the habitat modules, allowing them to be securely housed while maintenance occurs on the structure. Unlike prior art methods that require completely removing marine organisms from the water, this deployable unit enables on-site retention, ensuring that habitat continuity is maintained. Once the maintenance operation is complete, the habitat modules are reattached to the pillar without the need for re-transplantation, ensuring minimal ecological disruption.

In another embodiment, the deployable unit is configured as a reef arch, which serves as a temporary artificial habitat structure positioned within the same aquatic environment as the original infrastructure. This reef arch configuration is particularly advantageous for seawall applications, where large sections of the infrastructure may need to be repaired or replaced. When maintenance is necessary, the habitat modules are removed from the seawall and placed into the reef arch deployable unit, which remains submerged in the same ecosystem. This method prevents the marine organisms from experiencing environmental shock, sudden changes in light exposure, or shifts in water chemistry, all of which contribute to the high mortality rates seen in prior art transplantation techniques. Once the maintenance is complete, the habitat modules are retrieved from the reef arch and re-secured to the seawall, ensuring that the living infrastructure is restored to its original state without requiring new colonization efforts.

The introduction of deployable units for temporary habitat retention represents a fundamental improvement over the prior art, which lacks any modular, adaptable, or relocation-capable system. By maintaining marine life within the same ecological conditions during infrastructure maintenance, these deployable units preserve habitat integrity, reduce costs associated with mitigation, and eliminate the need for costly and unreliable transplantation efforts. Furthermore, the ability to strategically position the reef arch or pillar-mounted deployable unit within the same water system ensures that marine organisms remain within their established food chains, environmental conditions, and symbiotic relationships, further reducing stress and improving survival rates.

In contrast to prior art solutions that rely on static artificial reef structures or passive habitat enhancement, the disclosed system introduces a dynamic and flexible approach to marine conservation, ensuring that aquatic infrastructure can be maintained without sacrificing the ecosystems that have developed on them. The combination of pillar-based deployable units for vertical infrastructure and reef arch deployable units for large-scale seawall applications creates an adaptable, scalable solution that fundamentally transforms how marine habitats and human-engineered structures coexist.

In some embodiments, the disclosed system may be used as a rapid-response mitigation measure in the aftermath of accidental reef damage caused by vessels, including cruise ships, container ships, or offshore industrial activity. For example, when regulatory agencies such as NOAA or regional environmental authorities mandate the restoration of reef areas affected by ship groundings or construction impacts, the modular reef units of the present system can be deployed immediately as biologically active habitat replacements. These units offer a distinct advantage in such contexts by being fully formed, pre-grown, and transportable-providing immediate ecological benefit and compliance utility without requiring extensive construction or coral transplantation logistics.

In contrast to conventional riprap or static reef blocks, the disclosed reef arch systems are modular, removable, and capable of supporting biologically active habitat modules that may be pre-grown offsite or in aquaculture settings. When deployed in front of a seawall or similar infrastructure, these reef arches provide wave attenuation, soil accretion, and habitat complexity equivalent to traditional rock placement, but with the added benefit of removability and reuse. Unlike permanent reef block products that cannot be lifted or repositioned without excavation or disassembly, the disclosed system includes integrated lifting points, modular weight distribution, and a structurally independent design that allows the entire reef structure to be relocated intact. This enables adaptive shoreline management and repeated use of the same reef units across different mitigation sites. In some embodiments, the reef arches may be deployed in lieu of rock, simplifying permitting and providing future access to the infrastructure behind them.

This modularity enables rapid relocation of the structures in the event of maintenance, environmental mitigation, or emergency deployment. For example, in the event that a seawall requires repair, the reef arches may be lifted and moved offshore or laterally repositioned while retaining much of the original biological growth attached to the inserts or surfaces of the reef unit. In such use cases, the reef arch may serve as both a living infrastructure and a mitigative buffer capable of responding dynamically to project demands and permitting obligations. Furthermore, by replacing traditional riprap with reef arches that include removable habitat inserts, contractors and municipalities gain access to a scalable and sustainable marine construction toolset. Unlike rock, which cannot be selectively removed or adapted once placed, the disclosed system enables site-specific habitat management, temporary relocation, or phased deployment over time. In addition to their ecological and maintenance-related advantages, the modular reef units provide an unprecedented level of adaptability in regulatory compliance and commercial applications. Because the modules are not permanently affixed and can be easily repositioned, they are well-suited for marine contractors, port authorities, and ship operators seeking to satisfy environmental impact mitigation requirements. For instance, in cases where marine vessels are found liable for reef destruction, these reef units can be proposed and deployed as part of a mitigation strategy, reducing liability exposure and fulfilling restoration mandates more efficiently than traditional static reef designs.

Referring now to the Figures, FIG. 1 is a front isometric view of a first artificial reef segment 100, according to an example embodiment. The artificial reef system includes a plurality of artificial reef segments. Each reef segment comprises a curved frame structure 110, a plurality of openings 130 extending through the curved frame structure, a plurality of frame segments 140, and a plurality of cutouts 145. As shown in FIG. 1, this particular design combats the issue of seabed scouring such that its leading edge is a low profile open face allowing for redirection of currents with minimal destructive Eddie spawning. This design greatly improves upon the prior art by increasing the longevity and security of the structure once placed on the sea bed. As disclosed herein, the artificial reef segment has an integrated structure. In certain embodiments, the artificial reef segment may comprise multiple components that are joined or coupled together. For example, the reef segment may have two side walls (curved structure) and a central frame having the openings. The two side walls, and the central frame may be assembled by coupling with each other to form the artificial reef segment. The components may be combined using mechanical fasteners, such as nuts, or bolts. In another example, the components may be combined using sliding rail type attachment where the central frame has extended tabs on both sides and the two side walls have grooves to receive the extended tab.

FIG. 1 represents a first artificial reef segment 160. The curved frame structure 110 includes a vertex section 115, an outer curved surface 120, and an inner curved surface 125. In the present embodiment the frame structure has a side cross-sectional shape of an arch. The frame structure may be described as a load bearing structure composed of interconnected members of the same material providing stability, strength, and uniform appearance and/or a single unit formulated by a molding and curing process. The frame structure normally has symmetrical geometry or uniform structure making them easier to analyze and design. Because the frame structure is made of the same materials having the same material properties and cross-sectional shape, the behavior of the structure can be predicted more accurately when designing for specific loads and conditions. Another benefit of having frame structures is reduced maintenance. Because the members of the frame have the same properties, they should wear at the same rate, reducing the need for maintenance and repair.

The vertex section 115 or apex section may be defined as the portion of the frame structure where the curve of the frame structure changes from sloping upward to sloping downward. Also known as the apex or top portion of the arch. In the example embodiments, shown in FIGS. 1 through 4, the vertex section is rounded at the highest point of the frame structure. In other embodiments, the vertex may appear differently. For example, in other embodiments the vertex section may plateau forming a planar surface along the highest point of the frame structure. In other embodiments, the vertex may come to a rigid point. It is also possible for the frame structure to have multiple vertices of varied sizes and shapes.

The outer curved surface 120 of the frame structure may be defined as the outermost portion of the structure following a continuous path forming a curve. In some embodiments, the outer curved surface may be textured and rough facilitating the attachment of marine organisms. Similarly, the inner curved surface 125 may be defined as the part of the structure facing inward towards the center of the structure following the same or a different curved path of the outer curved surface. The inner and outer curved surface may be defined by a mathematical function or equation taking on different shapes from simple curves such as circles or ellipses to more complex curves like parabolas. The curvature of each curved surface may vary in magnitude or may be identical to each other. The outer curved surface 120 and inner curved surface 125 may be formed by the same material as the frame structure or may be formed from a different material with different texture or properties. Each artificial reef segment is such that it comprises a uniform structure and same material. The material used for the artificial reef segment may be reinforced, or have other materials embedded within or combinations of materials. Examples of such material may include, Concrete reinforced with fibers such as glass, polypropylene, or steel, Stainless Steel Structures, Fiber-Reinforced Polymers (FRP), Reinforced Plastics, and reinforced marine-grade concrete, Metal Matrix Composites (MMCs). In some embodiments, the curved frame structure 110 may be created from materials such as concrete, limestone, metal, rock, organic materials such as bamboo, artificial reef modules, and acrylic polymer and alumina trihydrate (ATH), derived from bauxite ore. In other embodiments, the system may be comprised of a uniform material, meaning that the entire structure is composed of the same substance throughout. This uniformity ensures consistent properties such as strength, durability, and resistance to environmental factors across the entire segment or insert. The concrete material may be made using recycled materials such as crushed glass, fly ash, or slag. This reduces the demand for new materials and helps to recycle waste. In an embodiment, the material used for the curved frame structure may be eco-friendly polymers that are specifically designed to be environmentally friendly. These polymers can be used to create artificial reef segments that mimic natural coral structure. The manufacturing processes used to create these frame structures may include extrusions, molding, casting, welding, punching, folding, 3D printing, CNC machining, etc. The frame structures may be formed from a single piece of material, or several individual pieces joined or coupled together. However, other materials and manufacturing processes may also be used and are within the spirit and the scope of the present invention.

In the fabrication of the reef arch segment and its inserts, the employment of CSA (Calcium Sulfoaluminate) concrete represents an improvement over materials traditionally used in such applications. CSA concrete distinguishes itself through its rapid setting time and high early strength, which are especially advantageous in the marine setting where quick stabilization of structures is imperative. This rapid development of strength ensures that the reef structures can withstand the dynamic and often harsh oceanic conditions soon after installation. In contrast to conventional Portland cement, CSA concrete has a reduced environmental impact due to its lower limestone content and decreased energy requirements for production. This aspect aligns with the growing emphasis on environmental sustainability in material selection. Furthermore, CSA concrete's enhanced resistance to sulfate attack—a prevalent challenge in marine environments—ensures greater durability and longevity of the reef segments and inserts. Its adaptability to marine conditions, combined with its environmental benefits, positions CSA concrete as a significant advancement over prior art in the construction of artificial reef systems.

The artificial reef segments, though appearing to be frame structures due to their interconnected frame-like appearance, are in fact single, monolithic structures created from a single pour into a mold. This design illusion arises from the sophisticated mold used during the manufacturing process, which intricately shapes the concrete to mimic a composition of multiple connected frames. However, unlike true frame structures that can be assembled or disassembled, these arches are indivisible and unmodifiable post-manufacture.

The manufacturing process involves pouring a specially formulated concrete mixture into a pre-designed mold that imparts the visual complexity of interconnected frames onto the final structure. Once the concrete cures, it forms a solid, continuous mass that retains the strength and integrity of a singular structure. This one-piece construction method eliminates any potential weaknesses that might occur at assembly joints in a true frame structure, thereby enhancing the durability and stability of the artificial reef segment under marine conditions. This integral construction ensures that the arch cannot be broken down into smaller components, reinforcing its permanence and reliability as a part of the marine infrastructure.

In certain embodiments of the artificial reef segments, the structural integrity of the concrete arches is enhanced by incorporating rebar and other reinforcing materials within the mold before the concrete mixture is poured. This addition of rebar provides essential tensile strength to the concrete arches, which naturally possess high compressive strength but require reinforcement to effectively resist bending and tensile stresses that occur during handling, transportation, and long-term environmental exposure.

During the molding process, rebar cages or meshes are carefully placed within the mold according to the structural requirements of the arch. These reinforcing frameworks are positioned to ensure they are optimally located within the thickness of the arch, particularly where the cross-sectional thickness varies, to maximize strength where it is most needed. Once in place, the concrete mixture is poured around the rebar, encapsulating it completely upon curing. This method of reinforcement ensures that each artificial reef segment not only maintains its physical integrity under marine forces but also enhances its durability, contributing to the longevity and ecological function of the reef system.

In the artificial reef structure, the materials of the inserts may differ from the main material of the reef segment. This allows for creating a mosaic of inserts, where each insert may be made from different materials, throughout the reef structure. The inserts within the artificial reef segments can be designed as a mosaic, representing a multifaceted and integrative approach to habitat creation. In this context, a mosaic refers to an assembly of different inserts, each comprising different shapes, structures, and/or materials, each forming a distinct piece of the overall system. This diverse composition allows each insert to provide unique environmental conditions suitable for various marine species.

The variation in materials is strategically chosen to cater to specific requirements of different marine organisms, enhancing the habitat's ecological value. Some materials might be selected for their ability to support the growth of specific species or for their textural properties that suit certain marine life better, thereby fostering a rich and varied underwater ecosystem. In certain embodiments of the artificial reef system, in addition to the improvement of the differing material composition the inserts, another improvement involves a single insert comprising different materials in segmented sections, each tailored to support diverse symbiotic species growth. This multifaceted insert structure exhibits a significant advancement over prior art in artificial reef technologies, primarily due to its enhanced ecological functionality and habitat diversity.

Each segment of the insert, distinct in its material composition, may be specifically designed to create unique microhabitats within the reef system. For example, one segment may utilize a porous material like bio-concrete, conducive to the growth of certain coral or algae species, while another segment might be made from a smoother material like recycled plastic, suitable for species preferring less abrasive surfaces. This diversity in material composition within a single insert allows for the simultaneous support of a range of marine species, each with unique environmental needs, thereby fostering a more dynamic and symbiotic marine ecosystem. Similarly, one entire insert may be a porous material whereas another insert located on a separate part of the system may be a smooth material.

This material variability within the system addresses a key limitation of conventional artificial reef systems and/or inserts, which often employ a uniform material composition, thereby limiting the range of species that can be supported. The innovation lies in the ability to create a mosaic of habitats within a single insert, thereby maximizing the ecological potential of the reef system. The varied material composition also potentially affects the local water chemistry and physical conditions, further contributing to the ecological complexity and health of the reef environment and not only enhances the structural complexity and biological diversity of the artificial reef system but also represents a more versatile and effective solution for marine conservation and reef restoration efforts. The ability to accommodate diverse marine life in a single insert structure significantly surpasses the capabilities of traditional artificial reef designs, marking a substantial improvement in the field.

The plurality of artificial reef segments also includes a plurality of openings 130 which extend through the curved frame structure from the outer curved surface to the inner curved surface. In FIGS. 1 through 3, the openings comprise a hexagonal cross-sectional opening and are placed adjacent to one another spanning across the whole structure creating a grid-like surface. These openings may provide new habitats and shelter for a variety of marine life, increasing the diversity of marine species in the area. The openings may also allow for water flow helping to increase the circulation of oxygen, nutrients, and other essential elements that support the growth of marine life. In the example embodiments shown, such as FIG. 1, there are three openings lined up next to one another spanning from one end of the frame structure to the other. These openings cover the whole artificial reef segment. Whereas, in other embodiments, the openings may be shaped, sized, or spaced differently. For example, in a different example embodiment, the openings may appear circular and may only be placed along the vertex of the structure. As disclosed herein, the openings are shown to have hexagonal cross-sectional opening, it may be understood that other cross-sectional shapes of the openings having more than six sides, such as heptagon, octagon, nonagon, decagon are also covered within the scope of the present invention.

The artificial reef segment, featuring a plurality of openings and/or hexagonal channels, incorporates a well-considered approach to ensure safety for both marine and human life. This approach is exemplified through the utilization of inserts, which serve to modify the openings in areas identified as higher risk.

For human safety, particularly in areas where divers and swimmers are common, the potential for entanglement is a critical concern. The reef segment addresses this by employing inserts, further detailed herein, that can either partially or fully close off these openings. The deployment of a hierarchical structure of openings, with inserts of different sizes and/or having openings of different sizes, allows for the precise adjustment of opening sizes. Some inserts are designed without openings, creating a smooth, flush surface with the segment's outer surface, effectively eliminating any gaps in areas where human interaction is likely.

Concerning marine life, particularly larger species such as juvenile turtles, manatees, and dolphins, the structure provides a safe environment. The customizable nature of the inserts ensures that while the openings are sufficiently large to allow these animals an escape route if they inadvertently swim into them, they also remain small enough to offer a haven from larger predators. This careful balancing act is essential in providing a secure habitat for diverse marine species.

The flexibility in the size and configuration of the openings, afforded by the varied inserts, allows the artificial reef segment to adapt to specific environmental and safety requirements. This feature underscores the segment's ability to offer ecological benefits while simultaneously prioritizing the safety of the marine ecosystem and its human visitors.

The plurality of artificial reef segments further includes a plurality of cutouts 145 disposed along a terminating end 150 of each artificial reef segment. The terminating end may be defined as the farthest end from the vertex of the segment. Terminating end 150 is also illustrative of the interlocking sections of the arch structure. In a symmetrical embodiment such as the example embodiments shown, there are two terminating ends. In some embodiments, such as FIG. 1, these cutouts may be sized to fit the portion of material 131 between each hexagonal cross-sectional opening such that the cutout may be inserted onto the portion of material 131 forming a snug fit. Each cutout serves as a shoulder for the interlocking section such that a portion of the terminating end of the artificial reef structure is disposed within the opening of the adjacent artificial reef structure. In other embodiments, the cutouts may be angled differently applying different pressures to the openings when in contact. It would be noted that the terms hexagonal opening and hexagonal cross-sectional opening are used interchangeably in the disclosed embodiment and refer to the openings 130.

The described cutout on the bottom portion of a reef segment is a specialized feature designed to facilitate the modular assembly of an artificial reef structure. This cutout is essentially a void or an intentionally left-out space, shaped and sized to precisely accommodate a frame segment from another reef segment. Its primary purpose is to enable the interlocking or attachment of multiple reef segments, thereby creating a larger, cohesive artificial reef structure.

The configuration of this cutout is critical for ensuring a secure and stable connection between adjoining reef segments. It must be shaped to correspond exactly to the dimensions and contours of the frame segment it is intended to receive. This precision ensures that, when a frame segment from another reef segment is inserted into the cutout, it fits snugly and securely, minimizing any movement or misalignment. This interlocking mechanism provided by the cutout and the corresponding frame segment is a key aspect of the reef segment's design. It allows for the easy and efficient assembly of larger reef structures from individual segments. Once connected, the segments collectively contribute to the structural integrity and functional effectiveness of the overall artificial reef.

Furthermore, this design feature facilitates flexibility in the construction and layout of the reef. By enabling segments to be securely attached to one another, the overall shape and size of the artificial reef can be customized according to specific environmental needs or conservation goals. This modularity is particularly beneficial in reef restoration projects, where the artificial reef needs to adapt to varying seafloor topographies and ecological conditions.

The artificial reef segment features a curved structural design that is essential for its functional deployment in marine environments. The curvature extends from a prominently defined vertex section through to the segment's terminating ends. A key feature of this design is the variable thickness of the structure, which is not uniform throughout its length but instead designed to decrease continuously from the thicker vertex section to the thinner terminating ends. This tapering of thickness is critical for optimizing the distribution of material, enhancing the structural integrity at points of higher stress concentration near the vertex while reducing unnecessary mass towards the ends where lesser support is required.

Additionally, the segment's thickness is maintained uniformly from the front side to the back side across its entire span. This consistent lateral thickness ensures an even distribution of support and resistance against environmental forces such as waves and currents, providing stability and durability. The design facilitates not only structural robustness but also efficient stacking and storage, as the uniform lateral profile aids in aligning multiple segments compactly.

Overall, these technical features of the curved artificial reef segment—namely, the decreasing thickness from vertex to ends and the uniform lateral thickness—are deliberate to enhance the segment's environmental resilience and functional longevity. This thoughtful engineering ensures that the artificial reef can withstand the dynamic pressures of underwater environments while supporting marine life and contributing to shoreline protection.

Furthermore, in certain embodiments, the longitudinal span of each arch in the artificial reef system significantly impacts the structural integrity and performance of the reef in marine environments. The longitudinal span—the distance between the first terminating end and the second terminating end of each arch—optimizes the arch's ability to withstand oceanic forces, distribute stress, and facilitate effective wave energy management. When installed, the longitudinal span of the arch is perpendicular to the subject shoreline and/or the incoming waves. The length of the longitudinal span is crucial for distributing the forces exerted by waves and currents over a greater area as the waves roll over the arch, thereby reducing the concentration of stress at any single point along the arch. This distribution helps prevent structural failures, such as cracking or collapsing, ensuring the arch maintains its integrity over time. The effectiveness of the arch in dissipating wave energy is directly influenced by its longitudinal span. A longer span allows the arch to interact with waves over a more extended area as they propagate towards the shoreline, gradually absorbing and reducing the energy of the waves as they pass through and around the arch. This gradual dissipation of energy is essential for protecting shorelines from erosion and for reducing the power of waves before they reach sensitive coastal areas.

The outer curved surface of the deployable unit is configured with a first uniform radius of curvature, extending continuously from the vertex section to the terminating end. This uniform curvature ensures that the outer profile of the deployable unit maintains a smooth, consistent arc, optimizing structural integrity, hydrodynamic performance, and habitat accessibility. By maintaining a constant radius of curvature, the outer surface provides a predictable and stable interface with the surrounding aquatic environment, reducing turbulent water flow and minimizing resistance to ocean currents. This feature is particularly beneficial in marine environments where water movement plays a critical role in habitat functionality. The uniform curvature allows nutrient-rich water to flow evenly along the surface of the deployable unit, facilitating the natural exchange of dissolved oxygen and plankton, which supports the health and growth of marine organisms. Additionally, the curvature enhances sediment transport dynamics, preventing debris accumulation on the surface of the structure and ensuring that marine life can establish and thrive without obstruction.

In some embodiments, the first uniform radius of curvature also contributes to the structural load distribution of the deployable unit, particularly when installed as a reef arch or piling-mounted system. The curved outer surface evenly distributes hydrodynamic forces, reducing stress concentrations that could lead to premature wear or failure of the structure over time. Furthermore, this curvature facilitates modular interconnection between multiple deployable units, allowing them to be arranged in scalable reef formations or hydrodynamic breakwater systems. Unlike flat or irregularly shaped artificial reef components, which can create areas of excessive drag and stagnant water pockets, the deployable unit's uniformly curved outer surface maintains a smooth flow path, ensuring optimal conditions for marine biodiversity and long-term habitat sustainability.

The inner curved surface of the deployable unit is configured with a second uniform radius of curvature, extending from the vertex section to the terminating end. This curvature ensures that the inner surface maintains a smooth, continuous arc, optimizing structural stability, hydrodynamic performance, and habitat integration. Unlike irregularly shaped or angular artificial reef structures, the consistent curvature of the inner surface provides a controlled and predictable spatial configuration, which is particularly beneficial when the deployable unit is wrapped around a piling or used as a freestanding reef arch. The second uniform radius of curvature ensures that the spacing between the inner curved surface and the aquatic infrastructure remains consistent, preventing unwanted pressure points, uneven load distribution, or flow disruptions. This uniform design is particularly advantageous when the deployable unit functions as a mounting system, as it allows for seamless attachment to cylindrical structures such as bridge pilings, seawall extensions, or other vertical marine infrastructure. In embodiments where habitat inserts are positioned within the deployable unit, the inner curved surface forms a structured cavity, ensuring that the inserts remain securely retained while still allowing water flow between the outer and inner surfaces.

Hydrodynamically, the second uniform radius of curvature minimizes turbulence and promotes laminar water flow, ensuring efficient nutrient delivery to marine organisms while preventing stagnant water zones. This feature is particularly useful in environments where water exchange is crucial for filter-feeding species such as oysters and barnacles, as it allows optimal exposure to plankton and dissolved oxygen. Additionally, by maintaining a smooth and consistent curvature, the inner surface helps prevent sediment buildup within the deployable unit, ensuring that marine life can colonize the habitat without obstruction.

Structurally, the inner curved surface also plays a role in reinforcing the overall stability of the deployable unit, particularly when it is subjected to hydrodynamic forces such as wave action and tidal currents. The even distribution of force along the inner curved surface reduces stress concentrations, preventing structural weaknesses and ensuring long-term durability in marine environments. In some embodiments, the second uniform radius of curvature is designed to complement the first uniform radius of curvature on the outer surface, ensuring that the deployable unit maintains an optimized balance between strength, hydrodynamic efficiency, and habitat accessibility. By incorporating a second uniform radius of curvature on the inner surface, the deployable unit provides a structurally stable, hydrodynamically efficient, and ecologically optimized habitat solution, making it more effective than traditional flat or irregularly shaped artificial reef structures.

FIGS. 2A, 2B, 2C and 2D illustrate the habitat modules that are the reef inserts 202, 204, 206, 208, 210, and 212 which are inserted withing the respective openings 130 of the reef segments, or deployable units. As shown, the habitat modules or reef inserts may have different shapes, such as hierarchical webbings, star pattern, inserts with pyramidal protrusions. In the figures, the reef inserts 202 and 204 have star pattern, the reef inserts 206, 208 have hierarchical webbings, and the reef inserts 210 and 212 have pyramidal protrusions. In an example, the reef inserts 202 and 204 are the rear side of the reef inserts 210 and 212. The pyramidal protrusions have structures that extend from the base of the reef insert towards the opening of the reef insert partially along the depth of the opening and have substantially pyramidal shape, as shown with reference to FIGS. 3A, 3B, 3C, 3D and 3E. Each of the reef inserts have a base structure 302 and pyramidal structures that protrude from the base structure having a first side and a second side. The objective of such a structure is to provide more surface area and a denser structure for the marine organisms to attach and grow. In an example, the base structure is configured for providing water flow from the first side of the base structure to the second side of the base structure.

Figure 3A:
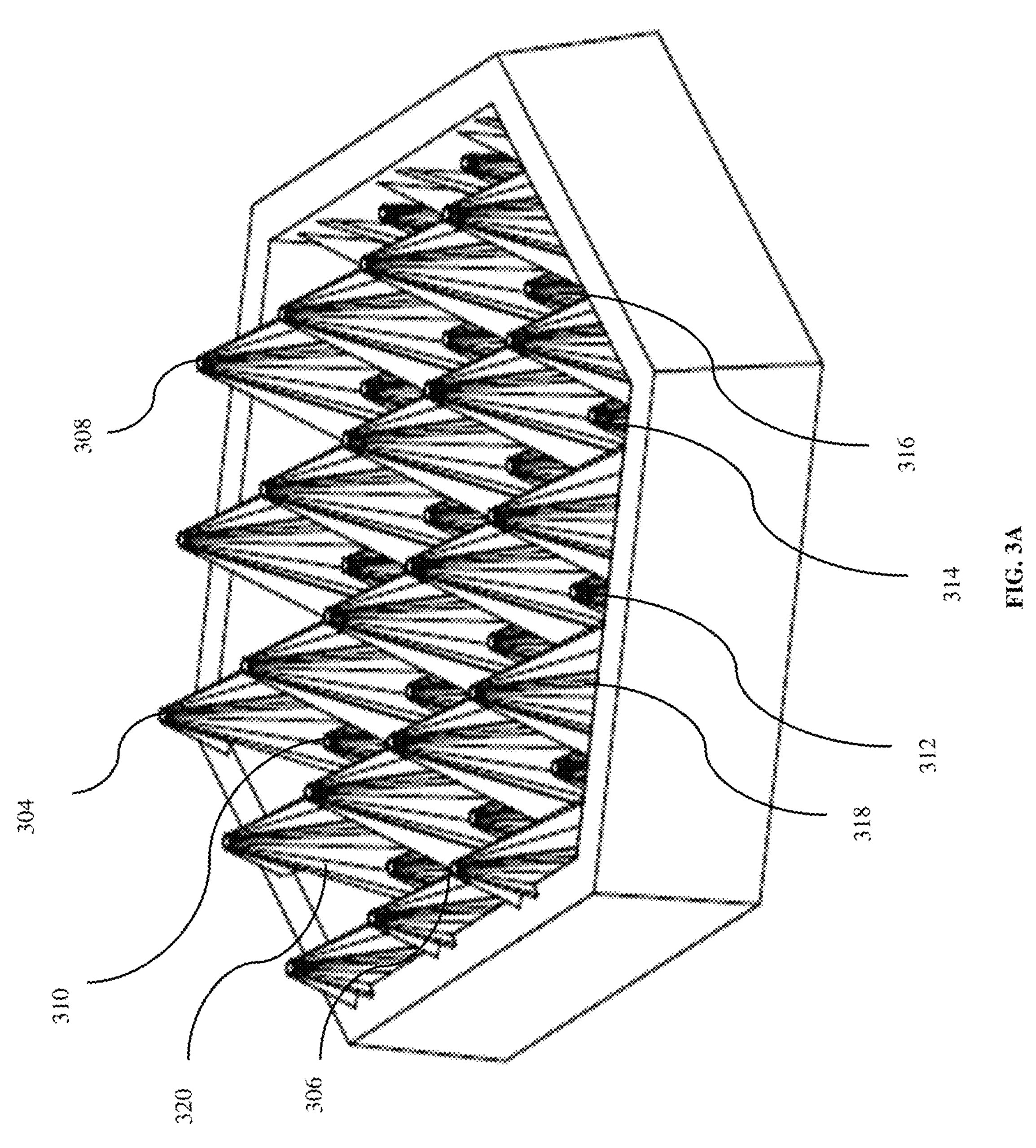
FIGS. 3A, 3B, 3C, 3D and 3E are various schematic views of reef inserts, according to an example embodiment.
Figure 3B:
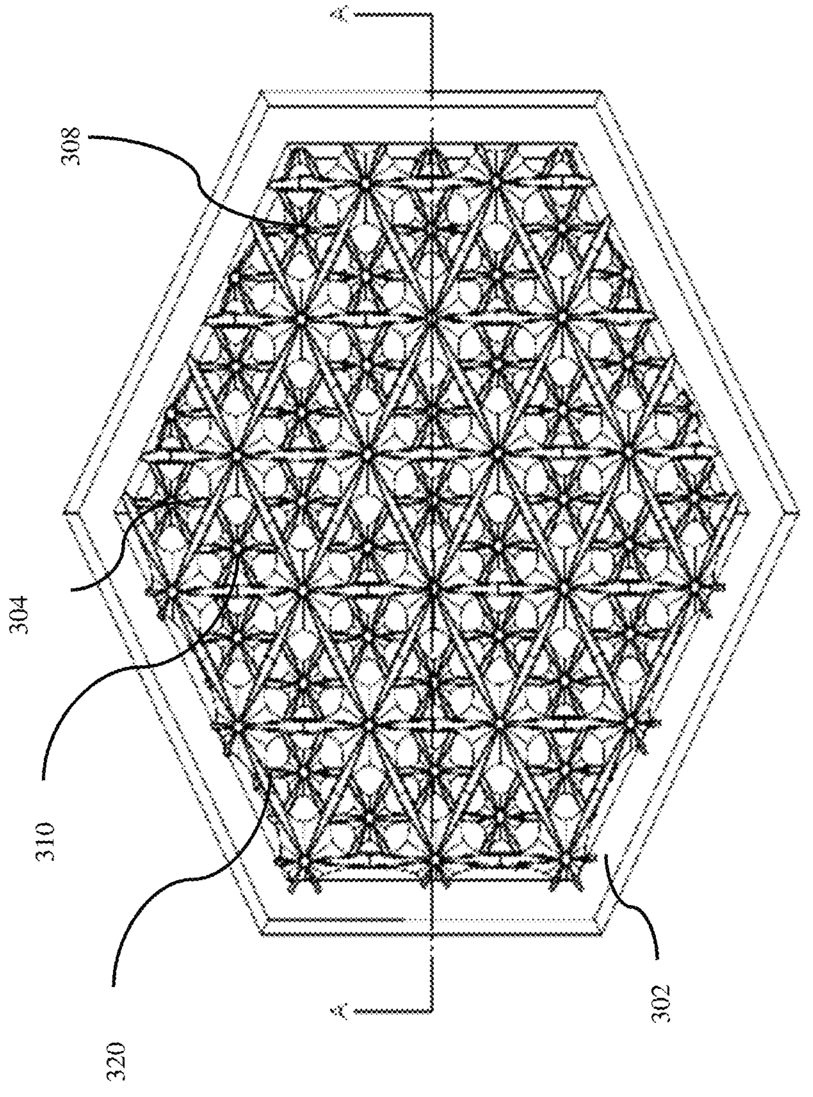
Figure 3C:
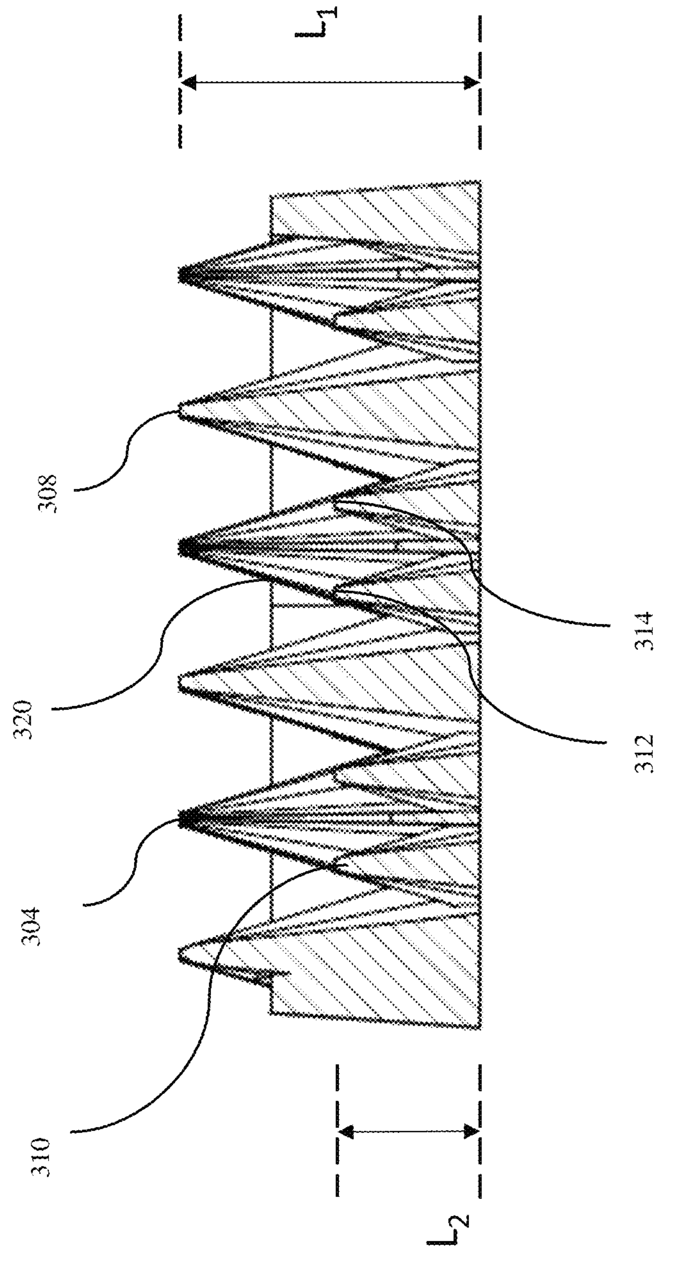

FIG. 3B shows a top schematic view of a habit module or reef insert with pyramidal protrusions. The pyramidal protrusions also have wing structures that protrude from these pyramid protrusions to provide a complex dense structure having an increased surface area of the pyramidal protrusions. As shown, the reef insert has the base structure 302 on which the pyramidal structures are set, also referred to as the first side of the reef insert. The pyramidal protrusions have substantially pyramidal shape as noted above. FIG. 3C illustrates a sectional view of the insert with pyramidal protrusions along a plane AA shown in FIG. 3B. The reef insert has a plurality of first elongated protrusions extending upward from the first side of the base structure, wherein each of a plurality of first elongated protrusions define a first length $L_1$, and a plurality of second elongated protrusions extending upward from the first side of the base, wherein each of a plurality of second elongated protrusions define a second length $L_2$, wherein the second length is less than the first length. Further, the reef insert has an apex defining by a terminating end of each of the plurality of first protrusions and second protrusions and at least one wing extending along each of the plurality of first protrusions and second protrusions.

As shown, the habitat module or reef insert has apex 304 for each of the pyramidal protrusions, first protrusions 306, 308 and second protrusions 310, 312, 314 and 316, and wings 318, 320 on the pyramidal protrusions. Each of the first and second protrusions have a substantially pyramidal shape. In an example, one pyramidal protrusion can have two or more wings. The first protrusions 308 extend upward from a first side of the base structure, and each first protrusion has a first length $L_1$ as shown in FIG. 3C. The second protrusions 310, 312, 314 and 316 extend upwards from the first side of the base, and each second protrusion define a second length $L_2$, and the second length $L_2$ is less than the first length $L_1$. The apex is defined by a terminating end of each of the first protrusions and the second protrusions. The wing extends along the lengths of each of the first protrusions and the second protrusions from the apex to the base portion. These wings on the same protrusion are separated by a distance and provide additional surface area of the reef inserts in the artificial reef segments for the organisms to attach and grow. The wings contribute to habitat complexity and provide extra barrier for protection from predators and contributes in providing a water barrier, breakwater, and artificial habitation. The wings contribute to coral out planting, as noted above. The concept of habitat complexity refers to the variety in the arrangement of physical structures and features within an environment that contains a diverse range of elements. These elements include shelters, substrates, vegetation, and various physical structures, all of which contribute to creating a three-dimensional and intricate living space. This complexity is essential for providing different niches and resources that support a diverse array of species, fostering rich biodiversity and ecological interactions within the habitat. Such habitat complexity enhances the overall biodiversity and ecological dynamics of a particular habitat. As disclosed herein there are two types of protrusions such as the first protrusions and the second protrusions, it is understood that the design and structure of the insert more have more protrusions of a length other than $L_1$ and $L_2$ to have a denser and complex layout and provide more surface area.

Figure 3D:
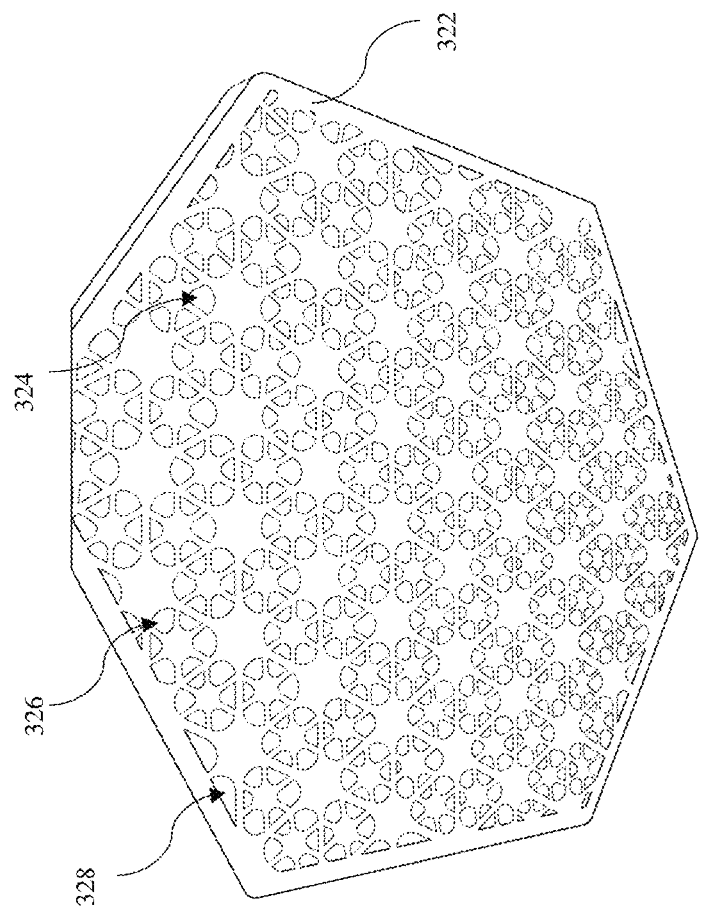
Figure 3E:
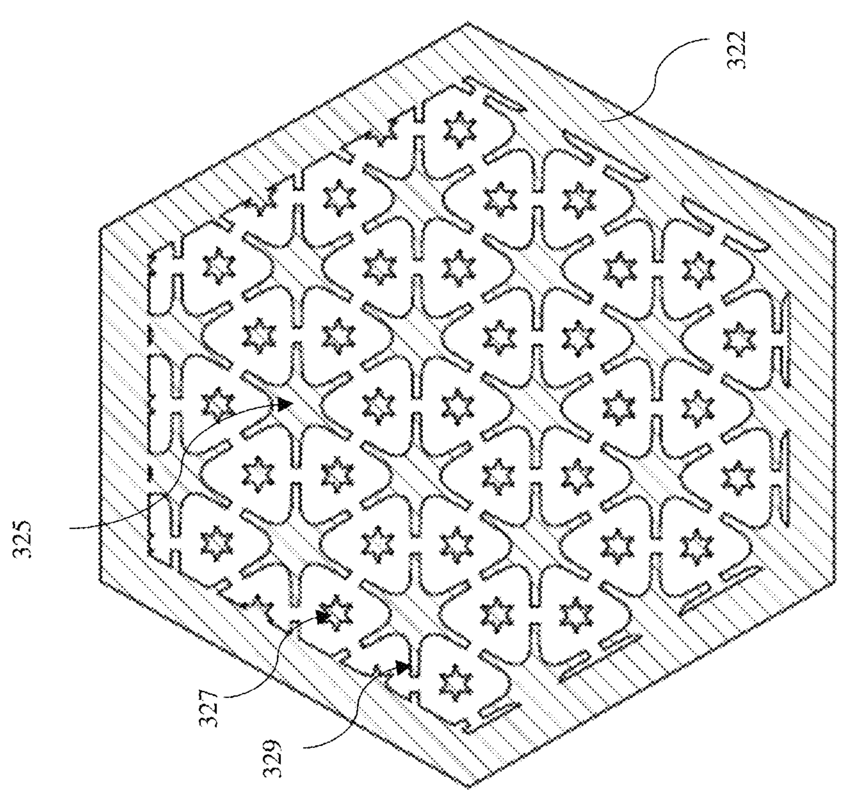

FIG. 3D is the bottom view of the habitat module or reef insert shown in FIG. 3A. The reef insert has the base 322 also referred to as the second side and a number of openings distributed across the surface of the reef insert, such as the openings 324, 326, and 328. In another embodiment, the reef insert of FIG. 3A has a different design of the base, as shown in the bottom view of the insert in FIG. 3E. The holes 325 correspond to the apex of the first protrusions, the holes 327 correspond to the apex of the second protrusions and the holes 329 illustrate the wings of the first protrusions from bottom view.

The artificial reef system is designed with versatility in mind, allowing for different configurations of its components to suit varying ecological and structural needs. In one embodiment, the insert is a separate, removable segment that can be precisely positioned within the overall reef structure. This removable design offers flexibility, enabling adjustments or replacements of the insert as required by environmental conditions or specific conservation goals. It allows for easy maintenance and adaptation of the reef structure to evolving marine life needs.

In other embodiments, the reef segment may be manufactured with a habitat module or insert already embedded or disposed within an opening. In this design, the insert and the surrounding reef structure form a uniform, homogenous entity. This can be achieved through a molding process, where both the insert and the reef segment are cast together, resulting in a seamless integration of the two components. This unified structure offers enhanced stability and durability, as there are no separate parts that could potentially shift or detach under marine conditions. The homogenous design also ensures a consistent texture and surface across the entire reef segment, which can be beneficial for certain types of marine life that require uniform habitats. Such a manufacturing approach simplifies the installation process and ensures a cohesive structure that is well-suited for long-term ecological support and marine habitat creation.

Figures 2A, 2B:
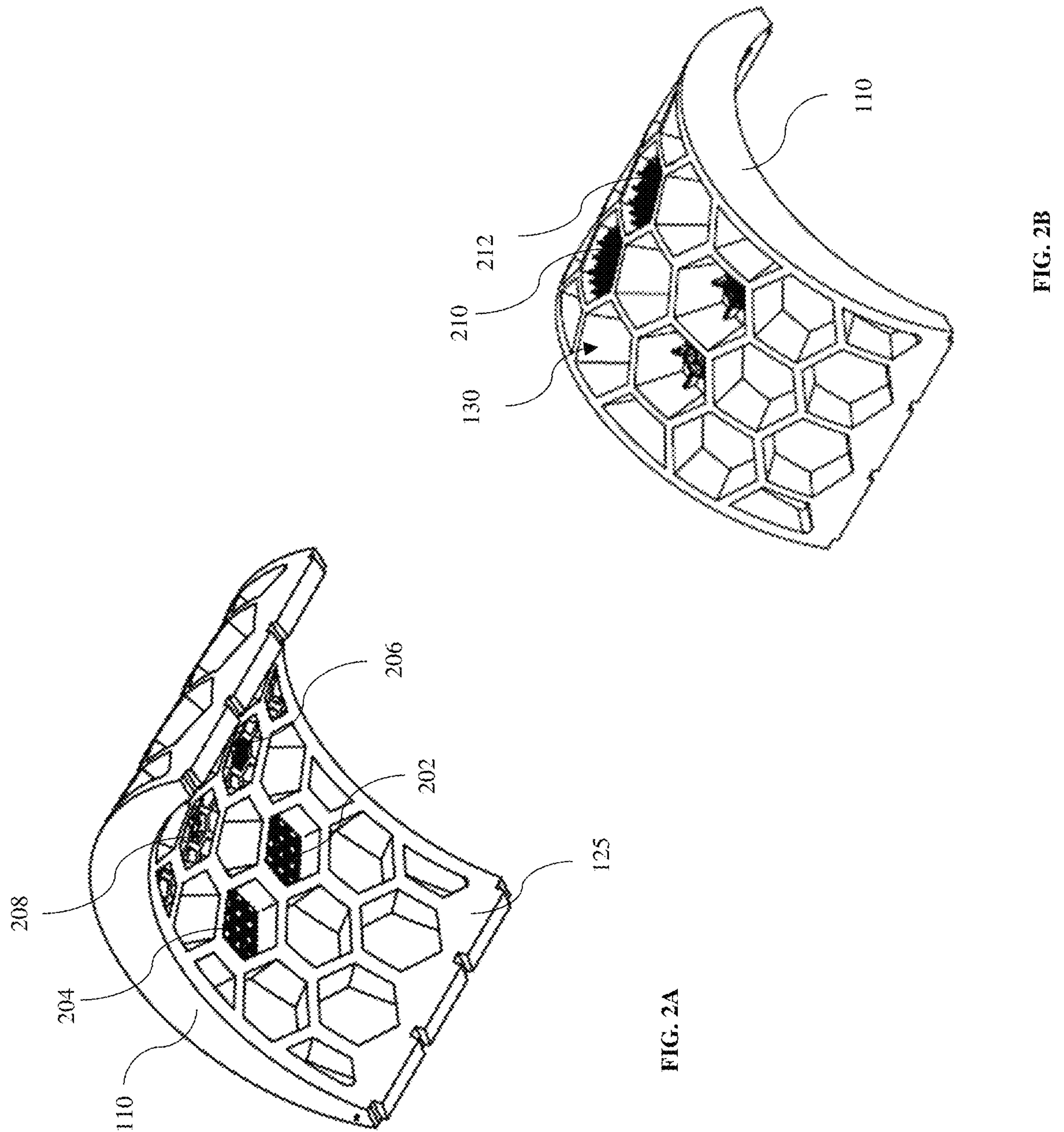
FIGS. 2A, 2B, 2C, 2D, 2E and 2F illustrate various views of reef inserts disposed within openings of artificial reef segment, according to an example embodiment.
Figure 2D:
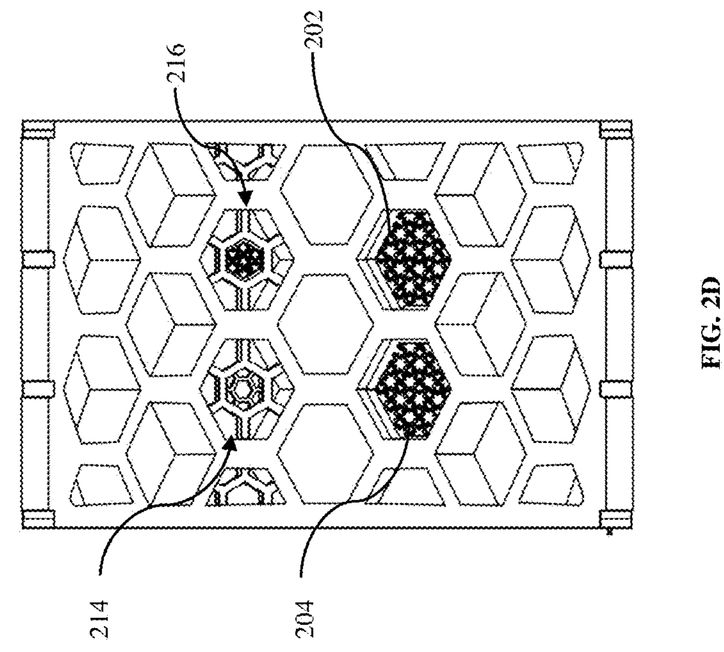
Figure 2C:
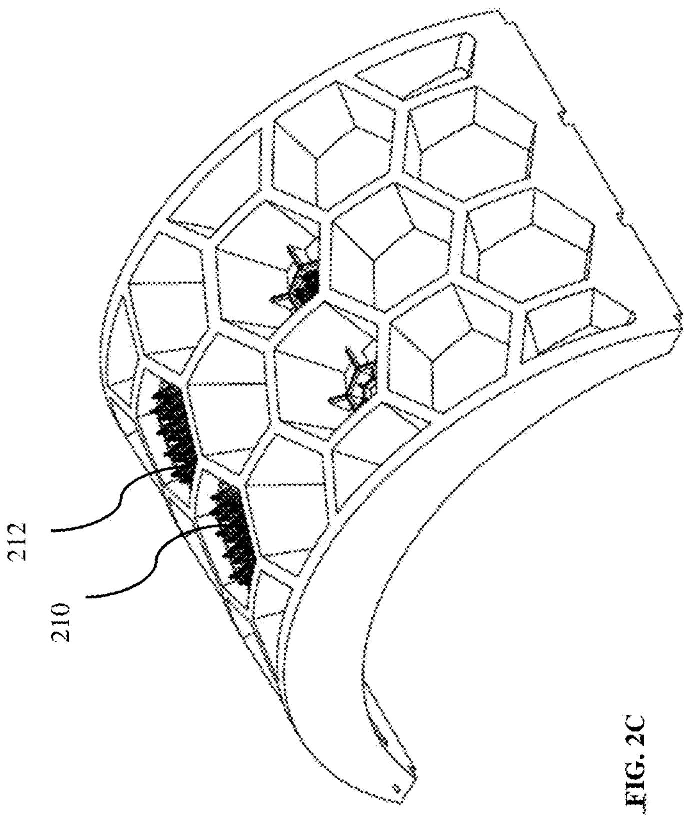
Figures 2E, 2F:
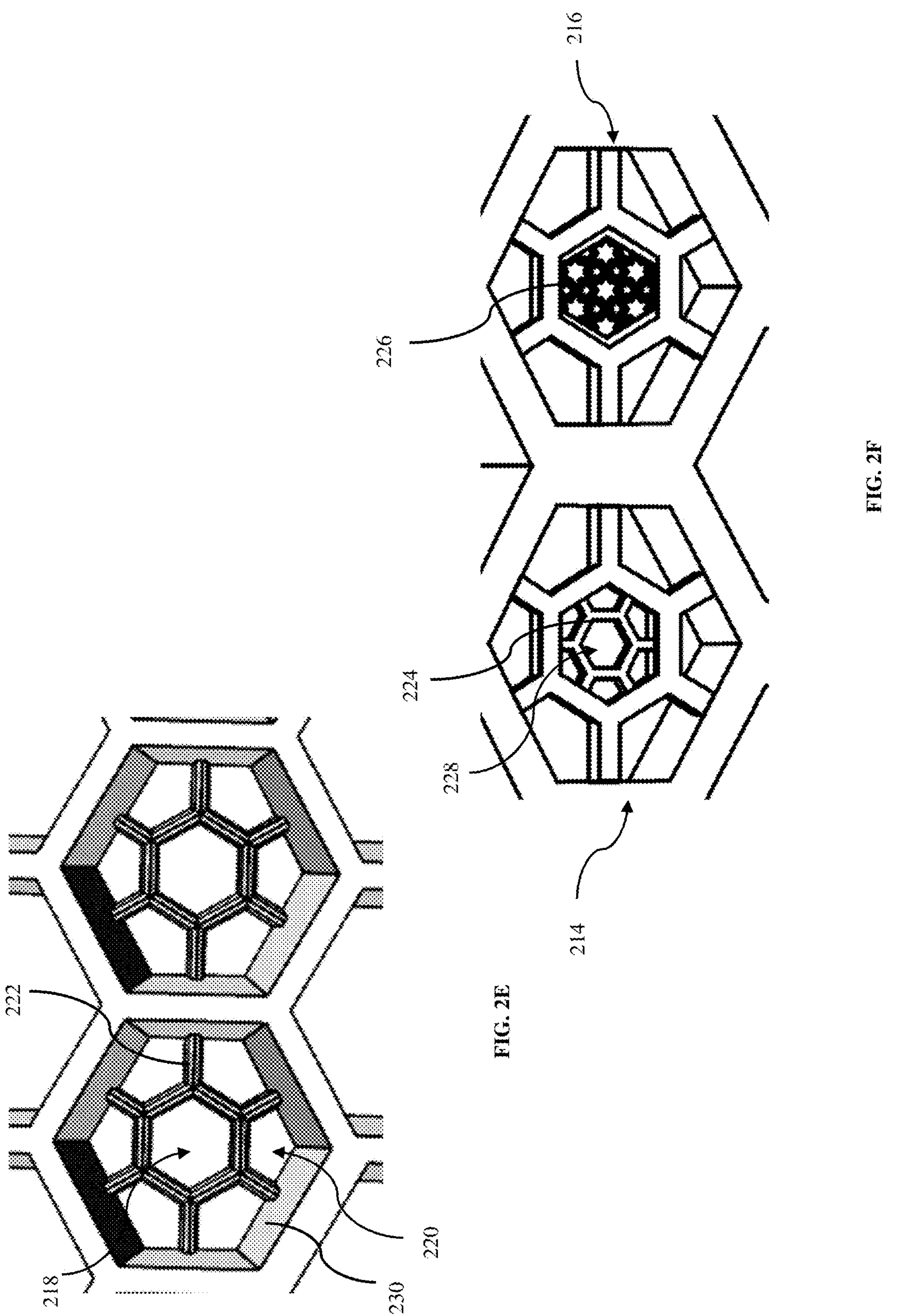

As shown in FIGS. 2C and 2D, the openings 130 can have different types of habitat modules or reef inserts within the openings of an artificial reef segment. For example, the openings may have three-dimensional web-like structure 214 and 216 and star pattern reef inserts 202 and 204 within the openings of the same artificial reef segment. FIG. 2E illustrates a top view of the reef inserts having three-dimensional web-like structure. A three-dimensional web-like structure refers to an arrangement where multiple interconnected frame segments come together to form a complex network of openings. These openings can vary in size and shape, creating a hierarchical structure of spaces. The interconnected nature of the frame segments means that each segment contributes to the overall stability and shape of the entire structure, much like the strands of a spider's web interlace to form a cohesive whole.

In this context, the term 'three-dimensional' emphasizes that the structure extends in all spatial directions—length, width, and height—rather than being flat or two-dimensional. This quality allows for a more intricate and spatially complex design, offering a greater variety of niches and habitats, particularly useful in applications like artificial reefs or architectural designs where spatial complexity is desirable.

The hierarchical nature of the openings in this structure refers to the varying sizes of the spaces created by the frame segments. This can mean larger openings are supported by broader frame segments, while smaller, more intricate openings are formed by finer interconnections. Such a design allows for a wide range of uses and can cater to different requirements, whether they be for specific species in an ecological context or particular functional needs in architectural or engineering projects.

The three-dimensional web-like structure is configured for providing a complex spatial arrangement for enhancing habitat complexity and water flow. The complex spatial arrangement enhances overall biodiversity and ecological dynamics of a particular habitat. In an embodiment, the three-dimensional web-like structure comprises a base structure having a first side and a second side, plurality of secondary openings being of a smaller size than the plurality of openings of the artificial reef segment. The secondary openings are configured for providing water flow from a first side of the base structure to a second side of the base structure. As shown, the openings 218, and 220 represent the secondary openings that are smaller than the size of the opening 130 of the artificial reef segment. The structure has arms 222, also referred to as a frame segment, that are in contact with the inner wall 224 of the opening.

In another embodiment, as shown in FIG. 2F, the habitat module or reef inserts may define a pattern within the structure, such as the three-dimensional web-like structure 216 defined inside the secondary opening 218 of the three-dimensional web-like structure 214, and a star pattern of the reef insert 226 define within the secondary opening 218 of the three-dimensional web-like structure 216. Such a structure defines a plurality of tertiary openings, such as the opening 228 of the three-dimensional web-like structure 216 or the openings in the star pattern of the reef insert 226, within the secondary opening 218 of the plurality of openings thereby creating a hierarchical openings within the artificial reef insert and is also referred to as hierarchical webbings. In an example, the secondary openings are smaller than the plurality of openings and larger than the tertiary openings. The hierarchical openings are uniform and have secondary openings and tertiary openings provide additional support and reinforcement to the secondary openings of reef inserts. This helps to maintain the structural integrity of the reef and prevents collapse or shifting of materials over time. The structure increases the complexity of the habitat. This allows for a greater variety of microhabitats and niches, attracting a wider range of marine organisms. Such reef structures provides a substrate for the attachment of marine organisms such as corals, sponges, and algae. This promotes the colonization of the reef by a diverse array of species, leading to increased biodiversity and ecological productivity and creates sheltered areas within the reef, providing protection for juvenile fish and other small marine organisms. This helps to support the growth and survival of young organisms, contributing to the overall health of the ecosystem.

Figure 4A:
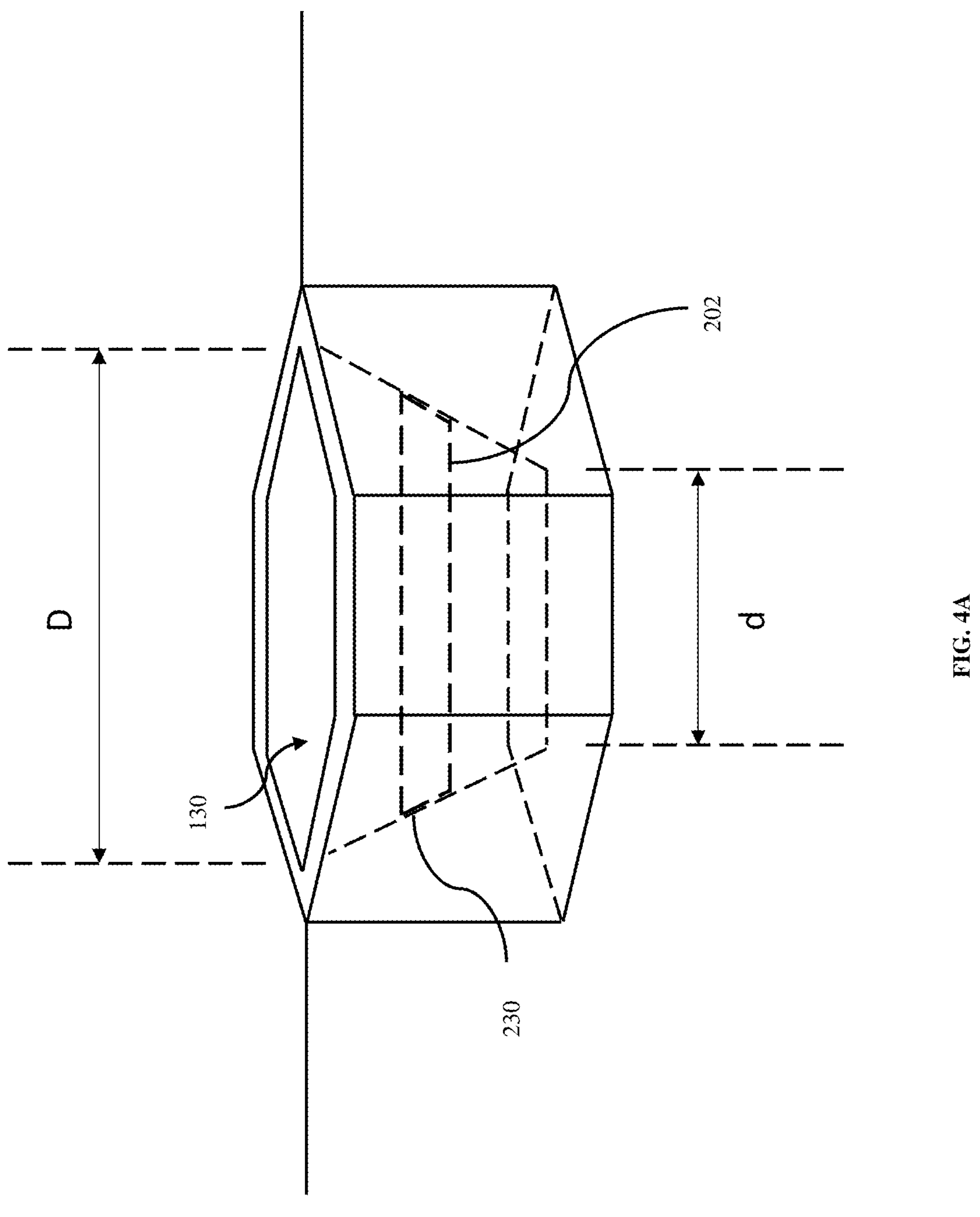
FIGS. 4A, 4B, 4C, 4D, 4E and 4F are schematic sectional views of an opening of the artificial reef segment, according to an example embodiment.
Figures 4B, 4C:
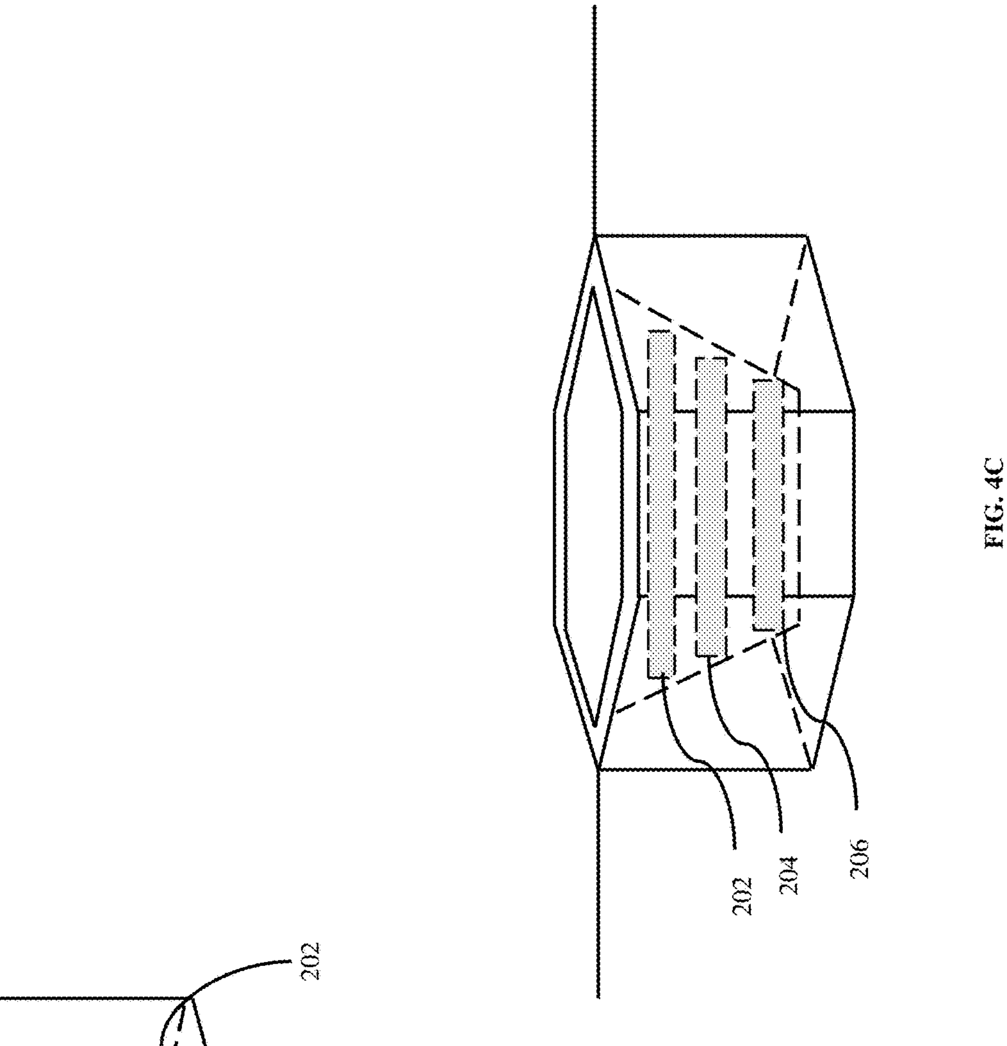

FIGS. 4A, 4B are schematic sectional views of the openings 130 of the artificial reef segment. In an example, the opening 130 has a tapered structure having inner wall 230 of the opening gradually narrow or converge toward the back of the opening defines a channel. The openings are to receive and attach reef inserts, such as the reef insert 202 within the channel. In one embodiment, the reef inserts may be press-fitted into the channel to snugly fit into the reef segments. The reef inserts may have friction fit inserts and the reef inserts are designed to fit tightly into the openings through friction, creating a secure and stable attachment without additional fasteners. In other embodiment, the reef inserts have features that interlock with corresponding structures inside the opening, providing a strong and stable connection, such as a puzzle-piece-like structures on the inserts that fit into complementary cutouts within the opening. In another example, the reef inserts may have be coupled to the walls of the openings based on a stop mechanism, such as threaded components that can be screwed or twisted into matching threads within the opening or any other mechanical fasteners such as bolts, nuts or pins. In another embodiment, the reef inserts have components designed to snap securely into place within the opening or have magnetic attachment, providing a quick and reliable attachment. The reef inserts may have snap-fit tabs or hooks on the inserts that latch onto corresponding features inside the opening. In certain examples, the reef inserts may be inserted using pressure fit, or sliding track or rail mechanism. As noted above, the reef inserts are secured within the opening using marine-friendly adhesives, bonding the insert to the reef structure. This may include epoxy, marine sealants, or other adhesive materials applied to the contact surfaces of the reef insert and the opening.

As shown, the separation between opposite walls or the diameter at the back or lowest point is d and the distance between the opposite walls near the front side of the opening is D. The diameter D is proximate to where the opening meets the outer curved surface of the artificial reef segment and is referred to as the first diameter. The first diameter D is proximate to where the opening meets the inner curved surface of the artificial reef segment and is referred to as the second diameter herein. In an example, due to the tapered design, the distance between the opposite walls at the front of the opening gradually reduces towards the back of the opening. The first diameter D is greater than the second diameter d of the opening.

The artificial reef segment, featuring hexagonal-shaped openings, leverages this geometric configuration to enhance its structural integrity. The hexagonal shape is known for its efficiency in distributing stress and strain across the structure, a principle widely observed in nature and engineering. In the context of the artificial reef, these hexagonal openings contribute to a more uniform distribution of mechanical forces exerted by water currents and waves. This uniform stress distribution is crucial for maintaining the segment's stability and durability under various marine conditions.

When these hexagonal openings are tapered, with a design that narrows from the outermost surface to the inner surface, this feature further reinforces the structural aspect of the reef segment. The tapering creates a channel-like effect, which not only contributes to the overall strength of the structure but also enhances its ability to withstand the dynamic marine environment. The tapered design aids in reducing the direct impact of forces, such as strong underwater currents and wave action, by channeling and dissipating these forces more effectively throughout the structure.

Additionally, the hexagonal arrangement and the tapered channels play a significant role in breaking up wave energy. When waves encounter the artificial reef segment, the hexagonal and tapered structure disrupts the wave's energy, causing it to be diffused and dissipated over a larger area. This is particularly important for the protection of marine life and the conservation of reefs and living shorelines. By reducing the power and impact of waves, the artificial reef provides a calmer and more stable environment for marine organisms, including corals and fish. This stability is essential for their growth and survival, as excessive wave force can cause physical damage to delicate marine species and disrupt their natural habitats.

Furthermore, the reduction in wave energy contributes to the preservation of existing natural reefs and living shorelines. By acting as a buffer, the artificial reef segment mitigates coastal erosion and protects the shoreline from the damaging effects of strong waves and storm surges. This is vital for maintaining the integrity of coastal ecosystems and for the long-term sustainability of the shorelines that are crucial for both ecological balance and human activities.

Additionally, the tapered channel design within the artificial reef segment plays a crucial role in the efficient fitting and retention of multiple inserts. The channels, which narrow from the outermost surface towards the inner surface, create a conical shape that is ideally suited for holding the inserts snugly in place. This tapering ensures that as an insert is positioned within the channel, it fits more tightly and securely the further it is inserted, providing a stable and secure fit. The incorporation of multiple inserts stacked within a tapered channel presents a unique structural feature. This configuration allows for the sequential placement of inserts, each conforming to the tapering geometry of the channel, thereby ensuring a secure and precise fit. The layered arrangement of these inserts within the channel is critical for several reasons.

Firstly, this stacking technique provides enhanced habitat complexity within the reef segment. Different layers can be tailored with varying characteristics, such as surface texture or material composition, to suit diverse marine species and ecological needs. This multifaceted approach to habitat creation offers a significant improvement in fostering biodiversity compared to more uniform, single-layer designs.

Additionally, the capacity to stack multiple inserts in a tapered channel allows for greater customization and adaptability of the reef segment. Depending on the specific environmental requirements or conservation objectives, inserts can be selectively added, removed, or replaced, affording a high degree of flexibility in the configuration of the reef structure.

Furthermore, from a structural standpoint, the snug fitting of inserts within the tapered channel contributes to the overall stability and durability of the reef segment. The tapered design ensures that each successive insert is firmly secured, enhancing the segment's ability to withstand marine environmental forces such as currents and wave action.

The design of these tapered channels simplifies the process of installing the inserts. The wider opening at the outermost surface allows for easy initial placement of the inserts, while the narrowing channel naturally guides and positions the insert as it is pushed inward. This feature is particularly beneficial in ensuring that the inserts are correctly and securely positioned within the reef structure, minimizing the risk of misalignment or displacement under marine conditions.

Furthermore, the snug fit provided by the tapered channels is essential for the long-term stability of the inserts within the artificial reef segment. Once in place, the inserts are less likely to move or dislodge, even in the presence of strong currents or wave action. This stability is vital for the overall effectiveness of the reef system, ensuring that the inserts remain in their intended positions to provide continuous ecological benefits, such as supporting coral growth and offering protection to marine life.

The habitat module or reef insert may be positioned at different heights within the opening based on the diameter of the reef inserts. The diameter of the reef inserts are also referred to as a third diameter. In certain embodiments, the third diameter is sized to fit within a channel defined by a tapered portion of the first opening such that the artificial reef insert is retained within the channel. For example the reef insert may be positioned in the middle of the opening as depicted in FIG. 4A. In another embodiment, as shown in FIG. 4B, the reef insert may be positioned towards the top of the opening closer to the front end of the opening to create a flush surface. The reef insert in such a configuration aligns seamlessly with the surrounding structure, resulting in a smooth and level surface. The flush surface encourages a smoother flow of water over the reef structure and minimizes drag and water turbulence over the reef structure. This reduces stress on the artificial reef in dynamic marine environments, promoting stability and longevity. The smooth and flush surface provides an ideal substrate for encrusting organisms, such as corals, sponges, and algae. These organisms can attach and grow across the surface, contributing to the development of a diverse and thriving ecosystem.

Figures 4D, 4E:
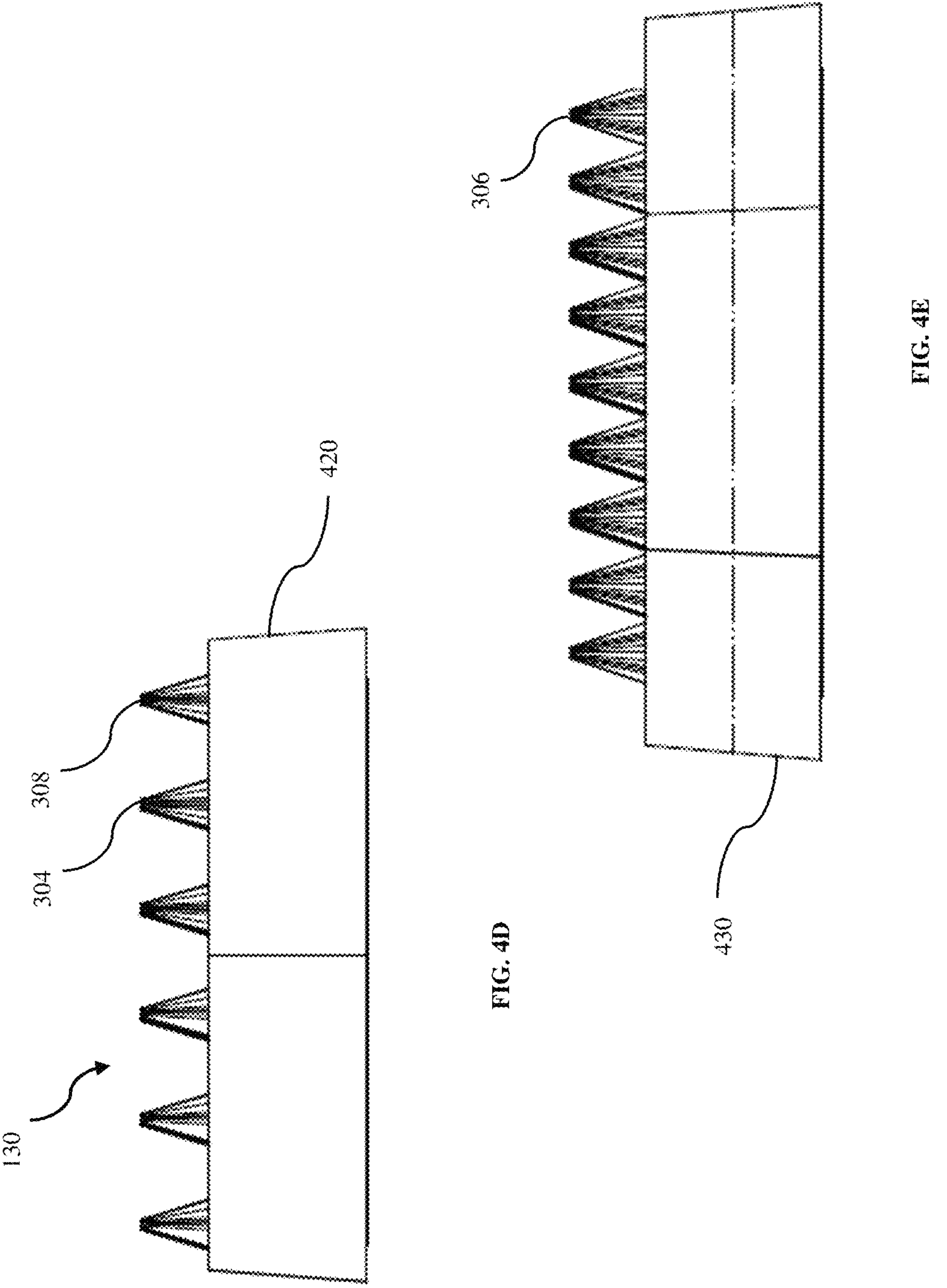

In another embodiment, FIGS. 4D and 4E illustrate the side views of the artificial reef segment having the reef insert, such as the insert with pyramidal protrusions, when the reef insert is placed towards the top of the opening 130. As shown, the protrusions 304, 308 extend out from the opening 130 in FIG. 4D from a portion 420 of the artificial reef segment in a side sectional view. FIG. 4E shows the protrusions, for instance protrusion 306 extending out of the opening 130 from the portion 430 of the artificial reef segment. Such protrusions extending out the opening can mimic natural features, such as rocks or coral branches, creating a more complex and habitat-rich environment within the artificial reef. This complexity attracts a greater diversity of marine life, including fish, invertebrates, and algae. The protrusions create additional shelter spaces for fish and other marine organisms. These features may serve as ideal locations for fish to seek refuge from predators or as spawning sites, contributing to the reproductive success of certain marine species.

In another embodiment, two or three habitat modules or reef inserts may be disposed within the same opening at a distance from each other. FIG. 4C shows three reef inserts 202, 206 and 208 positioned within the same opening for increased surface area and density of structure provided for marine organisms to attach and grow. The two or three inserts can be of the same type or can be of different types depending on the surface area and the density of structure required. For example, the top two reef inserts can be three-dimensional web like structures and the third reef insert may be pyramidal protrusion. The two or three inserts in one opening allows for efficient use of space within the artificial reef segment and enhance the resilience of the artificial reef to disturbances. If one insert is damaged or dislodged, the other two inserts may continue to provide habitat and support the ecosystem. In another example, the reef inserts may have structure having a base with no openings and are used as fillers. When disposed within the opening 130, the reef inserts close the opening 130 of the artificial reef segment.

Figure 4F:
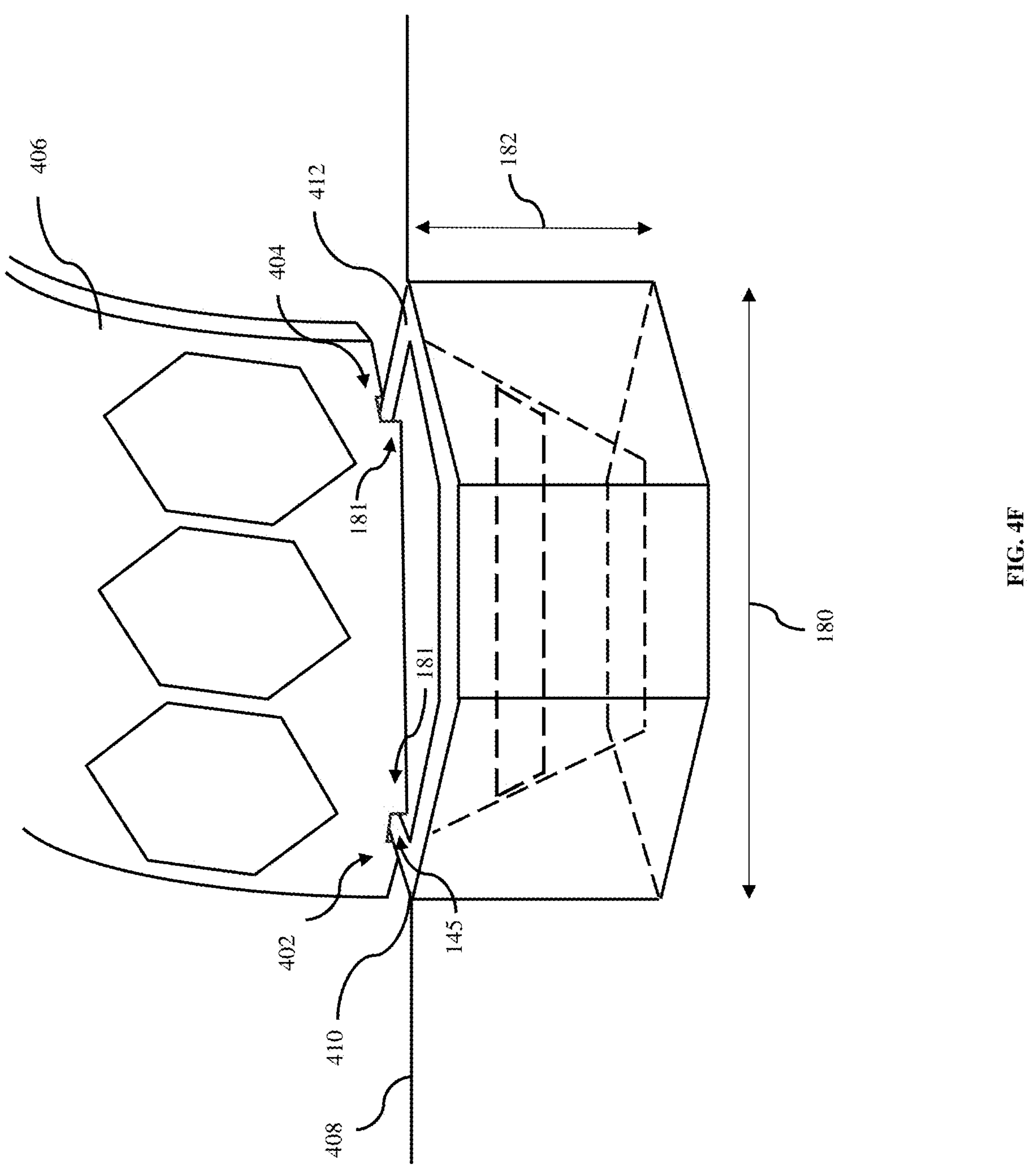

FIG. 4F shows the interlocking portions 402 and 404 where one reef segment 406 is affixed with another reef segment 408. For ease of explanation, a hexagonal structure 410 of the reef segment 408 is illustrated. As noted above, the frame segment 406 is sized to interlock with the openings of the artificial reef segment 408. Each frame segment includes a height 182 and a length 180. The outer portions 181 (illustrated in FIG. 4F) of the frame segments are configured to fit snugly with the openings by use of force, also known as press fitting or interference fitting. The artificial reef segments includes a plurality of cutouts 145 disposed along the terminating end 150 of each artificial reef segment. The cutouts are designed and sized to fit the portion 412 between each hexagonal opening such that the cutout may be inserted onto the portion 412 forming a snug fit. In some embodiments, the cutouts may be angled differently applying different pressures to the openings when in contact. The precise fit of the cutouts ensures a snug connection, reducing the risk of movement caused by water currents or external forces. Such interlocking allows stacking of reef segments on top of each other and attaching in a side by side manner. The connected segments distribute loads and stresses more uniformly, making the artificial reef less susceptible to breakage or failure. The interlocking design simplifies the installation process. Aligning and connecting the reef segments becomes more straightforward compared to other connection methods.

Figures 5A, 5B:
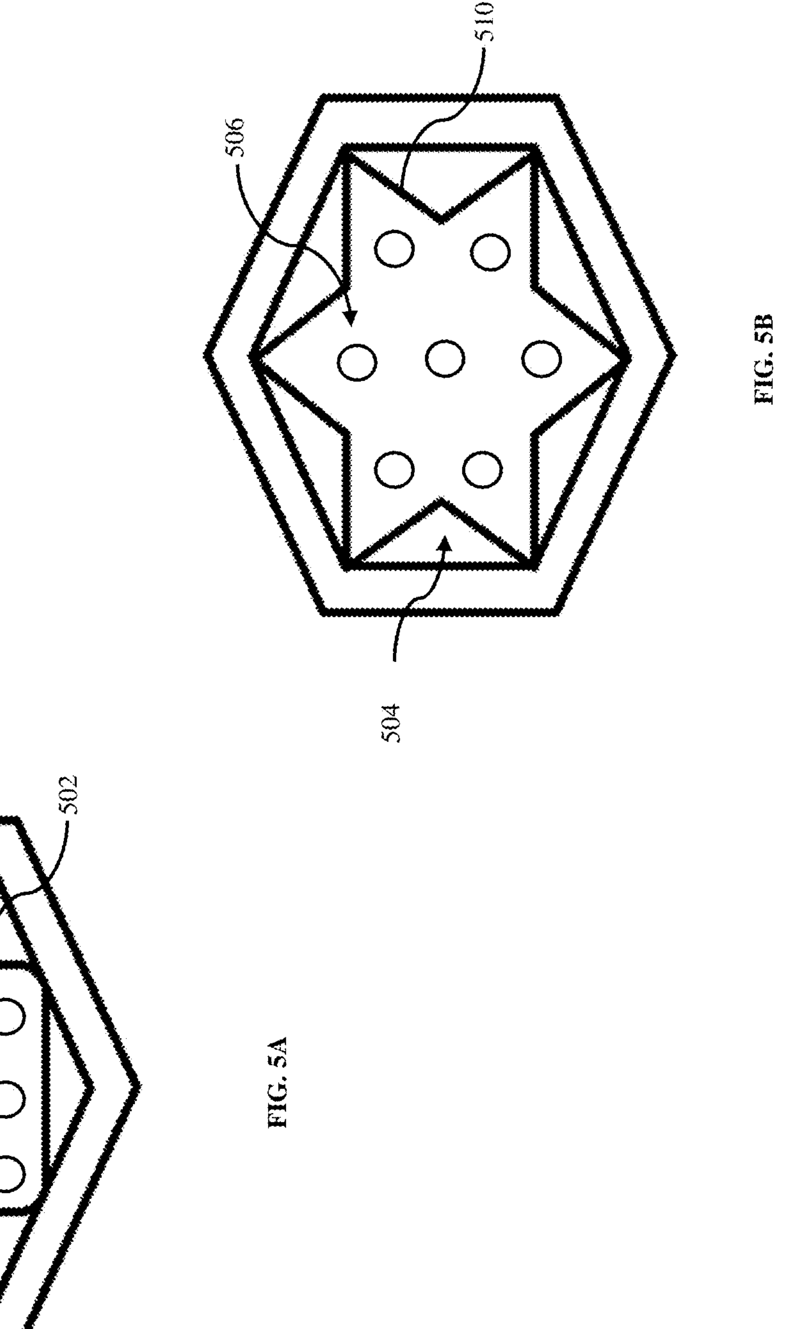
FIGS. 5A and 5B are top schematic views of reef inserts positioned inside an opening of an artificial reef segment, according to an example embodiment.

As noted above, the reef inserts may have same shape as the openings of the artificial reef segment. For instance, the artificial reef insert comprises an insert perimeter designed to correspond with the opening perimeter of the opening such that the shape and structure of the perimeter of the reef insert matches with the perimeter of the opening. The reef inserts engage with the plurality of openings of the artificial reef segment, where the artificial reef insert of the plurality of artificial reef inserts is disposed within a first opening of the plurality of openings. The artificial reef insert comprises an insert perimeter designed to correspond with an opening perimeter of the first opening at the outer curved surface of the artificial reef segment such that the at least one artificial reef insert is securely fit within the first opening. As noted above, the reef inserts have a third diameter sized to fit within a channel defined by a tapered portion of the first opening such that the artificial reef insert is retained within the channel. For example, the reef inserts 202, 204, 206 and 208 have a hexagonal shape to be disposed within the hexagonal opening of the reef segment. In this configuration, each outer side of the reef insert abuts an inner wall of the opening, such that each inner wall of the opening is in contact with a portion of the reef insert. In other embodiments, the reef inserts may have a different shape and the outer sides of the reef insert may contact fewer inner walls of the openings. For example, in FIG. 5A, the reef insert 502 has a rectangular shape and abuts four inner walls of the hexagonal opening instead of six inner walls. FIG. 5B shows a star shaped reef insert 510 that abuts the vertex points (corners) of the inner walls of the opening. The gaps 504 may allow passage of water and reduce water or current pressure on the reef inserts to maintain a uniform flow of water. The reef inserts also has holes 506 uniformly distributed across the surface of the reef inserts.

Figure 6:
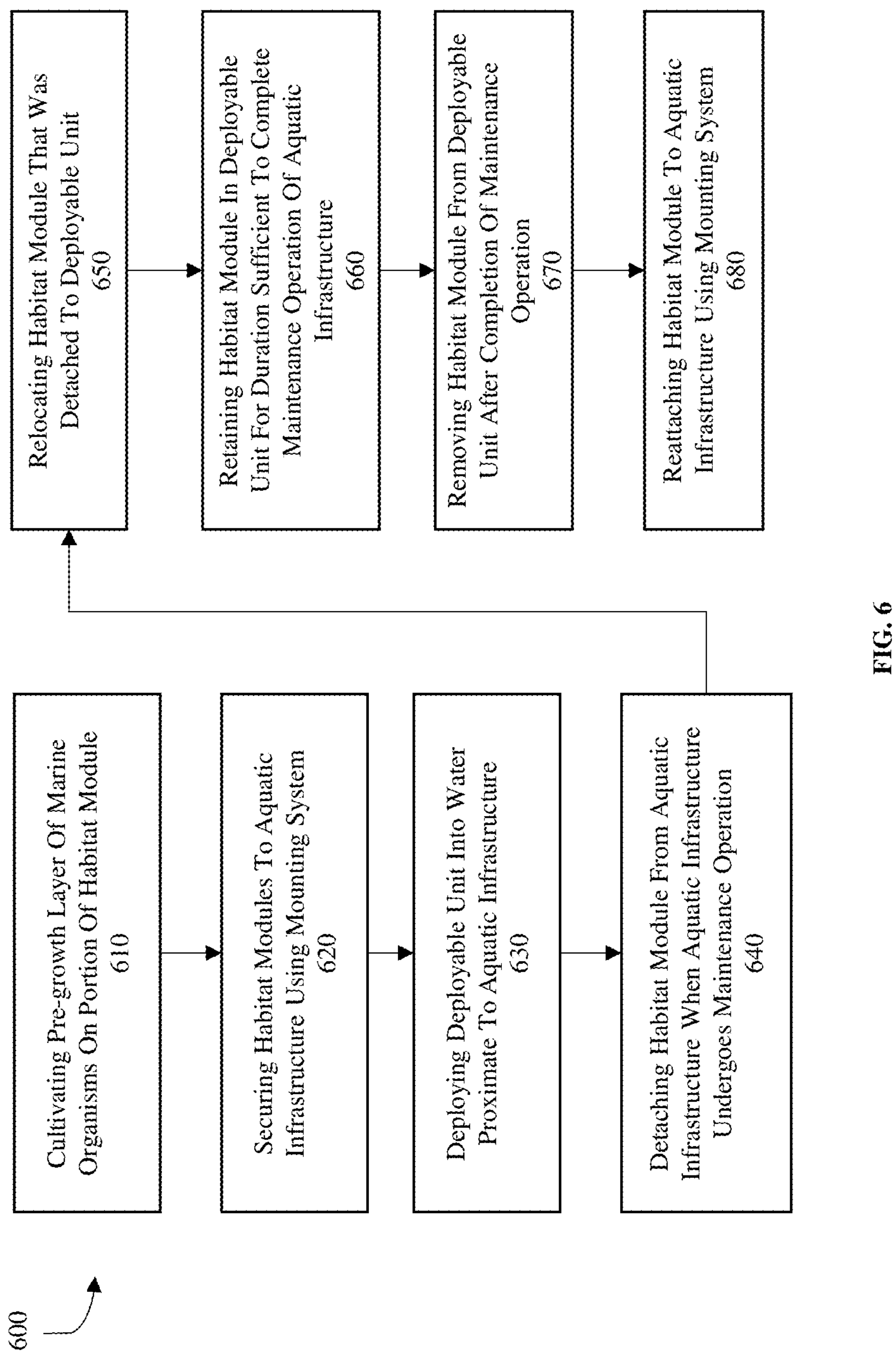
FIG. 6 is flowchart diagram of steps for a method for ecological mitigation, marine life support, habitat relocation, and water quality enhancement is shown, according to an example embodiment.

Referring now to FIG. 6, a method 600 for ecological mitigation, marine life support, habitat relocation, and water quality enhancement is shown, according to an example embodiment. The method 600 includes a series of steps designed to integrate pre-grown marine organisms with aquatic infrastructure, facilitate their temporary relocation during maintenance operations, and ensure long-term habitat stability.

At step 610, the method begins with cultivating a pre-growth layer of marine organisms on at least a portion of a habitat module before installation. The habitat module can be formed from a variety of materials selected for their biocompatibility, durability, and ability to support marine colonization. While calcium sulfoaluminate (CSA) concrete is a preferred material due to its low-carbon footprint, rapid curing properties, and reduced alkalinity, alternative materials may be used to optimize ecological integration and structural performance in different marine environments. Calcium sulfoaluminate (CSA) concrete represents a significant improvement over prior art materials used in artificial reef structures and marine habitat systems due to its enhanced durability, lower carbon footprint, and superior compatibility with marine life. Traditional Portland cement-based concrete, commonly used in artificial reef applications, has high alkalinity, which can inhibit early-stage marine growth and slow the colonization process. In contrast, CSA concrete has a lower pH after curing, making it more biologically hospitable for coral larvae, oysters, and filter-feeding organisms. Additionally, CSA concrete offers faster setting times and greater sulfate resistance, which is particularly beneficial in high-salinity environments where conventional concrete may degrade over time. Unlike prior art structures that rely on simple cast concrete forms or prefabricated ornamental reef units, the disclosed habitat module utilizes advanced mold-based manufacturing processes and, in certain embodiments, specialized 3D printing techniques. These fabrication methods allow for precise control over porosity, surface texture, and structural complexity, optimizing the habitat module for marine organism attachment, water flow regulation, and predator protection. In some embodiments, 3D printing with CSA concrete enables the creation of intricate geometries, including interlocking tessellations, biomimetic coral-like surfaces, and strategically placed apertures that enhance ecological function. This ability to customize structure and porosity at a fine scale represents a major improvement over prior art, where artificial reef structures often consist of basic geometric forms with limited adaptability for specific marine environments. By integrating CSA concrete with innovative mold-based and additive manufacturing techniques, the disclosed system provides a biologically optimized, structurally durable, and ecologically beneficial solution for marine habitat restoration and enhancement.

Marine-grade concrete formulations, such as modified Portland cement concrete with pozzolanic additives, silica fume, or fly ash, can also be utilized to enhance sulfate resistance and reduce the pH levels that may otherwise inhibit early-stage marine growth. Another alternative is geopolymer concrete, a low-carbon, cement-free material derived from industrial byproducts such as fly ash or slag, which offers enhanced chemical stability and lower environmental impact while still providing a suitable substrate for marine organisms.

In some embodiments, the habitat module may be formed from calcium carbonate-based materials, which naturally mimic the composition of coral reefs and shells, making them ideal for supporting coral recruitment, oyster settlement, and barnacle attachment. This may include engineered limestone, crushed shell aggregates, or biologically enhanced concrete mixtures that actively promote marine calcification and encrusting organism attachment. Additionally, ceramic composites and bioactive glass materials may be used to enhance surface porosity and encourage biofilm formation, accelerating marine life colonization.

For lightweight or modular applications, the habitat module may be constructed using high-density polyethylene (HDPE), biopolymeric resins, or recycled ocean plastics. These materials offer corrosion resistance and structural flexibility, making them suitable for temporary or reconfigurable habitat installations. In certain embodiments, 3D-printed composite materials incorporating biodegradable polymers, calcium-based binders, or porous ceramic matrices can be used to create customized surface geometries that optimize water flow, nutrient retention, and marine organism attachment.

The selection of materials depends on the specific environmental conditions, habitat goals, and intended lifespan of the habitat module. Unlike prior art, which often relies on static, ornamental reef structures made from chemically inert materials, the disclosed system incorporates engineered substrates that actively promote biological growth, enhance durability in marine environments, and facilitate long-term habitat stability. By offering a range of material options, the habitat module can be tailored to different ecological requirements, ensuring maximum effectiveness in restoring and preserving marine ecosystems.

The pre-growth process is conducted in a controlled aquatic environment, such as a land-based marine tank, a floating ocean nursery, or an offshore hatchery, where conditions are optimized for marine recruitment and early-stage growth. Each habitat module includes a pre-growth of marine organisms, which is cultivated prior to installation to accelerate ecological integration and enhance marine biodiversity. "Pre-growth" refers to the intentional cultivation and establishment of marine organisms on the habitat modules before their deployment into the aquatic environment, such as a seawall. The pre-growth process may include seeding the modules with marine biofilm, algae, coral fragments, or other benthic organisms in a controlled environment, thereby promoting initial biological colonization. The habitat modules are conditioned in a marine nursery facility, aquaculture lab, or controlled aquatic environment, where marine organisms adhere, propagate, and establish an initial biological layer prior to deployment. This pre-growth process enables beneficial microorganisms and coral larvae to form early-stage attachments and symbiotic relationships, enhancing the module's viability in a natural setting.

In some embodiments, the pre-growth of the habitat modules includes coral propagation and integration, wherein coral fragments obtained through fragmentation, microfragmentation, or larval settlement techniques are affixed to the module surfaces. The coral fragments may be secured using biodegradable adhesives, natural binding agents, or mechanical fastening systems designed to promote adherence and outgrowth. The habitat modules may incorporate porous, textured, or biomimetic surfaces that facilitate coral settlement, attachment, and expansion. The pre-growth phase continues until the corals reach a threshold level of structural stability and resilience suitable for transplantation into the target aquatic environment.

Once pre-growth is completed, the habitat modules are transported to the installation site and removably secured to an existing aquatic infrastructure, such as artificial reefs, underwater platforms, docks, or natural substrates. The system includes a mounting mechanism that allows for selective placement, removal, reconfiguration, and replacement of individual habitat modules, thereby enabling dynamic habitat enhancement and restoration of degraded marine ecosystems. The modular and relocatable nature of the system allows for adaptability in response to environmental changes, conservation needs, and site-specific requirements. By pre-seeding the habitat modules with marine organisms prior to installation, the disclosed system reduces initial ecological stress, increases survival rates of transplanted organisms, and promotes rapid biological integration, thereby improving the effectiveness of marine conservation and ecological restoration efforts.

In certain embodiments, the pre-growth layer covers a substantial portion of the habitat module, exceeding 50% of its surface area, ensuring a well-established biological foundation before deployment. The disclosed pre-growth approach represents a significant improvement over the prior art, which primarily relies on ornamental plates or artificial reef structures that lack biological preconditioning and depend on passive colonization by marine organisms over time. Conventional systems merely introduce inert substrates into the aquatic environment, hoping for natural recruitment of algae, coral larvae, or other benthic organisms, a process that is often slow, unpredictable, and susceptible to environmental stressors. In contrast, by actively cultivating marine biofilm, algae, and coral fragments in a controlled environment before deployment, the disclosed system ensures that the habitat modules are already biologically active and ecologically functional at the time of installation. This method accelerates the development of new reef structures and marine colonies, promoting ecological restoration with greater efficiency and reliability. Additionally, the pre-growth process allows for controlled monitoring of organism health and adaptation, ensuring that only viable, resilient marine life is transplanted into the target habitat. Unlike traditional artificial reef components, which are fixed in place and non-relocatable, the disclosed system's modular and removable design enables strategic deployment, reconfiguration, and relocation as needed, allowing for adaptive conservation strategies in response to changing environmental conditions or specific restoration goals.

The modular and relocatable nature of the disclosed pre-grown habitat system provides a critical advantage in addressing environmental threats such as coral bleaching, which occurs when stressed corals expel their symbiotic algae, leading to loss of color, weakened structures, and increased mortality. Unlike traditional artificial reef structures that remain fixed in place and rely on passive regeneration, the disclosed system allows for the removal of damaged or non-viable coral modules and their replacement with healthy, pre-grown habitat modules. This capability enables targeted restoration efforts, where bleached or dying corals can be safely extracted without disrupting the surrounding ecosystem, and new, preconditioned, biologically active modules can be seamlessly integrated into the habitat. By pre-growing resilient coral species in controlled conditions, including those with enhanced thermal tolerance or stress resistance, the system provides a proactive and adaptive approach to reef restoration, climate resilience, and marine habitat conservation, ensuring that degraded reef areas can be rapidly rehabilitated without relying solely on natural recovery processes, which may be slow or ineffective in the face of ongoing environmental pressures.

In one embodiment, the habitat modules are submerged in saltwater tanks seeded with coral larvae, oyster spat, barnacle larvae, or other filter-feeding organisms. The water in these tanks is enriched with plankton, dissolved calcium, and other nutrients, encouraging natural settlement and adherence to the CSA concrete surface. Coral larvae and oyster spat preferentially anchor within the textured surface, apertures, and protrusions of the habitat module, enhancing structural integration and biological resilience. The modules remain in these tanks for several weeks to months, depending on the species being cultivated and environmental conditions.

In another embodiment, the habitat modules are placed in a floating marine nursery near an active reef or estuarine habitat, where they are exposed to naturally occurring marine life recruitment cycles. This method capitalizes on ambient coral spawn, algal settlement, and filter-feeder colonization, ensuring that the organisms establishing themselves on the module are native to the deployment site, reducing ecological adaptation stress. In some cases, pre-growth is further accelerated by introducing bio-enhancing coatings or microbial seeding techniques to stimulate additional marine growth.

By the end of the pre-growth period, the habitat module has a biologically active surface that immediately contributes to marine ecosystem development upon installation. The pre-grown organisms provide essential ecological functions, including substrate stabilization, water filtration, and habitat creation for additional marine species. Unlike prior art solutions, which are typically deployed as bare artificial surfaces and rely on passive, unpredictable colonization over time, the disclosed method ensures immediate habitat functionality and ecological integration upon deployment.

This pre-growth process represents a significant improvement over the prior art, reducing the time required for marine life establishment, increasing survival rates, and enhancing the overall effectiveness of artificial habitat integration with coastal infrastructure. In certain embodiments, the ability to pre-grow marine organisms on more than 50% of the habitat module's surface area, and more ideally over 80% of the surface area further distinguishes this method, as it ensures a robust, well-developed marine habitat that is both structurally and biologically optimized for long-term sustainability.

Figure 9:
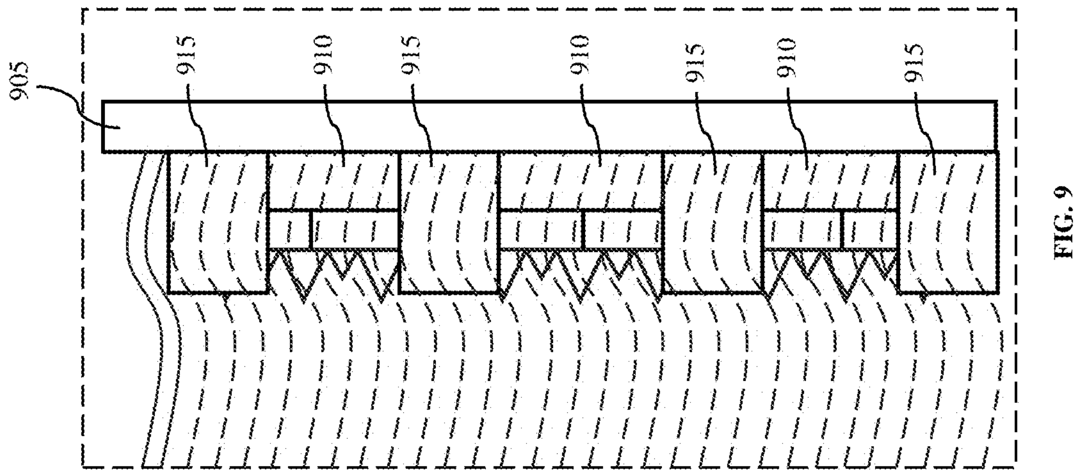
FIG. 9 is a detailed side view of the habitat modules on the aquatic infrastructure, according to an example embodiment.

With reference also to FIG. 9, at step 620, the method includes securing a plurality of habitat modules 905 to an aquatic infrastructure 910 using a mounting system. FIG. 9 is a detailed side view of the habitat modules on the aquatic infrastructure. The mounting system is configured to removably secure each habitat module while maintaining a gap between the habitat module and the aquatic infrastructure, allowing for continuous water flow, nutrient exchange, and marine life interaction. The aquatic infrastructure may include a seawall, pier, dock, bulkhead, breakwater, revetment, buoy, or other submerged or semi-submerged marine structure. The mounting system includes standoffs 915 or other spacing elements, ensuring that water circulates around and behind the habitat modules, preventing stagnation and promoting filter-feeding species that thrive in moving water conditions. Unlike prior art artificial reef structures that are permanently affixed to infrastructure and lack removability, the disclosed system allows for secure yet temporary attachment, enabling habitat preservation during infrastructure maintenance operations.

The mounting system is designed to removably secure habitat modules or inserts to an aquatic infrastructure while ensuring optimal positioning for water flow, marine organism attachment, and long-term stability. In embodiments where the mounting system is attached to a standard seawall, retaining wall, bulkhead, or other fixed aquatic infrastructure, the system comprises a plurality of standoffs configured to position each habitat module a predetermined distance from the surface of the aquatic infrastructure. These standoffs create a defined gap between the habitat module and the infrastructure, allowing for continuous water circulation and nutrient exchange. The gap is essential for preventing stagnation, enhancing filtration by marine organisms such as oysters and barnacles, and reducing sediment accumulation behind the habitat module. The standoffs may be formed from marine-grade metal, reinforced concrete, or composite materials designed to withstand high-salinity and dynamic marine conditions while maintaining structural integrity.

The standoffs are structural components of the mounting system that serve to position each habitat module a predetermined distance from the aquatic infrastructure, ensuring optimal water circulation, nutrient exchange, and marine life integration. These standoffs may take various forms depending on the installation environment, infrastructure type, and habitat module design. In some embodiments, the standoffs comprise elongated support arms or spacer elements that extend perpendicularly or at an angle from the surface of the aquatic infrastructure. These arms provide a stable, controlled gap between the habitat module and the infrastructure, preventing direct contact and allowing water to flow freely behind and around the module, which is essential for filter-feeding organisms and sediment prevention. The standoffs may be attached via brackets or mounting plates, which are either bolted, welded, or embedded into the infrastructure to create a secure and durable connection point for the support arms or spacer elements.

In certain embodiments, the standoffs are integrated directly into the habitat module itself, forming protruding ridges, bosses, or raised surfaces on the backside of the module. This eliminates the need for separate spacers while still maintaining the required gap for water movement and habitat function. The fastening mechanism securing the habitat module to the infrastructure may include bolts, clamps, interlocking pins, or quick-release mechanisms, allowing the habitat module to be easily detached and relocated when necessary. In some configurations, particularly in high-energy coastal environments, the standoffs incorporate shock-absorbing materials, such as rubberized buffers, polymer dampeners, or composite elastomers, which help reduce impact forces from waves and floating debris, preventing structural damage over time.

Because the standoffs are exposed to saltwater, biofouling, and other harsh marine conditions, they are typically constructed from corrosion-resistant materials such as marine-grade stainless steel, galvanized steel, fiber-reinforced polymers, or CSA concrete, each selected for its long-term durability and ability to support marine growth. In certain embodiments, the standoffs are designed with hydrodynamic or aerodynamic profiles, incorporating curved surfaces, perforations, or streamlined geometries to reduce water resistance and improve nutrient exchange. This design helps prevent sediment accumulation and stagnation behind the habitat module, ensuring a continuously thriving ecosystem. Additionally, for larger installations, such as reef arch mounting systems or deployable piling-based structures, the standoffs may include reinforcing crossbeams, tension rods, or lattice frameworks, providing enhanced structural stability while maintaining proper spacing between modules.

In certain embodiments, the deployable unit itself may serve as the mounting system, eliminating the need for separate mounting structures while simultaneously functioning as both a permanent habitat-supporting structure and a temporary relocation system. For example, in some configurations, a plurality of reef arches may define a seawall or breakwater, with each reef arch comprising a series of receiving sections configured to retain habitat modules or inserts. These habitat modules or inserts can be detached from one reef arch and relocated to another, allowing for temporary or permanent habitat reconfiguration while ensuring continuity of marine life during maintenance or environmental changes.

In embodiments where the deployable unit serves as the mounting system, the configuration of the receiving openings inherently functions as the standoff, ensuring that the habitat module remains spaced between the outer and inner surfaces of the deployable unit. This configuration is particularly beneficial in applications such as reef arches and piling-mounted systems, where habitat modules can be secured within designated openings while still allowing water flow around them. By integrating these modular, durable, and hydrodynamically optimized standoff components, the disclosed mounting system represents a significant improvement over prior art, which often consists of rigid, permanently affixed artificial reef structures that fail to accommodate maintenance, water flow, or habitat adaptability.

Where the aquatic infrastructure comprises a piling, pier support, or offshore foundation, the deployable piling structure itself may serve as the mounting system, incorporating a plurality of receiving sections arranged circumferentially around the piling. The piling arch structure has an inner curved surface to abut the pilling. Said piling structure is an arc segment extending no more than 50%, or 180 degrees, around the piling, or at most semi-circular. This allows the piling arch to attach to an existing pilling and two or more piling arches may be used to fully enclose the piling. For example, if the piling arch is a semi-circular embodiment, then two piling arches may be used to enclose the piling; whereas if the piling arch is an arc segment that is 33% circular, or 120 degrees, then three piling arches may be used to enclose the piling. The piling arches may connect and fasten to each other to secure around the piling.

The receiving sections in said piling arch are configured to retain habitat modules or inserts in a secure yet removable manner, ensuring that marine organisms remain attached to their habitat while the structure is in place. The deployable piling may include reinforcing rings or stabilizing bands to provide structural support while maintaining a permeable and ecologically beneficial surface for marine colonization. In some configurations, hexagonal or geometrically patterned openings are integrated into the mounting structure to optimize water flow, promote nutrient exchange, and enhance marine organism settlement.

Unlike prior art solutions that rely on fixed, permanently affixed artificial reef elements, the disclosed mounting system offers a dynamic and reconfigurable approach to marine habitat integration. The ability to detach and relocate habitat modules or inserts between reef arches, piling-mounted systems, or other deployable units ensures that marine ecosystems can be preserved even during infrastructure maintenance, modification, or environmental adaptation efforts. Furthermore, the modular nature of the mounting system allows for scalable deployment, enabling customized habitat expansion or reconfiguration as needed to support diverse marine life and changing environmental conditions.

In certain embodiments, the reef arch itself functions as both the aquatic infrastructure and the deployable unit, eliminating the need for a separate mounting system while providing a structurally integrated and ecologically beneficial habitat solution. In this configuration, the reef arch is permanently installed as a breakwater, artificial reef, or shoreline stabilization structure, serving as both a protective barrier and a living habitat. The reef arch is designed with a plurality of receiving sections or openings, each configured to removably retain habitat modules or inserts, allowing for modular adaptation and habitat expansion over time. During normal operation, these habitat modules remain securely housed within the reef arch, fostering marine life growth, improving water quality, and enhancing biodiversity. However, when maintenance, reconfiguration, or relocation is required, the habitat modules can be detached and transferred to another reef arch or temporary holding structure without disturbing the established ecosystem. This adaptive approach ensures that marine life is preserved even during environmental changes or infrastructure modifications, a significant improvement over traditional breakwaters and artificial reefs, which are static and lack reconfigurability. Furthermore, by integrating water-permeable openings, hydrodynamic channels, and textured surfaces, the reef arch encourages natural water flow and marine organism colonization, making it an ideal dual-purpose structure that serves as both a deployable unit and a permanent aquatic infrastructure.

By integrating standoffs or functionally equivalent spacing mechanisms, the mounting system ensures that habitat modules are not simply affixed as static elements but are dynamically positioned to optimize ecological function. This approach represents a significant improvement over prior art, which often consists of fixed, non-removable artificial reef structures that fail to account for maintenance needs, water flow optimization, or adaptive reconfiguration. The disclosed mounting system provides a flexible, scalable, and ecologically beneficial solution for integrating marine habitats with human-engineered aquatic infrastructure while allowing for habitat preservation, relocation, and long-term sustainability.

The fasteners used to attach the habitat module to an aquatic infrastructure, such as a seawall, retaining wall, or bulkhead, are critical components of the mounting system, ensuring secure yet removable attachment while maintaining a predetermined gap for water flow and marine life integration. The fastening system may incorporate various mechanical attachment mechanisms, including bolts, clamps, interlocking brackets, or quick-release pins, allowing for modular installation and easy removal during maintenance or habitat relocation. The habitat module may include an aperture for receiving a fastener for securing it to the aquatic infrastructure.

In one embodiment, the habitat module is secured to a concrete or metal seawall using marine-grade expansion bolts or anchor screws, which penetrate the surface of the seawall and engage with pre-formed mounting points on the habitat module. These bolts are typically made of stainless steel, galvanized steel, or corrosion-resistant composite materials to withstand long-term exposure to saltwater, biofouling, and fluctuating environmental conditions. In certain configurations, adjustable mounting brackets may be used, allowing precise positioning of the habitat module to optimize spacing, water flow, and ecological functionality.

In another embodiment, the habitat module may be attached to the seawall using hinged or sliding rail systems, enabling quick detachment and reattachment without requiring manual removal of bolts or screws. This track-based fastening system allows the module to be vertically or laterally repositioned, accommodating changes in water levels, seasonal variations in marine life activity, or specific maintenance requirements. Additionally, the fastening system may include rubberized dampeners or polymer-based gaskets to absorb impact forces from wave action and prevent structural damage to both the seawall and the habitat module.

At step 630, the method includes deploying a deployable unit into the water proximate to the aquatic infrastructure. The deployable unit serves as a temporary retention structure for the habitat modules, ensuring that marine organisms remain in a stable aquatic environment while infrastructure repairs or modifications take place. The deployable unit may take the form of a reef arch, a pillar-mounted structure, or another submerged support structure, depending on the type of aquatic infrastructure being serviced. This step prevents marine organisms from being subjected to the environmental stressors associated with traditional transplantation, such as sudden changes in water temperature, salinity, or flow conditions. Unlike prior art solutions, which require removing marine organisms from their natural habitat and attempting reattachment at a later stage, the deployable unit ensures continued environmental stability and minimizes disruptions to marine ecosystems.

In step 630, deploying the deployable unit refers to the placement, positioning, or securing of the deployable unit in the water near the aquatic infrastructure to serve as a temporary retention structure for habitat modules during maintenance or environmental adaptation. The deployable unit may be lowered, submerged, anchored, or affixed in the aquatic environment in a manner that ensures structural stability while keeping it accessible for habitat module transfer and retrieval. Depending on the application, the deployable unit may be free-floating, anchored to the seabed, secured to a structural support, or integrated into a larger breakwater or reef system.

The term "proximate to the aquatic infrastructure" means that the deployable unit is positioned close enough to the original location of the habitat modules to minimize environmental stress on the marine organisms housed within them. This proximity ensures that the water conditions-such as salinity, temperature, flow dynamics, and nutrient availability remain consistent, preventing the shock or disorientation that marine life might experience if relocated to a distant artificial reef or holding tank. In one embodiment, a reef arch or temporary structure is placed within meters of the original installation site, ensuring that the habitat modules remain in the same ecological zone. In another embodiment, where the aquatic infrastructure is a piling, pier, or bridge support, the deployable unit may be attached directly to an adjacent piling or positioned along the seabed nearby.

By deploying the unit proximate to the aquatic infrastructure, the system provides a seamless transition for marine life, maintaining habitat continuity and ecological stability while allowing for infrastructure repairs, modifications, or environmental adjustments without disrupting the surrounding ecosystem.

In one example, consider a seawall in a coastal environment undergoing structural repairs or reinforcement due to erosion, storm damage, or routine maintenance. If habitat modules have been installed on the seawall to support marine life, those modules must be temporarily removed to prevent damage during the maintenance process. In step 630, a deployable unit, such as a modular reef arch, is deployed in the water proximate to the seawall, serving as a temporary retention structure for the habitat modules.

In some embodiments, the deployable unit is positioned a few hundred feet offshore, where water conditions remain similar to those near the seawall, ensuring that coral, oysters, and other marine organisms attached to the habitat modules continue to thrive without experiencing significant environmental changes. In other cases, the deployable unit may be moved to a location up to a mile offshore, such as an area with deeper waters, stronger currents, or reduced construction activity, further minimizing disruption to marine life. The exact location of deployment is determined based on factors such as water depth, wave exposure, and ecological conditions to ensure optimal survival and minimal stress on the relocated marine organisms.

For example, if a seawall in a harbor or estuary is undergoing reinforcement, the habitat modules may be temporarily moved to a deployable reef arch positioned 500 feet offshore in a calmer area with reduced wave impact. By deploying the unit proximate to the aquatic infrastructure—whether a few hundred feet or a mile offshore—the system ensures that marine life remains in a familiar, ecologically suitable environment, reducing stress, mortality rates, and disruptions to local biodiversity while allowing for critical infrastructure maintenance.

At step 640, at least one habitat module is detached from the aquatic infrastructure when the aquatic infrastructure undergoes a maintenance operation. The detachment process is facilitated by the mounting system's removable fastening components, which allow the habitat modules to be efficiently removed without damaging the pre-grown marine organisms. This step is critical in ensuring that marine life is not inadvertently destroyed during maintenance activities. In contrast, prior art solutions typically do not account for removability, meaning that once marine life colonizes an artificial reef element attached to an aquatic structure, it is permanently fixed and susceptible to destruction during necessary repairs. The disclosed system protects established marine growth by enabling controlled detachment and relocation.

At step 650, the at least one detached habitat module is relocated to the deployable unit, where it is securely retained in receiving sections specifically designed to accommodate the habitat modules. The deployable unit remains in close proximity to the original installation site, ensuring that marine organisms continue to experience the same environmental conditions during the maintenance process. Unlike traditional relocation methods that involve transporting marine life to distant artificial reef sites or land-based holding tanks, this system eliminates unnecessary environmental shock by keeping the habitat modules within the same water column, nutrient cycle, and ecological system. By preventing drastic environmental changes, this step significantly improves the survival rate of relocated marine organisms, compared to prior art approaches that result in high mortality due to environmental stress.

At step 660, the habitat modules are retained in the deployable unit for a duration sufficient to complete the maintenance operation of the aquatic infrastructure. The deployable unit acts as a temporary artificial reef, ensuring that marine organisms can continue their normal biological processes while detached from the main structure. The ability to retain marine life in a stable environment during maintenance eliminates the need for expensive and labor-intensive mitigation strategies, such as constructing separate artificial reef structures solely for temporary relocation. Furthermore, this step avoids habitat fragmentation, a common issue with prior art solutions, by keeping the marine organisms in a familiar ecological setting.

At step 670, after completion of the maintenance operation, the habitat modules are removed from the deployable unit. Since the deployable unit has maintained the marine life in a controlled, undisturbed environment, there is no need for additional adaptation or reattachment processes, as is often required when relocating coral or other marine organisms in traditional mitigation efforts. The ability to remove the habitat modules without disturbing the marine life further enhances the system's efficiency and long-term viability.

At step 680, the habitat modules are reattached to the aquatic infrastructure using the mounting system, restoring the habitat to its original condition. The pre-grown marine organisms continue their growth cycle without interruption, and the structure resumes its function as a living aquatic habitat. This step marks a significant improvement over the prior art, where restoration often involves re-transplanting marine life and waiting for recolonization to occur—a process that is both unpredictable and ecologically inefficient. The disclosed system allows for seamless reattachment, minimizing the ecological impact of necessary infrastructure maintenance.

Figure 7:
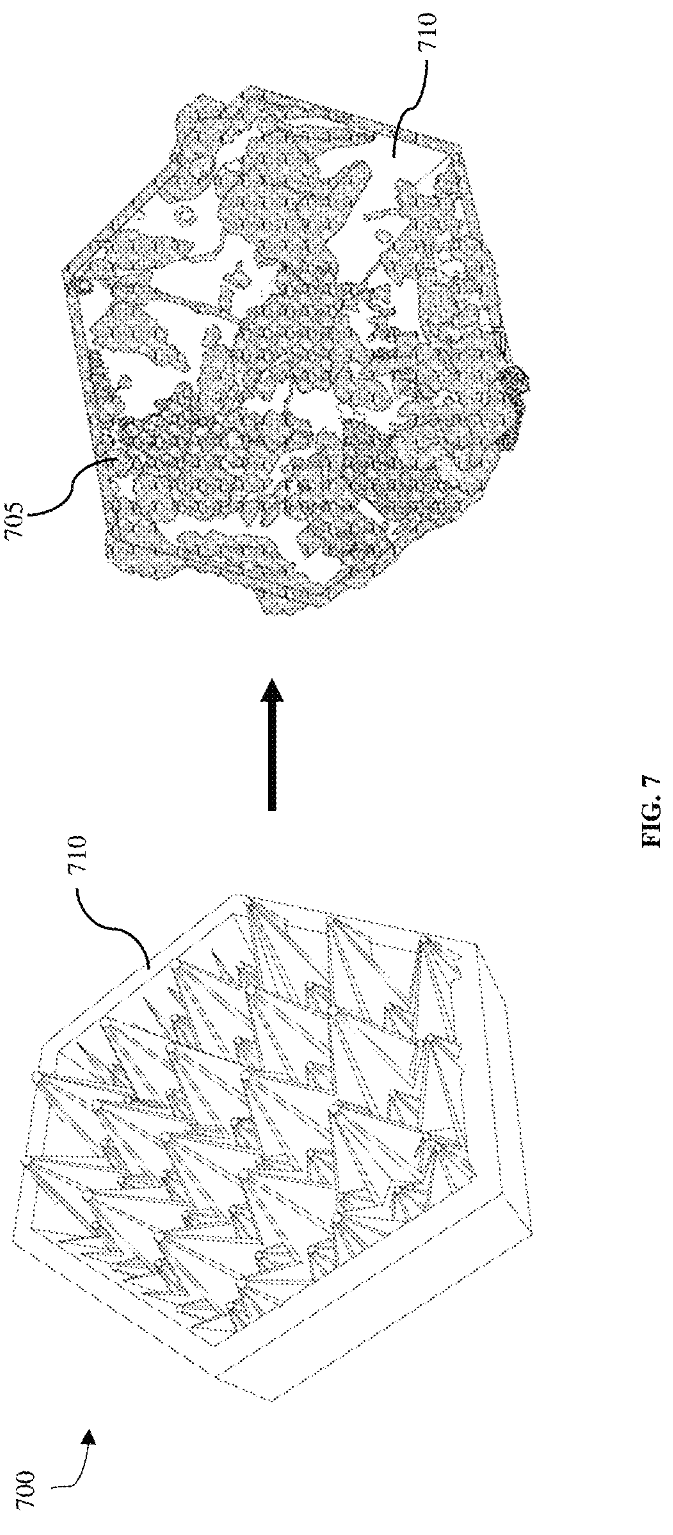
FIG. 7 illustrates the process of cultivating pre-growth in the habitat module, according to an example embodiment.

Referring now to FIG. 7, the process of cultivating pre-growth 705 in the habitat module 700 is shown, according to an example embodiment. The habitat module 700 includes a permeable base 710 configured to support marine life attachment, facilitate water flow, and promote nutrient exchange, ensuring optimal conditions for marine organism colonization. The pre-growth 705 consists of marine organisms such as oysters, barnacles, coral, or other filter-feeding species, which are established on the module prior to deployment. This pre-growth process occurs in a controlled aquatic environment, where the habitat module 700 is submerged in nutrient-rich water and seeded with marine larvae or spat, allowing organisms to anchor and develop before installation into the natural habitat. The permeable base of the habitat module 700 features structured openings and interconnected cavities, which allow for continuous water flow, preventing stagnation and promoting ecosystem health. The permeable base may include apertures, cavities, or structured openings, which facilitate water movement through and around the module, preventing sediment buildup and promoting a dynamic marine microenvironment. The structural design provides protected recesses and three-dimensional surfaces, ensuring a stable foundation for marine life attachment while deterring excessive predation. In some embodiments, the pre-growth 705 covers more than 50% of the habitat module's surface, ensuring that the module is ecologically functional immediately upon installation.

Unlike prior artificial reef systems that rely on passive marine colonization, the disclosed system ensures that marine life is already established before deployment, significantly reducing the time required for habitat integration and ecosystem recovery. Additionally, the modular nature of the habitat module 700 allows for removal and relocation if needed, ensuring that marine life remains undisturbed during maintenance operations. The combination of a permeable base, structured microhabitats, and pre-growth 705 represents a significant improvement over the prior art, enhancing biodiversity, habitat stability, and long-term marine conservation efforts.

An important feature of the habitat module is the pre-growth layer of marine organisms, which covers a substantial portion of the module before installation. This pre-growth process occurs in a controlled aquatic environment, such as a marine hatchery or floating nursery, where the modules are submerged and seeded with coral larvae, oyster spat, barnacle larvae, or other filter-feeding species. The pre-growth layer ensures that the module is ecologically functional upon deployment, eliminating the reliance on passive colonization seen in prior art, which can be slow and unpredictable. In certain embodiments, more than 50% of the module's surface is pre-colonized, providing immediate habitat benefits and promoting rapid ecosystem integration upon placement in the natural environment. The module's internal structure further enhances marine growth by offering protected recesses, protrusions, and interlocking geometries that create microhabitats for diverse marine species. These features provide refuge from predators, enhance water circulation, and create a stable substrate for long-term colonization. Unlike prior artificial reef structures that rely on flat or low-relief surfaces, the disclosed habitat modules incorporate three-dimensional complexity to mimic natural reef formations, ensuring that marine organisms can thrive in a self-sustaining ecosystem.

The disclosed system promotes more sustainable sea life by enhancing habitat efficiency, accelerating ecosystem restoration, and providing long-term reef stability. Unlike traditional artificial reef structures that rely on passive colonization and uncertain marine recruitment, the system integrates pre-grown marine organisms, ensuring immediate ecological functionality upon deployment. The modular and relocatable design further increases efficiency as a habitat restoration system, allowing marine life to thrive without disruption, even during infrastructure maintenance or environmental changes. By incorporating permeable surfaces, structured microhabitats, and predator-resistant features, the system supports a diverse range of marine species, fostering a resilient and self-sustaining reef ecosystem that continues to grow and evolve over time.

Figure 8:
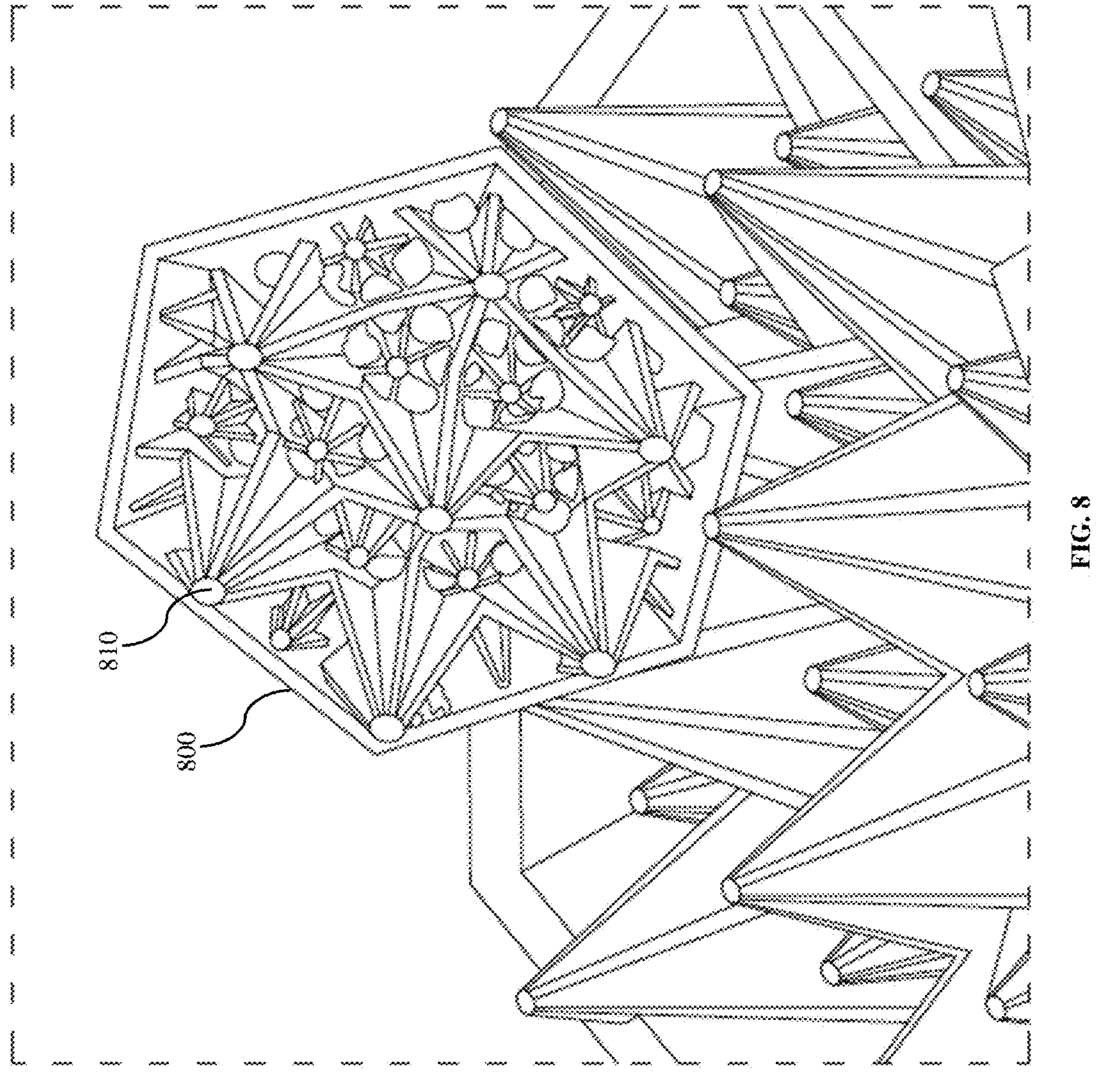
FIG. 8 is a detailed view of an insert is shown, illustrating its tertiary structure and predator-deterrent protrusions, according to an example embodiment.

Referring now to FIG. 8, a detailed view of an insert 800 is shown, illustrating its tertiary structure and predator-deterrent protrusions, according to an example embodiment. The insert 800 comprises a geometric framework with interconnected structural elements, forming a three-dimensional habitat designed to optimize marine life attachment, water flow, and ecological protection. The tertiary structure includes intricate recesses, cavities, and attachment points, which serve as microhabitats for marine organisms such as coral, oysters, and filter-feeding species. The insert further includes protrusions 810 strategically positioned to deter predators, such as grazing fish and invertebrates, which could otherwise damage juvenile coral or filter-feeding organisms. These protrusions extend outward at varying angles and heights, creating protective barriers that limit direct access to vulnerable marine life while still allowing water flow and nutrient exchange. The structural complexity of the insert 800 enhances its ability to function as a self-sustaining reef unit, supporting biodiversity and long-term marine habitat restoration. Unlike prior art solutions that feature flat or low-relief surfaces with limited structural complexity, the disclosed insert 800 maximizes surface area, ecological functionality, and predator resistance, ensuring greater survival rates and more sustainable habitat formation. Additionally, the insert 800 is modular and removable, allowing it to be relocated or replaced as needed, further improving the adaptability and longevity of the system in various aquatic environments.

Figure 10:
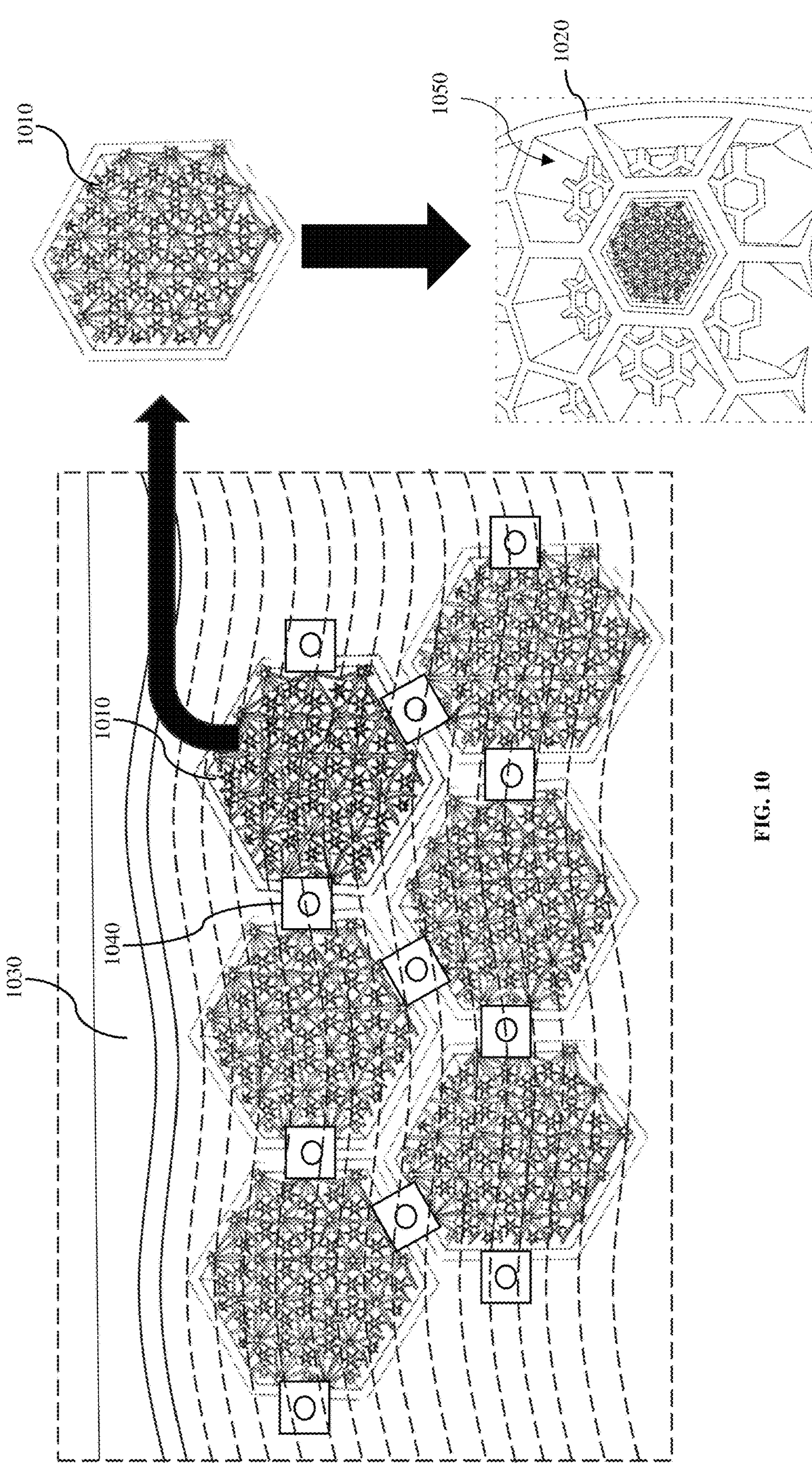
FIG. 10 illustrates the process of transferring inserts to a deployable unit, according to an example embodiment.

Referring now to FIG. 10, the process of transferring inserts 1010 to a deployable unit 1020 is shown, according to an example embodiment. The inserts 1010 are initially secured to a seawall 1030 using a mounting system comprising standoffs 1040, which maintain a predetermined gap between each insert 1010 and the seawall 1030. This gap facilitates water circulation, nutrient exchange, and sediment prevention, ensuring optimal conditions for marine life attachment and growth while also reducing the buildup of biofouling on the seawall surface itself. The inserts 1010 are installed substantially below the waterline, with some embodiments placing them entirely below the water surface, maximizing exposure to tidal flows, oxygenation, and marine ecosystems that rely on dynamic water movement for nutrient exchange. The standoffs 1040 are designed to provide structural support while allowing easy removal, ensuring that the inserts can be detached without disrupting the growth of marine organisms.

During maintenance or environmental reconfiguration, the inserts 1010 are removed from the seawall 1030 and transferred to the deployable unit 1020, ensuring that marine organisms remain submerged in their natural habitat without experiencing relocation stress due to sudden environmental changes. The deployable unit 1020 features a series of receiving openings 1050 of varying sizes, designed to accommodate inserts 1010 of different dimensions and configurations, allowing for scalable and customizable habitat management. The openings 1050 are configured to retain the inserts securely while still allowing water flow around them, ensuring that marine life remains undisturbed and continues receiving the necessary water movement for survival. The deployable unit 1020 may be anchored to the seabed, affixed to nearby infrastructure, or designed as a free-floating structure, depending on the specific requirements of the site and the species being supported.

Unlike prior art solutions that involve permanent, non-removable habitat structures, the disclosed system enables seamless transfer and temporary relocation of marine life, preventing habitat destruction during maintenance operations and minimizing environmental disruptions. By integrating pre-grown marine life, removable inserts, and a scalable deployable unit, the system ensures long-term habitat sustainability, efficient infrastructure maintenance, and enhanced marine biodiversity. This approach not only allows marine ecosystems to thrive alongside human-engineered infrastructure but also provides a flexible and adaptable solution for integrating artificial reef structures with coastal development projects.

Figure 11B:
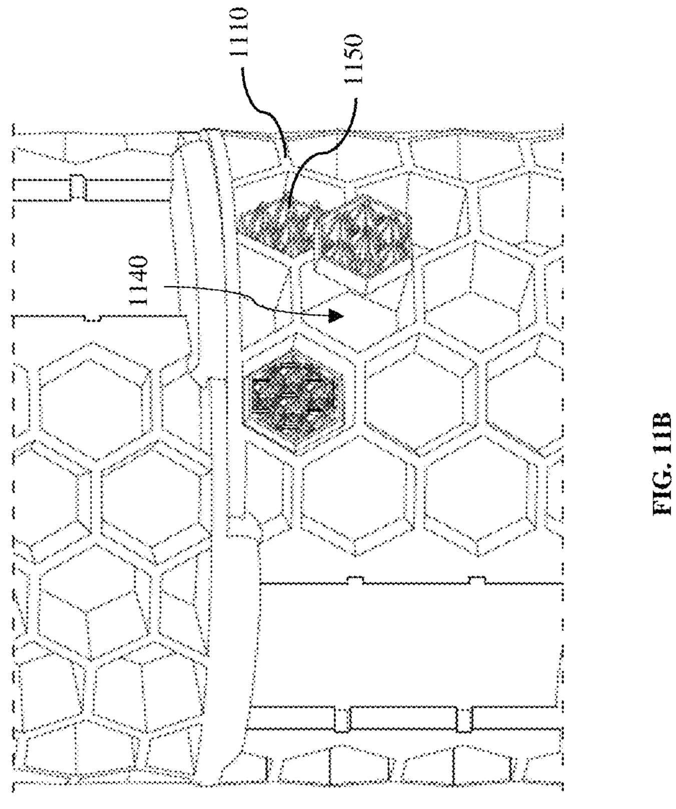
FIG. 11A and FIG. 11B are detailed views of the deployable units on a pillar column, according to an example embodiment.
Figure 11A:
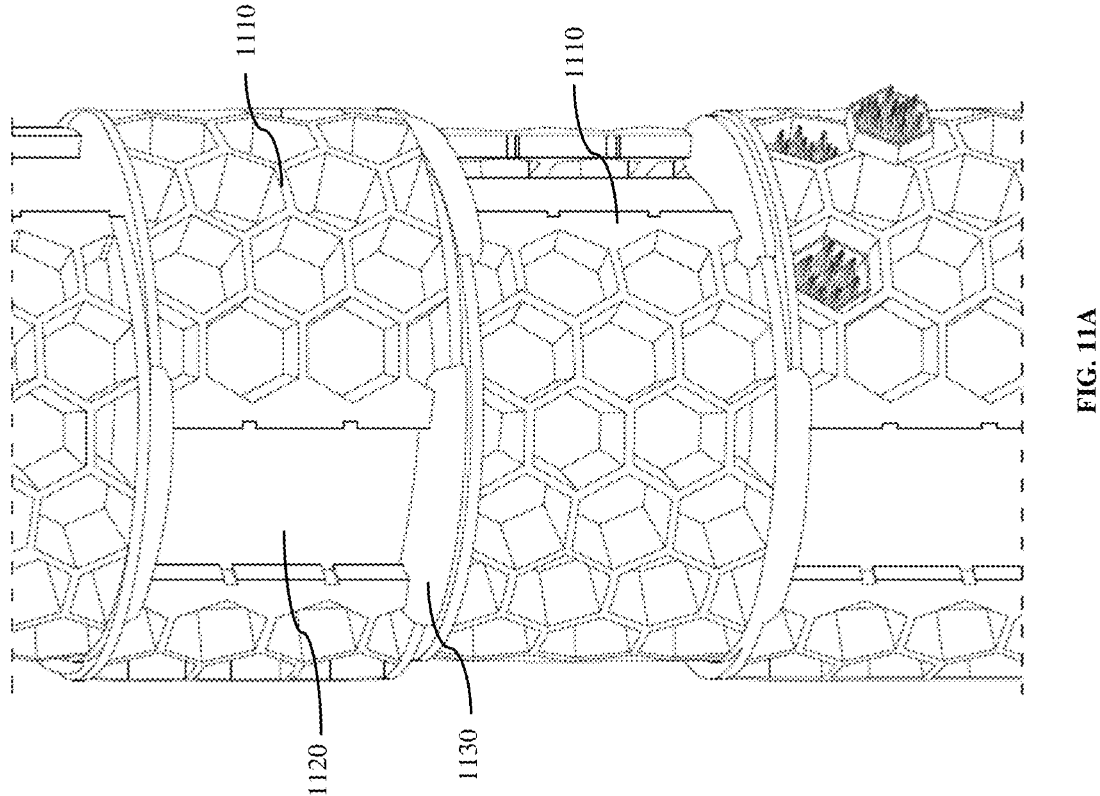

Referring now to FIG. 11A and FIG. 11B, detailed views of the deployable units 1110 on a pillar column 1120 are shown, according to an example embodiment. The deployable units 1110 are a scaled-down version of the reef arch, specifically adapted for installation around a vertical column, such as a piling, pier support, or bridge foundation. This adaptation enables the same ecological and structural benefits as the reef arch but in a more compact, cylindrical configuration. Unlike traditional artificial reef structures that are limited to horizontal or seabed-mounted applications, the deployable unit 1110 is designed to wrap around cylindrical infrastructure, making it highly versatile for use in marine construction projects where space and shape constraints are a factor.

The modular structure of the deployable unit 1110 allows it to be wrapped around the pillar column 1120 and secured using a connector 1130, ensuring a stable and uniform attachment without requiring permanent affixation or structural modification of the existing column. The ability to modularly wrap around a column is only possible due to the uniform inner surface radius of the deployable unit 1110, which enables a consistent and secure fit around the cylindrical column 1120. This uniformity in design ensures structural integrity while maintaining a controlled gap between the deployable unit 1110 and the pillar column 1120, allowing for water flow, sediment movement, and marine life activity between the column and the habitat structure.

The deployable unit 1110 features a plurality of receiving openings 1140, which are strategically configured to retain habitat inserts 1150. These inserts 1150 contain pre-grown marine organisms such as coral, oysters, and barnacles, allowing the system to be ecologically functional upon deployment rather than relying on passive colonization over time. The inserts 1150 are designed to be removable and transferable, enabling seamless relocation between different deployable units or temporary placement in a separate habitat retention structure during maintenance operations. This ensures that marine life remains undisturbed even when infrastructure repairs are necessary, a significant improvement over prior art, which typically requires complete removal of artificial reef elements, leading to habitat loss and increased mortality rates of attached organisms.

FIG. 11B provides a closer view of the inserts 1150, illustrating how they are precisely positioned within the receiving openings 1140 of the deployable unit 1110. The hexagonal framework of the deployable unit 1110 provides structural reinforcement while optimizing water flow and nutrient exchange, ensuring that marine life receives adequate exposure to its natural environment. The placement of the inserts 1150 within recessed cavities enhances their protection against predation and hydrodynamic forces, allowing for greater survival rates and long-term habitat stability. Additionally, the connector 1130 ensures that the deployable unit 1110 remains securely fastened to the pillar column 1120, while still allowing for adjustability or removal if needed.

By adapting the reef arch concept into a pillar-mounted design, the deployable unit 1110 provides a scalable, flexible, and ecologically beneficial solution for integrating marine habitat structures onto existing infrastructure. Unlike traditional static artificial reef components, which are permanently affixed and difficult to maintain, the modular and removable nature of the deployable unit 1110 ensures that marine ecosystems can be preserved, adapted, and expanded over time. The ability to securely fasten, remove, and relocate habitat inserts 1150 within the structure allows for continuous ecological function, even in dynamic marine environments where infrastructure modifications are necessary.

Figures 12A, 12B:
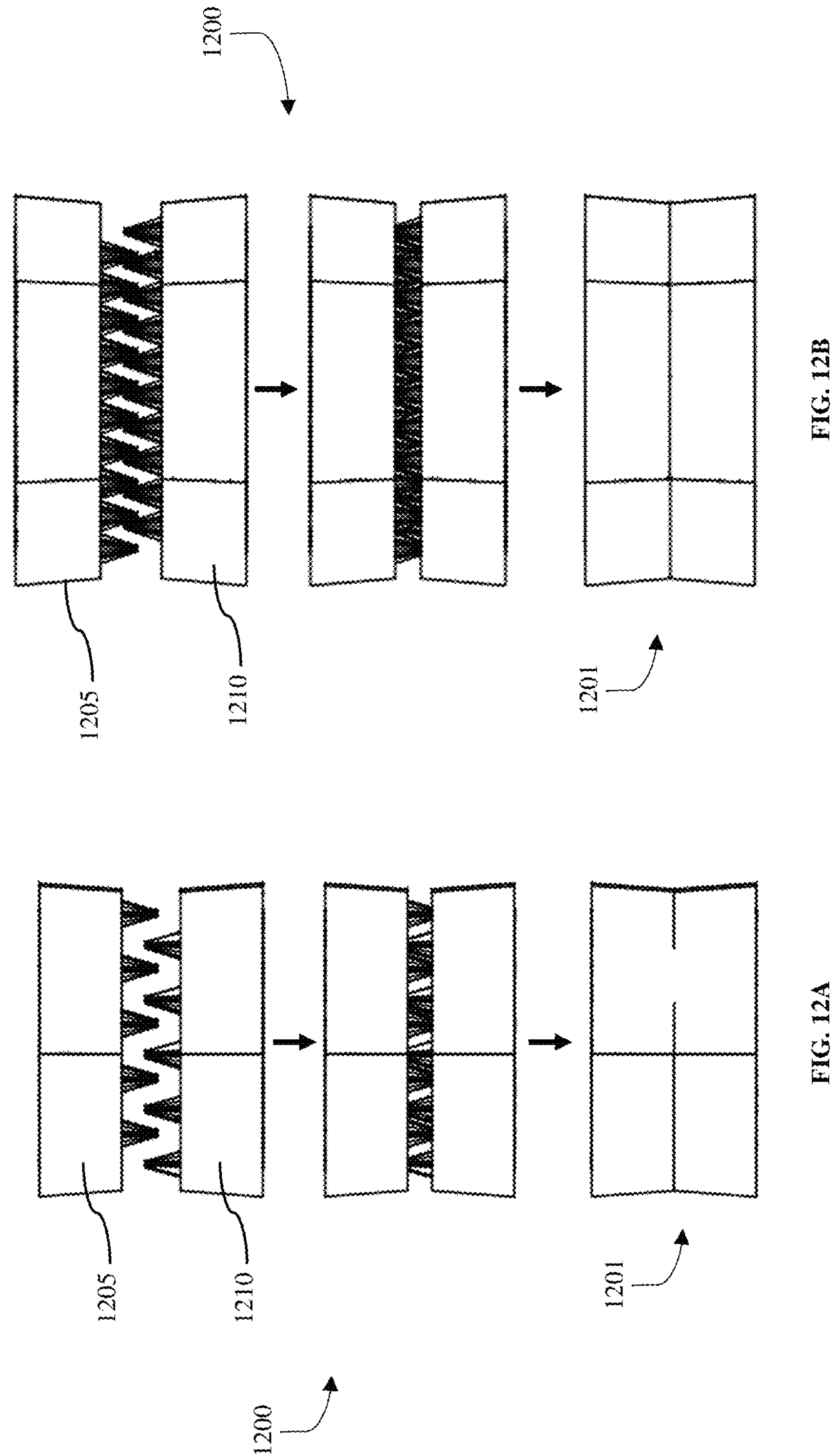
FIGS. 12A and 12B illustrate stacked and nested reef inserts, according to an example embodiment.

Referring now to FIGS. 12A and 12B, illustrated are example embodiments of reef inserts configured for efficient transport and protective nesting, particularly suited for mitigation logistics and large-scale deployment. Each figure demonstrates the process 1200 for a nesting configuration 1201 of habitat modules, wherein the protruding features, such as pyramidal or conical spikes, are strategically offset to enable interlocking and flush stacking when assembled in a transport arrangement. This configuration is critical not only for minimizing the spatial footprint during shipping and handling but also for protecting delicate structural features, such as protrusions, from breakage or abrasion. In FIG. 12A, the upper and lower modules 1205, 1210 are aligned such that the spikes of the upper structure fit into the negative space of the lower structure, enabling a nested engagement that ultimately results in a flush outer profile for transport. This nested configuration shields the internal complexity of the habitat elements, thereby reducing the risk of damage during loading, transport, and deployment. Similarly, FIG. 12B illustrates a more robust or larger-scale variant, where taller or denser protrusions are likewise offset and nested, again resulting in a compact, flush outer shape that facilitates secure stacking and bulk handling.

This nesting concept is particularly significant when considering the logistical realities of deploying mitigation structures at scale, such as transporting units by truck, barge, or container, where volumetric efficiency and structural integrity are paramount. By designing the protrusions with intentional offset and geometric nesting capability, the disclosed system ensures that even complex, three-dimensional habitat modules can be safely and efficiently transported without additional packaging, reinforcement, or disassembly. In practice, the disclosed system not only advances ecological utility but also presents a commercially advantageous improvement that supports broader adoption and feasibility for use in mitigation and restoration contracts. Accordingly, the combination of functional habitat design with logistical efficiency through nesting marks a notable advancement over prior art solutions that either lack protective transportability or rely on permanently affixed components with no modularity.

Figure 13B:
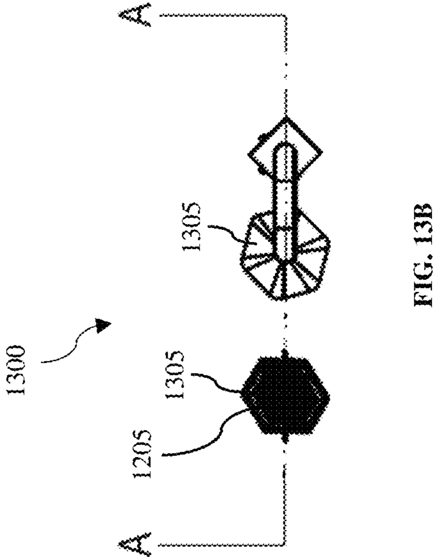
FIG. 13B is a top view of the pre-growth preservation system, according to an example embodiment.
Figure 13A:
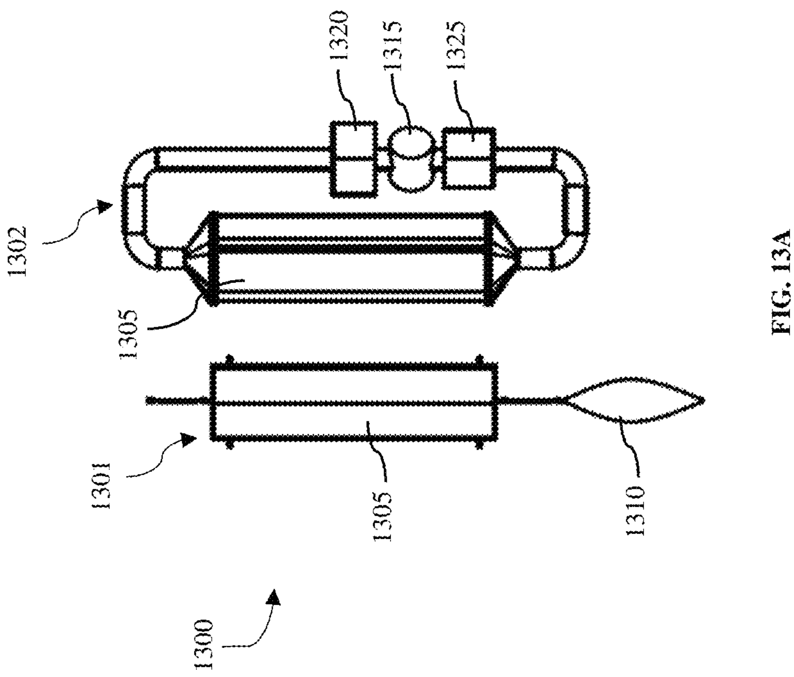
FIG. 13A is a side view of a pre-growth preservation system, according to an example embodiment.
Figure 13C:
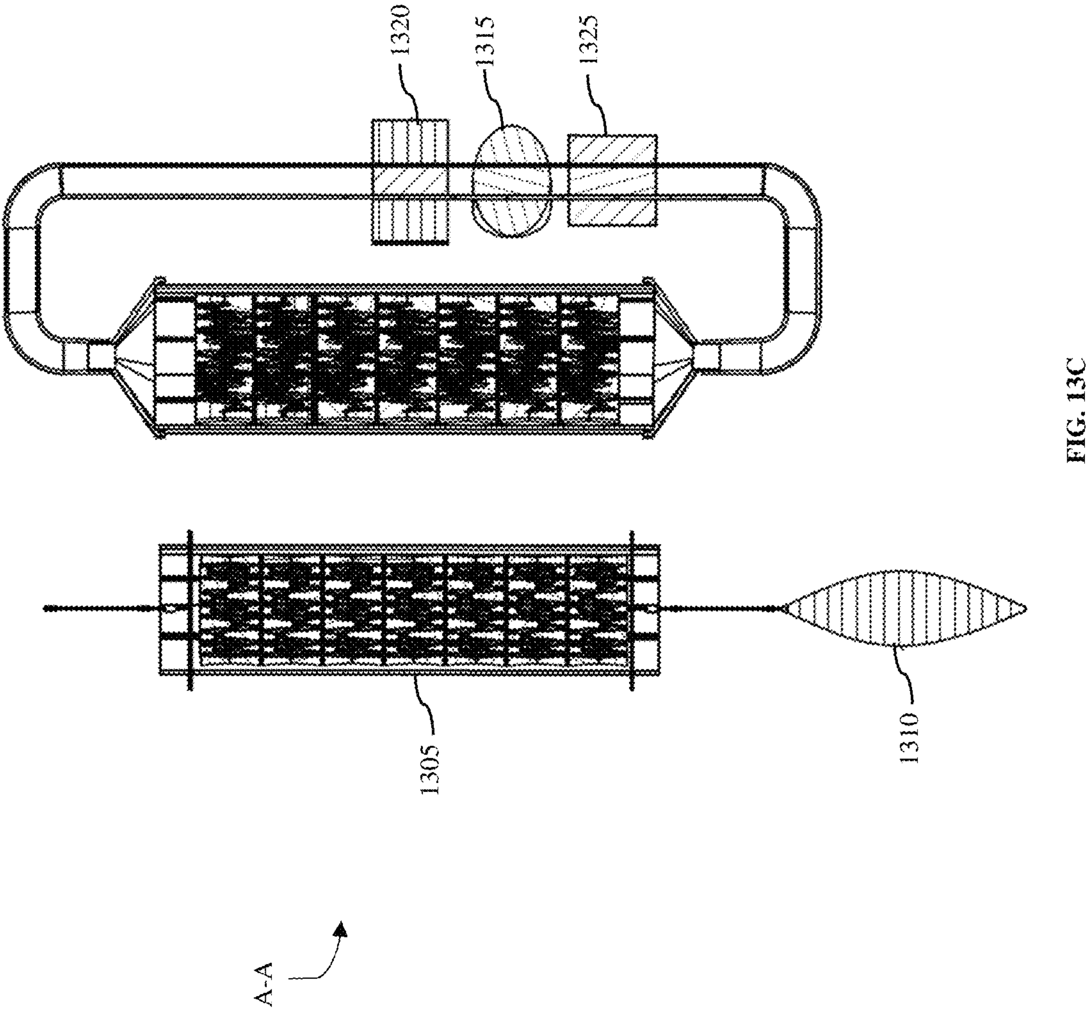
FIG. 13C is a cross-sectional view of the pre-growth preservation system, according to an example embodiment.

Referring now to FIGS. 13A, 13B, and 13C, illustrated is an embodiment of a pre-growth preservation system 1300, configured to sustain and protect stacked and nested reef inserts during the pre-deployment phase and deployment phase. Unlike the mitigation configuration described elsewhere, this system is not used during active infrastructure repair or relocation. Instead, it is specifically designed to preserve the biological integrity of pre-grown marine organisms on the inserts prior to installation, whether in transport, conditioning, or temporary storage. The system builds upon the offset-nesting architecture of the fragile habitat inserts shown in FIGS. 12A and 12B, allowing each insert's protrusions to nest without direct surface-to-surface abrasion, thereby minimizing mechanical damage and preserving biological material.

In FIG. 13A, the system 1300 depicts in both a side view of the of the pre-growth preservation system 1300, including tow-behind model 1301 and a recirculating model 1302. The central body of the unit comprises a cylindrical containment chamber 1305, which houses a vertical stack of reef inserts, oriented face-to-face and nested using their offset geometries. This internal arrangement maintains alignment and structural spacing between inserts while also enabling water flow between them. At the base of the chamber is a hydrodynamic float 1310, which provides buoyancy and stabilization for the entire unit when deployed in aquatic environments. This version is referred to as the tow-behind model, designed to be dragged through water behind a vessel. As it moves, ambient water flows passively through the containment chamber, allowing marine organisms colonizing the inserts to remain submerged in dynamic, real-world conditions such as fluctuating temperature, salinity, and current.

FIG. 13B illustrates a top view of the pre-growth preservation system 1300, showing the internal configuration of the stacked inserts. Specifically, each chamber contains seven vertically aligned face-to-face pairs of inserts, for a total of fourteen inserts per chamber. The spacing between inserts is controlled by their nesting geometry and the chamber's cylindrical wall, ensuring sufficient clearance for water circulation and oxygenation. This structure not only promotes continued viability of the pre-growth layer but also protects delicate protrusions and ecological surfaces from shear forces and impact during handling.

In FIG. 13C illustrates a cross-sectional view A-A. The tow-behind model, shown on the left, relies on passive exposure to ambient water as the chamber moves through an aquatic environment. On the right, the recirculating model features a closed-loop water flow system, including a water pump 1315, filtration unit 1320, and aeration device 1325. These components maintain controlled internal water quality, ensuring that reef inserts receive continuous circulation, dissolved oxygen, and nutrient delivery, even in static or land-based environments. This model is particularly useful in hatchery conditions, laboratory testing, or field staging areas prior to final deployment.

The ability to stack, nest, and enclose the reef inserts within a flow-through preservation system not only protects structural features from damage but also maintains marine organism viability over extended periods. The offset nesting strategy allows for high-density transport while minimizing insert-to-insert contact, which is critical when dealing with fragile biological growth such as coral polyps or oyster spat. This dual-purpose configuration—both protective and biologically active increases the scalability of habitat restoration programs by ensuring that inserts arrive at their deployment site intact, functional, and ecologically viable.

The pre-growth preservation system 1300 may also function as an alternative deployable unit for temporary or semi-permanent ecological mitigation. In this configuration, the system comprises an elongated, generally tubular body that is hydrodynamic in shape, enabling efficient movement through water, whether actively towed or passively drifting. The main cylindrical housing includes a pair of removable or sealable end caps that provide access to the internal chamber, where a plurality of modular reef inserts are arranged in a stacked configuration. Each insert is oriented face-to-face with an adjacent insert, utilizing an offset nesting geometry to prevent damage to the pre-grown biological structures—such as coral, oysters, barnacles, or other filter-feeding organisms—that cover at least a portion of each habitat module prior to installation. The body of the deployable unit may be constructed from corrosion-resistant materials such as marine-grade composite, PVC, or coated steel, and may include flow ports, mesh windows, or slotted apertures along its sidewalls to allow ambient water to pass through the chamber. This configuration promotes continuous water exchange, enabling marine life to receive nutrients, oxygen, and environmental stimuli while being temporarily relocated. The hydrodynamic form reduces drag and allows the unit to remain stable in the water column during deployment or maintenance activities. When stationary, the unit may also serve as a localized reef or refugia structure, temporarily housing marine organisms while the primary aquatic infrastructure-such as a seawall, piling, or retaining wall—is undergoing repair. In this way, the deployable unit not only functions as a preservation system but also as an operable extension of the ecological habitat, ensuring continuity of biological support even during disruptive construction or maintenance operations.

Referring now to FIGS. 14A through 14E, illustrated is a mobilization and deployment system 1400 configured to transport, position, and release reef arch structures and their associated habitat modules in a variety of operational environments, including remote or environmentally sensitive locations. This system is specifically engineered to eliminate the need for heavy equipment such as barges, cranes, or powered lifts, and is instead optimized for low-footprint, manually assisted mobilization. The configuration is particularly suited for aquaculture environments or areas with constrained spatial access, such as between rows of planted columns or infrastructure in a diamond or gridded formation.

Figures 14A, 14B:
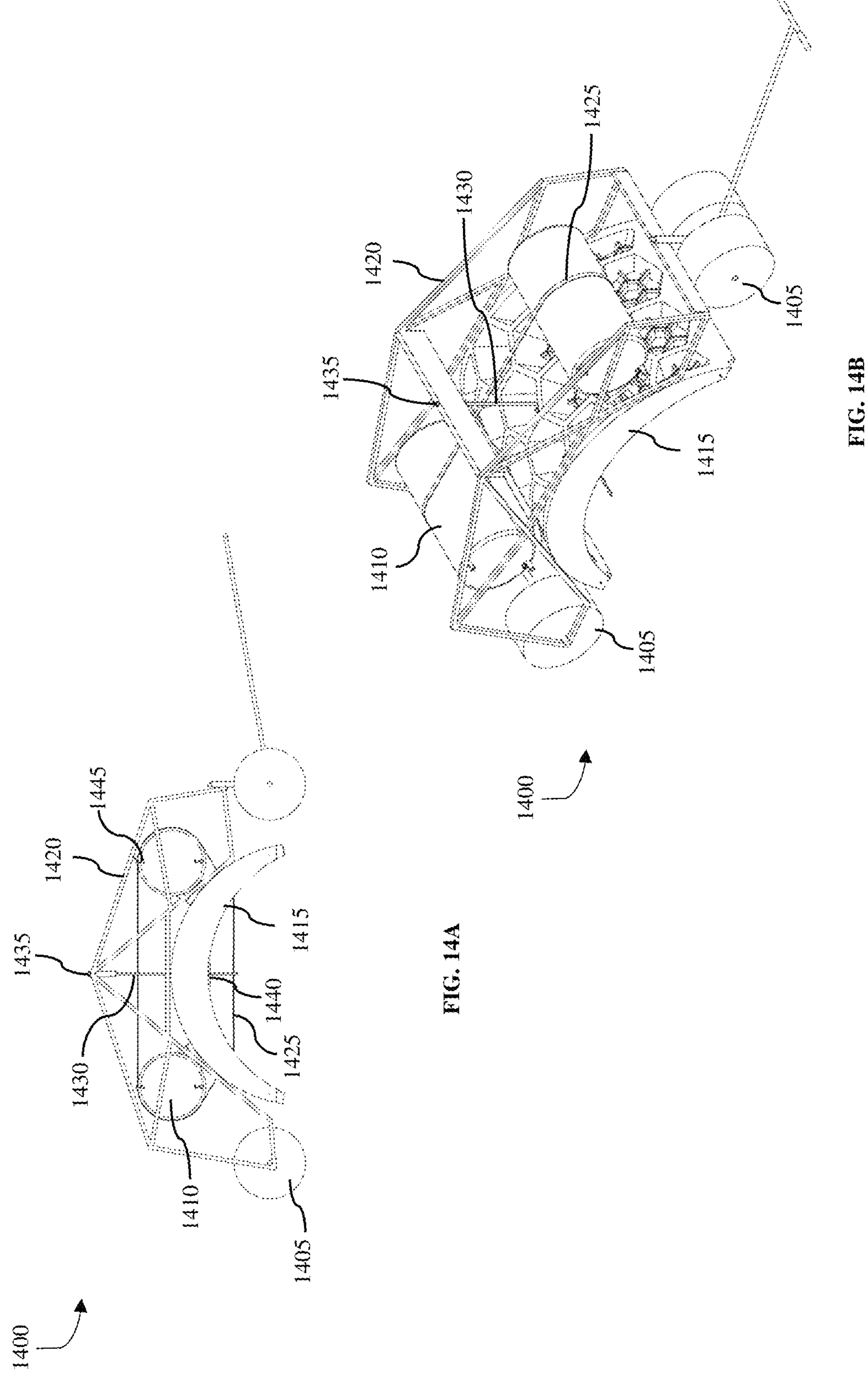
FIG. 14A is a side view of a mobile transport and deployment system, according to an example embodiment.
FIG. 14B is a perspective view of the mobile transport and deployment system, according to an example embodiment.

As shown in FIG. 14A, the structure consists of a reef arch centrally supported by a rigid triangular truss frame, which is outfitted with both wheel and buoyancy elements. A pair of large, terrain-compatible wheels 1405 is mounted laterally on either side of the frame to allow the system to be manually rolled over land or across hard-packed intertidal zones. This rolling deployment approach makes it possible to maneuver the system into position without disturbing adjacent ecosystems or compacting substrate, which is particularly valuable in delicate or protected coastal environments. The cylindrical float tanks 1410, that enable amphibious operation, are in attachment with the reef arch 1415 within the frame 1420 via straps 1425. The float tanks are secured using a strap harness and quick-release snap hook shackles, which allow the reef arch to be both suspended for transport and released for submersion without disassembly. This harnessing technique not only stabilizes the reef arch during transit, but also allows operators to quickly lower the arch into position once it reaches its destination. The inclusion of a threaded elevator rod 1430, terminating at a hex head 1435 above the truss structure, enables fine vertical adjustment of a threaded lift plate 1440 located beneath the reef arch. The lift plate provides support and controlled descent of the reef arch and can be manipulated via hand tools or low-torque powered drivers. This feature allows precise deployment depth adjustments without the need for a crane or diver intervention. The tanks 1410 may be passively filled, or optionally connected to solenoid valves 1445 with an RF receiver, battery supply, and a surface tether equipped with an air recharge line. In such configurations, the system can be remotely controlled to adjust buoyancy and achieve controlled submersion of the reef arch. By enabling floatation-assisted lowering of habitat structures, this mechanism minimizes impact forces during placement and allows for deployment even in shallow, uneven, or soft-bottomed areas where mechanical equipment would be ineffective or destructive.

FIG. 14B illustrates the same structure in a perspective view, revealing how the interior of the reef arch can be used to house and transport reef inserts. The inserts are loaded into a dedicated cavity formed within the arch and secured by the lift plate from below. This cavity supports the use of multiple pre-grown habitat modules arranged in a nesting configuration. The ability to transport both the structural reef arch and its biologically populated inserts in a single frame enhances operational efficiency, enabling field deployment with minimal handling or transfer of marine life between containers. By preserving the original growth orientation and water exposure of the inserts, the system helps maintain biological continuity and reduces organism stress during transport. FIG. 14C presents a top view of the system. From this view, the orientation of inserts is visible, as is the symmetrical layout of the float tanks positioned on each side of the reef arch. The float tanks are mounted at a height that provides stability while still allowing clearance beneath the unit.

In FIG. 14D, a rear view further shows the arrangement of the wheel system and its integration with the support structure. The wheels are wide and flat-edged, optimized for rolling over soft ground or transitional coastal terrain. This facilitates movement through aquaculture installations or other narrow corridors where powered vehicles or barge access is unfeasible. Importantly, the lift plate assembly is visible from this view, demonstrating how it supports the reef inserts and allows for smooth descent once the destination site is reached. FIG. 14E, a bottom plan view, reveals the layout of the reef inserts as viewed from below. The lift plate includes a central handle 1450 or coupling point for manual adjustment. The truss structure surrounding the reef arch provides rigidity, while still maintaining an open frame profile that reduces weight and drag during tow or launch.

This mobilization system significantly expands the operational versatility of the broader reef deployment strategy. By eliminating the dependency on cranes, barges, or dive crews, the system allows habitat infrastructure to be deployed in a wider range of locations with minimal environmental impact. In aquaculture or restoration installations where space between rows or columns is limited, the system's narrow profile and roll-through design make it uniquely capable of servicing targeted areas without displacing adjacent infrastructure. In remote locations, where ecological preservation is paramount or where traditional equipment cannot be brought in, this system allows habitat modules to be relocated or harvested with minimal disturbance. This increases the feasibility and repeatability of site-specific marine restoration work while reducing logistical costs and environmental risk. In certain embodiments, the reef arches or modular reef units may include slotted lifting handles, forklift-accessible feet, or stackable transport profiles to support rapid, tool-free deployment by marine contractors. This configuration aligns with contractor demands for plug-and-play systems that can be lifted, placed, and removed with minimal labor and no in-water cutting or drilling.

Figure 15:
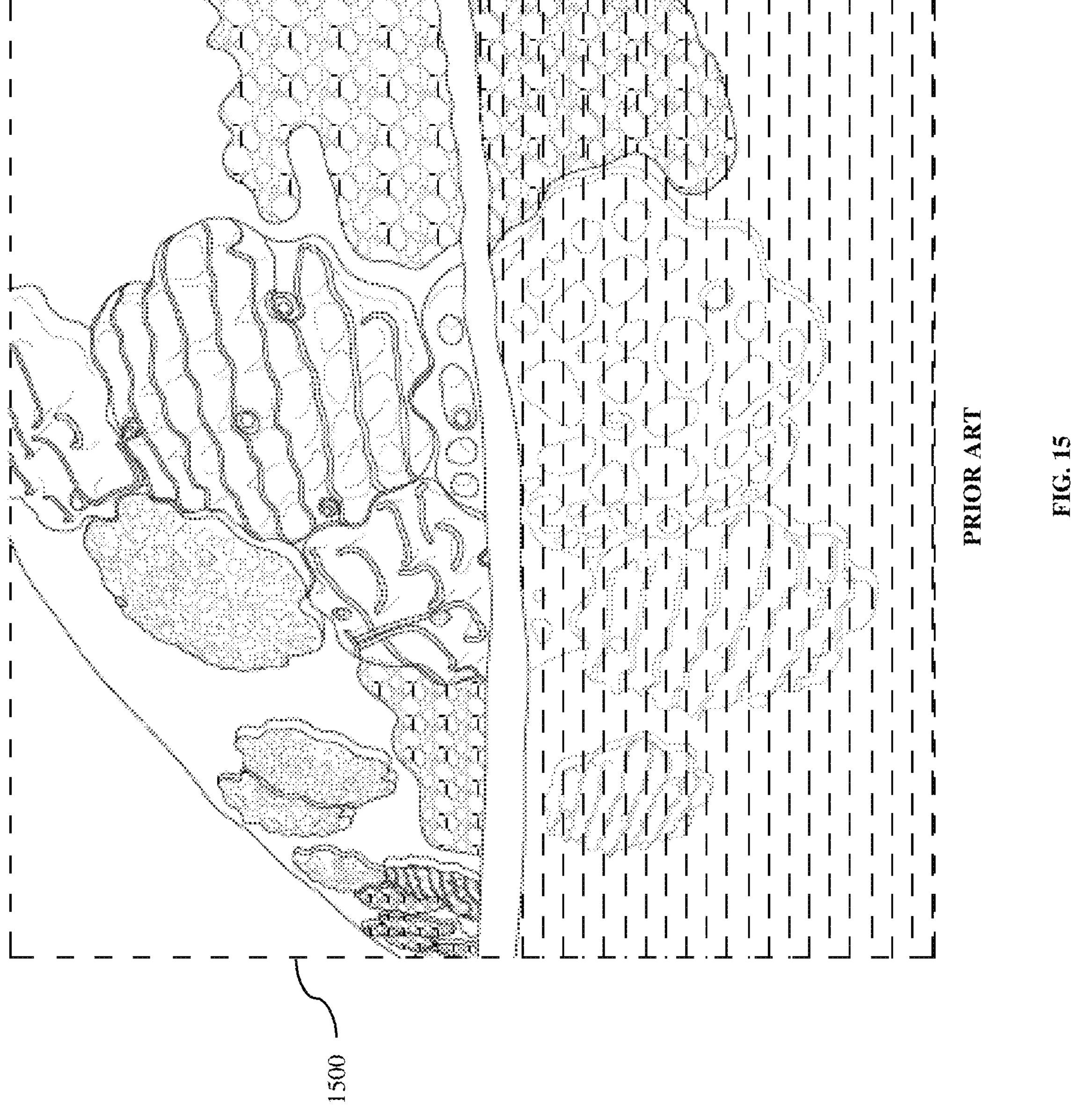
FIG. 15 is an image of the prior art consisting of 3D-printed habitat panels.

Referring now to FIG. 15, the prior art shown in the image 1500 consists of 3D-printed habitat panels that are primarily ornamental in nature, affixed to seawalls to enhance aesthetic appeal and, to a limited extent, biodiversity and habitat complexity in intertidal environments. These panels feature textured surfaces with depressions and cavities, providing some shelter and attachment points for marine organisms. Unlike traditional flat and featureless seawalls, which offer minimal habitat value, these living seawalls attempt to encourage marine colonization and ecosystem development. However, despite these efforts, the prior art remains fundamentally limited in its ecological effectiveness, as it lacks key functional features necessary for long-term marine habitat support and adaptability.

A primary limitation of these fixed 3D-printed habitat panels is their ornamental nature, with many installations placed substantially above the waterline, limiting their effectiveness for marine life that requires consistent submersion and access to tidal flows. Additionally, these panels lack pre-growth and rely entirely on natural algae growth and passive colonization, which is slow, unpredictable, and dependent on environmental factors. Because these panels do not come with pre-established marine organisms such as coral, oysters, or barnacles, they provide little to no immediate ecological benefit upon installation. The disclosed system addresses this limitation by incorporating pre-growth of marine organisms before deployment, ensuring immediate ecological functionality rather than relying on passive colonization over time. Another drawback is that these panels are not porous, meaning they do not facilitate adequate water flow or nutrient exchange, which are critical for sustaining marine ecosystems. In contrast, the disclosed system incorporates permeable habitat modules with controlled apertures, ensuring that water can circulate freely, preventing stagnation and allowing for the natural exchange of nutrients and larvae. Additionally, the prior art panels are mounted flush against the seawall with no offset, which reduces available habitat space and limits the development of microhabitats. The disclosed system improves upon this by introducing standoffs that create a controlled gap between the habitat module and the seawall, providing greater three-dimensional complexity, improved water circulation, and additional habitat layers for marine species.

Furthermore, the prior art lacks defensive design features to protect marine organisms from predators. The surface textures and cavities in the prior art panels do not include targeted predator deterrents, leaving young coral, oysters, and other filter-feeding species vulnerable to grazing fish and other threats. The disclosed system incorporates a variety of structural features, including protrusions, recesses, and protective overhangs, which serve as barriers against predation. For example, certain protrusions are specifically designed to deter species such as parrotfish, which are known to graze on coral, thereby increasing survival rates for marine organisms. By addressing these limitations, including the ornamental nature, lack of pre-growth, absence of porosity, failure to offset from the seawall, and lack of defensive design features, the disclosed system provides a more adaptable, functional, and ecologically beneficial solution for integrating marine habitats with coastal infrastructure. Instead of risking habitat loss during maintenance or relying on uncertain colonization patterns, the disclosed system ensures that marine organisms are preserved, relocated if necessary, and provided with an optimized environment for biodiversity, water quality enhancement, and long-term habitat sustainability.

Figure 16:
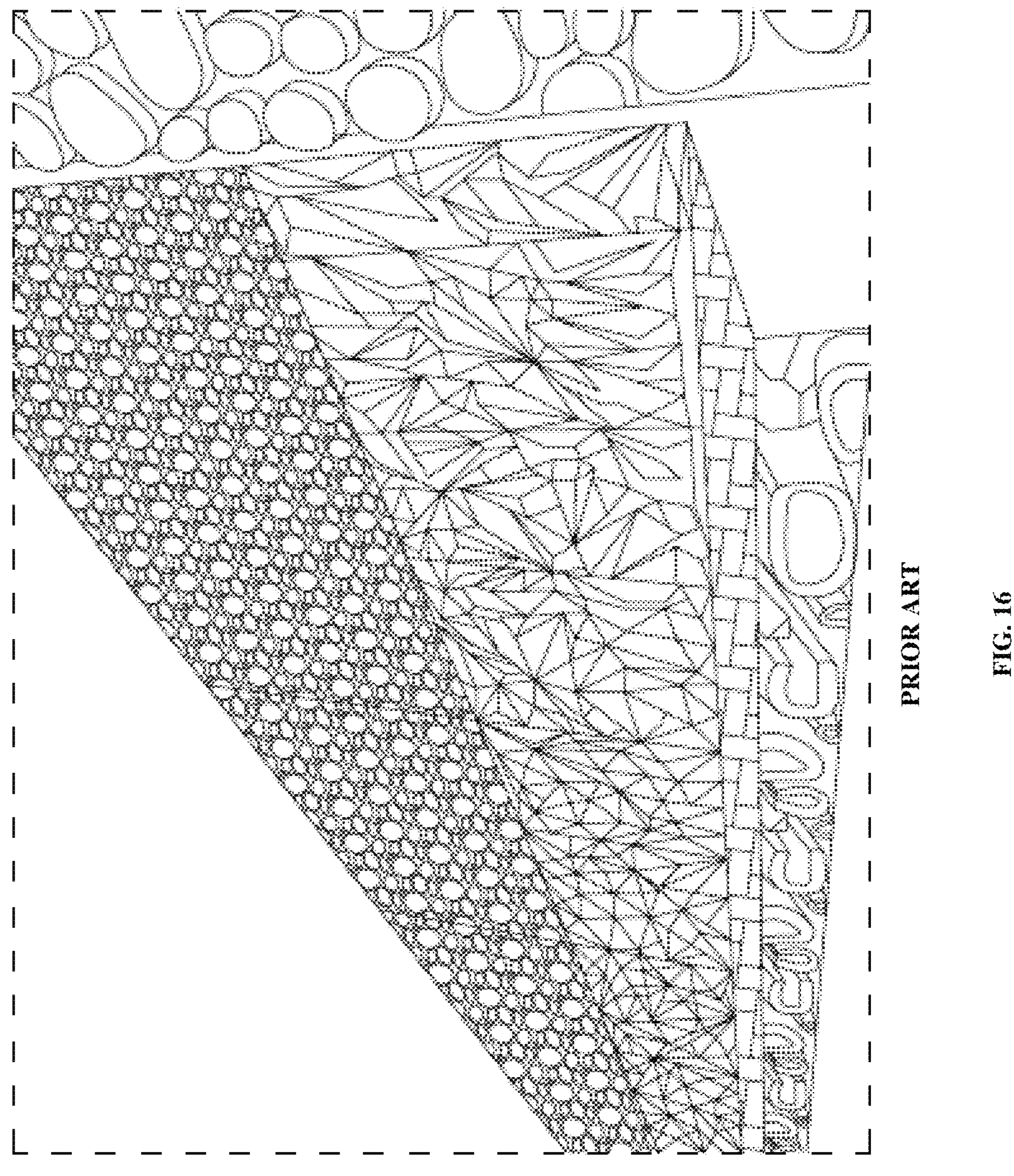
FIG. 16 is an image of the prior art consisting of textured concrete slabs that are affixed to seawalls.

Referring now to FIG. 16, the prior art shown in the image consists of textured concrete slabs that are affixed to seawalls, bulkheads, or other marine infrastructure to provide an alternative to smooth, homogenous concrete surfaces.

These slabs feature varied geometric patterns and surface textures, which are intended to enhance marine biodiversity by encouraging settlement of marine organisms such as oysters, barnacles, and algae. While this approach represents an improvement over traditional flat seawalls, which provide little to no habitat for marine life, it still exhibits several limitations that the disclosed system addresses.

One major drawback of these textured concrete slabs is that they are primarily ornamental, with some implementations placed substantially above the waterline, making them ineffective for submerged marine ecosystems that require constant access to tidal flows. Additionally, these slabs lack pre-growth and rely solely on passive colonization, meaning that marine organisms must naturally recruit and settle on the textured surfaces over time. This approach is slow, unpredictable, and highly dependent on environmental factors, leading to delayed ecological benefits and inconsistent habitat formation. The disclosed system improves upon this by incorporating pre-growth of marine organisms, such as coral, oysters, and filter-feeding species, before deployment, ensuring that the habitat is immediately functional upon installation rather than waiting for natural colonization to occur.

Another limitation of the prior art is that it is not porous, meaning that water cannot flow freely through the structure, restricting nutrient exchange, oxygenation, and larval recruitment-all of which are essential for sustaining marine biodiversity. The disclosed system features habitat modules with a permeable base and controlled apertures, allowing for enhanced water flow, sediment prevention, and improved habitat conditions. Additionally, the prior art slabs are mounted flush against the seawall with no offset, significantly limiting available habitat space and failing to replicate natural reef formations. The disclosed system introduces standoffs that create a controlled gap between the habitat module and the seawall, allowing for greater three-dimensional complexity, improved water circulation, and additional habitat layers for marine organisms.

Furthermore, the textured surfaces of the prior art slabs lack defensive design features, making marine organisms vulnerable to predators such as grazing fish and invasive species. The disclosed system includes habitat modules with targeted predator-deterring protrusions, overhangs, and protective recesses, which provide essential refuge for marine organisms and help improve survival rates. For example, certain protrusions are designed to deter species such as parrotfish, which are known to graze on coral and other encrusting organisms, ensuring that habitat stability is maintained over time.

By addressing these fundamental limitations-including the ornamental nature, lack of pre-growth, absence of porosity, failure to offset from the seawall, and lack of defensive design features—the disclosed system provides a more adaptable, functional, and ecologically beneficial solution for integrating marine habitats with coastal infrastructure. Instead of relying on passive settlement and risking habitat loss during maintenance, the disclosed system ensures that marine organisms are preserved, relocated if necessary, and provided with an optimized environment for biodiversity, water quality enhancement, and long-term habitat sustainability.

Figure 17:
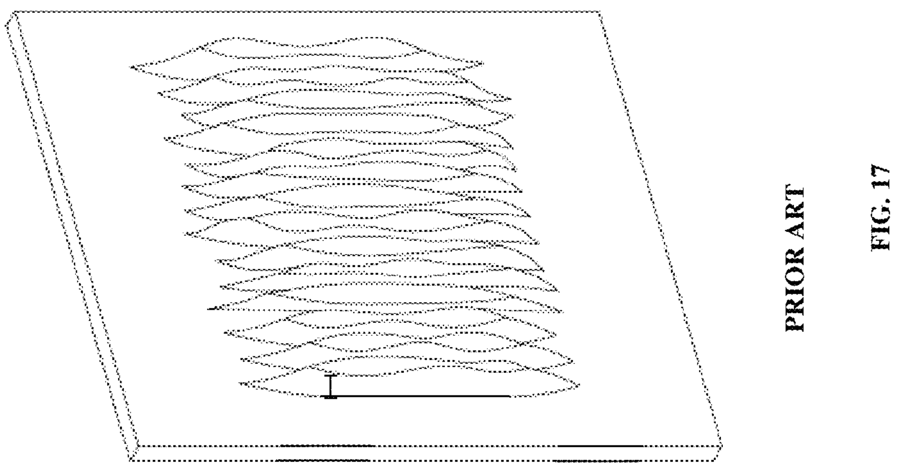
FIG. 17 is prior art consisting of a structural panel with integrated habitat features, designed to be installed on piles or other marine infrastructure.

Referring now to FIG. 17, the prior art shown depicts a structural panel with integrated habitat features, designed to be installed on piles or other marine infrastructure. The panel consists of a structural core, which remains constant in thickness to provide load-bearing capacity, and a non-structural habitat section, which varies in depth between 4 to 8 inches to create textured surfaces for marine colonization. The panel also includes top, side, and bottom borders, which facilitate installation, alignment, and embedment with surrounding structures. The undulating or patterned surface is likely intended to increase surface area and provide micro-habitats for marine organisms such as oysters, barnacles, and algae. Despite offering some structural and ecological benefits, this prior art presents several limitations that the disclosed system improves upon.

A primary limitation of the prior art is that it is a single-layer structure, meaning it cannot support hierarchical species growth the way natural reef formations do. Marine ecosystems thrive when they have multi-layered habitats that accommodate various species at different levels of the water column. Because the panel is a flat plate, it lacks the three-dimensional structural complexity necessary to create tiered habitats, limiting its ability to support diverse marine populations that require different shelter depths and access to water flow. The disclosed system incorporates interlocking, modular habitat modules that can be arranged in varying depths and orientations, creating a multi-layered habitat capable of supporting species at different levels of the ecosystem.

Another limitation of the prior art is that it is not porous, meaning water cannot flow freely through the structure. Limited water exchange restricts nutrient circulation, oxygenation, and larval recruitment, all of which are critical for sustaining marine biodiversity. The disclosed system improves upon this by incorporating a permeable base with controlled apertures, ensuring enhanced water flow, sediment prevention, and improved habitat conditions. Additionally, the prior art panel is simply a plate mounted to the pile or infrastructure, meaning it is flush against the surface with no offset. This lack of offset restricts the available space for marine life and fails to replicate the complexity of natural reef structures, where marine organisms can seek refuge in gaps and crevices. The disclosed system introduces a mounting system that offsets habitat modules from the infrastructure, creating a controlled gap that allows for additional habitat layers, improved water circulation, and enhanced ecological function.

Furthermore, the flat panel lacks three-dimensional protrusions, recesses, or overhanging features necessary for defensive designs that protect marine life from predators. The disclosed system integrates predator-deterring features, such as protrusions that block access to small marine organisms, reducing the likelihood of predation from species such as parrotfish or larger grazing invertebrates. This improves survival rates and ensures long-term habitat stability. Additionally, the prior art relies entirely on passive colonization, requiring marine organisms to settle naturally over time, which is slow, unpredictable, and dependent on external environmental conditions. In contrast, the disclosed system pre-grows marine organisms, such as coral, oysters, and other filter-feeding species, on habitat modules before installation, ensuring immediate ecological functionality upon deployment.

By addressing these fundamental limitations, including the inability to support hierarchical species growth, the lack of porosity, the single-layer plate design, and the absence of defensive features, the disclosed system provides a more adaptable, functional, and ecologically beneficial approach to integrating marine habitats with coastal infrastructure. Unlike static, permanently affixed flat panels, the disclosed system ensures that marine organisms are preserved, relocated if necessary, and provided with an optimized environment that enhances biodiversity, water quality, and long-term habitat sustainability.

Figure 18:
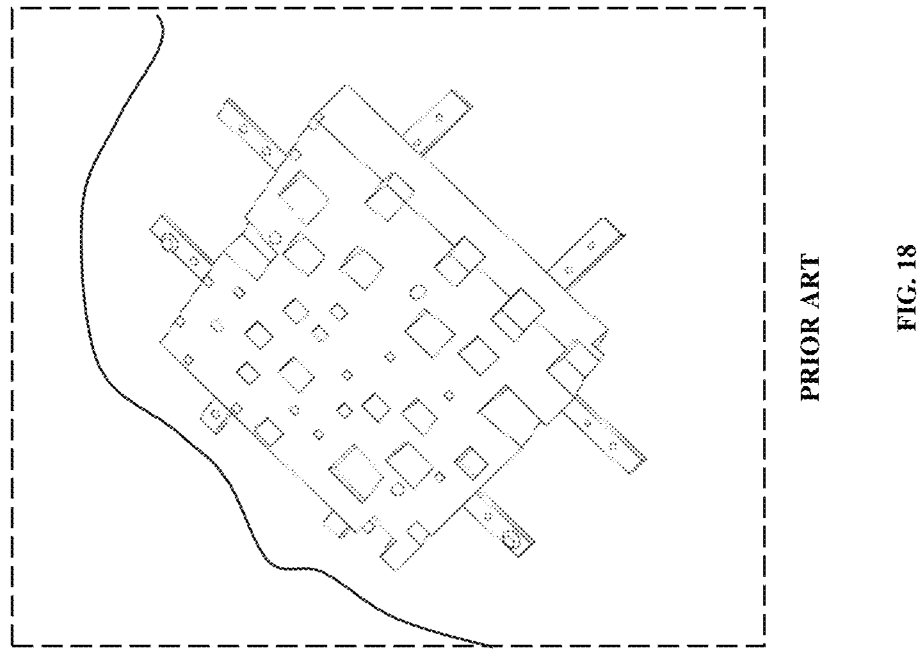
FIG. 18 is an image of the prior art consisting of enhancement tiles, which are precast concrete units affixed to seawalls.

Referring now to FIG. 18, the prior art shown in the image consists of enhancement tiles, which are precast concrete units affixed to seawalls to promote biodiversity and native bivalve colonization. These tiles feature varied surface textures and depressions intended to provide microhabitats for marine organisms. While these designs represent an improvement over smooth seawalls, they exhibit several limitations that our disclosed system addresses and improves upon. One major limitation of the enhancement tiles is that they are static and permanently affixed to the seawall, meaning that if maintenance or repairs are required, any established marine life is either destroyed or must be relocated through costly and time-consuming mitigation efforts. Because these tiles cannot be removed or repositioned, habitat continuity is disrupted whenever infrastructure modifications occur. Additionally, these tiles rely entirely on passive colonization, meaning marine organisms must naturally recruit and settle over time. This delays ecological benefits and creates uncertainty, as success depends on environmental conditions and recruitment cycles.

Another significant limitation of the enhancement tiles is that they are a single-layer structure that does not support hierarchical species growth. In natural reef environments, species thrive in multi-layered, complex habitats, where organisms occupy different spatial niches based on their ecological needs. However, enhancement tiles lack depth, overhangs, and three-dimensional structures, making them ineffective at supporting diverse marine communities. In contrast, the disclosed system features habitat modules with multi-layered structures, incorporating protrusions, recesses, and interlocking components to provide tiered habitats for different species, mimicking the natural stratification found in reefs.

Additionally, the enhancement tiles are not porous, meaning that they do not facilitate adequate water flow or nutrient exchange, which is critical for sustaining marine ecosystems. The disclosed system improves upon this by incorporating a permeable base with controlled apertures, ensuring enhanced water flow, sediment prevention, and improved habitat conditions. Furthermore, the prior art tiles are fastened directly to a rock or seawall without an offset, significantly limiting available habitat space and failing to create a three-dimensional reef structure. The disclosed system introduces standoffs that create a controlled gap between the habitat module and the seawall, allowing for greater water circulation, additional shelter spaces, and improved ecological function.

The disclosed modular and relocatable aquatic habitat system significantly improves upon this prior art by introducing removable and modular habitat modules that can be relocated as needed, ensuring continuous habitat support even during maintenance operations. Unlike enhancement tiles, which are permanently affixed, the disclosed system features a mounting system that allows habitat modules to be detached and repositioned. This is particularly beneficial when seawall repairs are required, as habitat modules can be transferred to a deployable reef arch or pillar-based system, keeping marine organisms in a stable environment without disruption. Another key advantage is that the disclosed system incorporates pre-growth of marine life, including coral, oysters, and other filter-feeding organisms, before installation. This ensures immediate ecological functionality, whereas enhancement tiles rely on long periods of passive settlement, leading to unpredictable success rates.

The disclosed system also introduces greater structural complexity, including protrusions, recesses, and interlocking features that offer more diverse microhabitats and protection from predators. These design elements enhance water flow, create shelter spaces, and increase surface area for marine colonization, making the system more effective in supporting biodiversity than the simple textured surfaces of enhancement tiles. Additionally, in some embodiments, a deployable unit serves as both a temporary retention structure and a permanent artificial reef, allowing habitat modules to be securely housed in a reef arch or piling-based structure when removed from the seawall. This eliminates the need for costly transplantation efforts and ensures that marine organisms remain in their native water conditions, reducing stress and improving survival rates.

Furthermore, the disclosed system is scalable and adaptable, allowing habitat modules to be reconfigured, replaced, or expanded based on environmental conditions, infrastructure needs, or marine conservation goals. Unlike enhancement tiles, which are static and cannot be adjusted after installation, the modular nature of the disclosed system ensures long-term ecological sustainability and greater flexibility in habitat restoration efforts. By incorporating removability, pre-growth, enhanced structural complexity, and a deployable relocation system, the disclosed invention overcomes the limitations of enhancement tiles and provides a more effective, adaptable, and ecologically beneficial solution for integrating marine habitats with human-engineered coastal infrastructure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A modular and relocatable aquatic habitat system for ecological mitigation, marine life support, habitat relocation, and water quality enhancement, the modular and relocatable aquatic habitat system comprising:

a plurality of habitat modules, each habitat module comprising a pre-growth of marine organisms covering at least a portion of the habitat module before installation; and a mounting system configured to removably secure each habitat module of the plurality of habitat modules to an aquatic infrastructure, a deployable unit configured to temporarily retain the plurality of habitat modules during relocation from the aquatic infrastructure, the deployable unit comprising:

a plurality of receiving sections, each receiving section configured to removably retain at least one habitat module of the plurality of habitat modules;

an outer curved surface;

an inner curved surface; and a thickness between the outer curved surface and the inner curved surface wherein said thickness continuously decreases from a vertex section towards a terminating end of the deployable unit.

2. The modular and relocatable aquatic habitat system of claim 1, wherein at least one habitat module of the plurality of habitat modules comprises at least one of:

a plurality of protrusions extending from a base, each protrusion having a substantially pyramidal shape with at least one wing, and a plurality of apertures extending through the base.

3. The modular and relocatable aquatic habitat system of claim 2, wherein the plurality of receiving sections of the deployable unit are openings extending through the curved structure from the outer curved surface to the inner curved surface.

4. The modular and relocatable aquatic habitat system of claim 3, wherein the outer curved surface comprises a first uniform radius of curvature from the vertex section to the terminating end of the deployable unit.

5. The modular and relocatable aquatic habitat system of claim 4, wherein the inner curved surface comprises a second uniform radius of curvature from the vertex section to the terminating end of the deployable unit.

6. The modular and relocatable aquatic habitat system of claim 5, wherein the mounting system comprises:

a plurality of standoffs configured to position each habitat module a predetermined distance from the aquatic infrastructure, and a gap between the habitat module and the aquatic infrastructure.

7. The modular and relocatable aquatic habitat system of claim 6, wherein the mounting system comprises a plurality of fastening members for removably securing the habitat modules to the aquatic infrastructure.

8. A method for ecological mitigation, marine life support, habitat relocation, and water quality enhancement, the method comprising:

cultivating a pre-growth of marine organisms on at least a portion of a habitat module;

securing a plurality of habitat modules to an aquatic infrastructure using a mounting system, wherein the mounting system creates a gap between each habitat module and the aquatic infrastructure to facilitate water flow and marine organism interaction;

deploying a deployable unit into the water proximate to the aquatic infrastructure, wherein the deployable unit comprises:

a support structure, and at least one receiving section configured to removably retain the habitat module; a thickness between the outer curved surface, the inner curved surface, a front side of the deployable unit, and a back side of the deployable unit; and wherein the thickness varies between an outer curved surface and an inner curved surface such that the thickness continuously decreases from a vertex section towards a terminating end of the deplovable unit;

detaching at least one habitat module of the plurality of habitat modules from the aquatic infrastructure when the aquatic infrastructure undergoes a maintenance operation; relocating the at least one habitat module that was detached to the deployable unit; retaining the at least one habitat module in the deployable unit for a duration sufficient to complete the maintenance operation of the aquatic infrastructure;

removing the at least one habitat module from the deployable unit after completion of the maintenance operation; reattaching the at least one habitat module to the aquatic infrastructure using the mounting system.

9. The method of claim 8, wherein the habitat module comprises a plurality of apertures and a plurality of protrusions of varying heights extending from a base.

10. The method of claim 9, wherein the support structure of the deployable unit is a curved structure having a vertex section, an outer curved surface, and an inner curved surface.

11. The method of claim 10, wherein the plurality of receiving sections of the deployable unit are openings extending through the curved structure from the outer curved surface to the inner curved surface.

12. The method of claim 8, wherein the aquatic infrastructure is at least semi-submerged in the water, and wherein the plurality of habitat modules is removably secured to the aquatic infrastructure substantially below a water line.

13. A modular and relocatable aquatic habitat system for ecological mitigation, marine life support, habitat relocation, and water quality enhancement, the modular and relocatable aquatic habitat system comprising: a plurality of habitat modules, each habitat module comprising a pre-growth of marine organisms covering at least a portion of the habitat module; and a deployable unit configured to retain the plurality of habitat modules, the deployable unit comprising:

a plurality of openings extending through the deployable unit from an outer surface to an inner surface; wherein each opening defines a walled channel; and wherein at least one habitat module of the plurality of habitat modules is received within the walled channel such that the channel walls at least partially surround the at least one habitat module;

an outer curved surface;

an inner curved surface; and a thickness between the outer curved surface and the inner curved surface, wherein said thickness continuously decreases from a vertex section towards a terminating end of the deployable unit.

14. The system of claim 13, wherein the walled channel is tapered such that a first width of the opening proximate an outer surface of the deployable unit is greater than a second width deeper within the structural body, the taper being configured to retain the habitat module within the walled channel.

* * * * *